United States Patent
Cotton et al.

(10) Patent No.: US 10,430,848 B2
(45) Date of Patent: Oct. 1, 2019

(54) VISUAL DISCOVERY TOOL FOR AUTOMOTIVE MANUFACTURERS, WITH NETWORK ENCRYPTION, DATA CONDITIONING, AND PREDICTION ENGINE

(71) Applicant: AutoAlert, LLC, Irvine, CA (US)

(72) Inventors: Jeffrey Stuart Cotton, Laguna Hills, CA (US); Boyd Hodgson Warner, Laguna Beach, CA (US); Thomas A. Walls, Overland Park, KS (US); Levko Zhuravchak, Mission Viejo, CA (US); Dan Christian Milius, Huntington Beach, CA (US); Jeff Keith Faulkner, Francis, UT (US); Mike Phillip Dullea, Kansas City, MO (US)

(73) Assignee: AUTOALERT, LLC., Irvine, CA (US)

( * ) Notice: Subject to any disclaimer, the term of this patent is extended or adjusted under 35 U.S.C. 154(b) by 0 days.

(21) Appl. No.: 15/925,664

(22) Filed: Mar. 19, 2018

(65) Prior Publication Data
US 2018/0218420 A1    Aug. 2, 2018

Related U.S. Application Data

(63) Continuation of application No. 15/786,540, filed on Oct. 17, 2017.
(Continued)

(51) Int. Cl.
*G06Q 30/02*    (2012.01)
*G06Q 30/06*    (2012.01)
(Continued)

(52) U.S. Cl.
CPC ....... *G06Q 30/0611* (2013.01); *G06F 16/254* (2019.01); *G06F 21/6218* (2013.01);
(Continued)

(58) Field of Classification Search
CPC .................................................. G06Q 30/0611
See application file for complete search history.

(56) References Cited

U.S. PATENT DOCUMENTS 4,554,418 A    11/1985 Toy
4,736,294 A    4/1988 Gill et al.
(Continued)

FOREIGN PATENT DOCUMENTS

EP    1146459    10/2001
EP    1220131    7/2002
(Continued)

OTHER PUBLICATIONS

Wiley Encylopedia of Computer Science and Engineering (Year: 2009).*
(Continued)

*Primary Examiner* — Kambiz Abdi
*Assistant Examiner* — Breffni Baggot
(74) *Attorney, Agent, or Firm* — Knobbe, Martens, Olson & Bear, LLP

(57) ABSTRACT

A visual discovery tool for automotive manufacturing with network encryption, data conditioning, and prediction can include an extraction device configured to receive data records from application-specific file source databases. The tool can further include a vehicle alert database that receives the vehicle records from the plurality of extraction databases. The visual discovery tool can include at least one hardware processor in communication with the extraction device and the vehicle alert database. The tool can be configured to selectively restrict access to an interactive display based on whether a client device receives authorization credentials.

20 Claims, 51 Drawing Sheets

Related U.S. Application Data

(60) Provisional application No. 62/409,824, filed on Oct. 18, 2016, provisional application No. 62/443,633, filed on Jan. 6, 2017, provisional application No. 62/444,262, filed on Jan. 9, 2017.

(51) Int. Cl.
*G06F 16/25* (2019.01)
*G06F 21/62* (2013.01)
*G06Q 10/08* (2012.01)
*G06Q 30/00* (2012.01)
*G06Q 40/02* (2012.01)
*G06F 3/0484* (2013.01)

(52) U.S. Cl.
CPC ......... *G06Q 10/0875* (2013.01); *G06Q 30/01* (2013.01); *G06Q 30/0224* (2013.01); *G06Q 30/0235* (2013.01); *G06Q 30/0278* (2013.01); *G06Q 30/0631* (2013.01); *G06Q 40/025* (2013.01); *G06F 3/04847* (2013.01); *G06Q 30/0643* (2013.01)

(56) References Cited

U.S. PATENT DOCUMENTS

| | | |
|---|---|---|
| 4,774,664 A | 9/1988 | Campbell et al. |
| 5,414,621 A | 5/1995 | Hough |
| 5,493,490 A | 2/1996 | Johnson |
| 5,500,793 A | 3/1996 | Deming et al. |
| 5,664,115 A | 9/1997 | Fraser |
| 5,724,573 A | 3/1998 | Agrawal et al. |
| 5,742,769 A | 4/1998 | Lee et al. |
| 5,774,883 A | 6/1998 | Andersen et al. |
| 5,794,207 A | 8/1998 | Walker |
| 5,825,989 A | 10/1998 | Sonty et al. |
| 5,884,305 A | 3/1999 | Kleinberg et al. |
| 5,893,075 A | 4/1999 | Plainfield et al. |
| 5,930,764 A | 7/1999 | Melchione et al. |
| 5,933,818 A | 8/1999 | Kasravi et al. |
| 5,940,812 A | 8/1999 | Tengel et al. |
| 5,966,695 A | 10/1999 | Melchione et al. |
| 5,987,434 A | 11/1999 | Libman et al. |
| 6,023,687 A | 2/2000 | Weatherly et al. |
| 6,026,370 A | 2/2000 | Jermyn |
| 6,041,310 A | 3/2000 | Green et al. |
| 6,061,682 A | 5/2000 | Agrawal et al. |
| 6,073,112 A | 6/2000 | Geerlings |
| 6,161,103 A | 12/2000 | Rauer et al. |
| 6,236,978 B1 | 5/2001 | Tuzhilin |
| 6,266,668 B1 | 7/2001 | Vanderveldt et al. |
| 6,285,983 B1 | 9/2001 | Jenkins |
| 6,332,126 B1 | 12/2001 | Peirce et al. |
| 6,334,110 B1 | 12/2001 | Walter et al. |
| 6,418,419 B1 | 7/2002 | Nieboer et al. |
| 6,480,105 B2 | 11/2002 | Edwards |
| 6,493,722 B1 | 12/2002 | Daleen et al. |
| 6,502,080 B1 | 12/2002 | Eichorst et al. |
| 6,526,335 B1 | 2/2003 | Treyz et al. |
| 6,603,487 B1 | 8/2003 | Bennett et al. |
| 6,629,095 B1 | 9/2003 | Wagstaff et al. |
| 6,658,390 B1 | 12/2003 | Walker |
| 6,925,411 B1 | 8/2005 | Drost et al. |
| 6,941,305 B2 | 9/2005 | Magouirk et al. |
| 6,950,807 B2 | 9/2005 | Brock |
| 6,965,874 B2 | 11/2005 | Joseph |
| 7,050,982 B2 | 5/2006 | Sheinson |
| 7,065,555 B2 | 6/2006 | Foulger et al. |
| 7,072,848 B2 | 7/2006 | Boyd et al. |
| 7,089,588 B2 | 8/2006 | Schaefer |
| 7,130,821 B1 | 10/2006 | Connnors et al. |
| 7,177,822 B2 | 2/2007 | Mahmood et al. |
| 7,213,023 B2 | 5/2007 | Hadzikadic |
| 7,216,102 B2 | 5/2007 | Nabe |
| 7,239,234 B2 | 7/2007 | Cina |
| 7,249,322 B2 | 7/2007 | Jones et al. |
| 7,305,364 B2 | 12/2007 | Nabe et al. |
| 7,343,406 B1 | 3/2008 | Buonanno |
| 7,346,537 B2 | 3/2008 | Kraft et al. |
| 7,386,485 B1 | 6/2008 | Mussman et al. |
| 7,386,594 B2 | 6/2008 | Foulger et al. |
| 7,392,221 B2 | 6/2008 | Nabe |
| 7,406,436 B1 | 7/2008 | Reisman |
| 7,444,304 B2 | 10/2008 | Mellinger et al. |
| 7,472,072 B2 | 12/2008 | Kowalchuk |
| 7,483,846 B1 | 1/2009 | Kumar et al. |
| 7,487,110 B2 | 2/2009 | Bennett |
| 7,529,694 B2 | 5/2009 | Crites |
| 7,546,273 B2 | 6/2009 | Blanchard et al. |
| 7,555,443 B2 | 6/2009 | Chandran et al. |
| 7,571,128 B1 | 8/2009 | Brown et al. |
| 7,827,099 B1 | 11/2010 | Cotton |
| 8,005,752 B1 | 8/2011 | Cotton |
| 8,086,529 B2 | 12/2011 | Cotton |
| 8,095,461 B1 | 1/2012 | Cotton |
| 8,315,911 B2 | 11/2012 | Callow et al. |
| 8,374,894 B2 | 2/2013 | Weinstock et al. |
| 8,396,791 B2 | 3/2013 | Cotton |
| 8,560,161 B1 | 10/2013 | Kator |
| 9,047,616 B2 | 6/2015 | Schnabel et al. |
| 2001/0034700 A1 | 10/2001 | Foss et al. |
| 2001/0044769 A1 | 11/2001 | Chaves |
| 2001/0049653 A1 | 12/2001 | Sheets |
| 2002/0010643 A1 | 1/2002 | Chaves |
| 2002/0013711 A1 | 1/2002 | Ahuja et al. |
| 2002/0023051 A1 | 2/2002 | Kunzle et al. |
| 2002/0024537 A1 | 2/2002 | Jones et al. |
| 2002/0035520 A1 | 3/2002 | Weiss |
| 2002/0042752 A1 | 4/2002 | Chaves |
| 2002/0065707 A1 | 5/2002 | Lancaster |
| 2002/0082860 A1 | 6/2002 | Johnson |
| 2002/0099618 A1 | 7/2002 | Stiberman |
| 2002/0103715 A1 | 8/2002 | Bennett |
| 2002/0188506 A1 | 12/2002 | Smith |
| 2002/0194050 A1 | 12/2002 | Nabe et al. |
| 2002/0198820 A1 | 12/2002 | Mills |
| 2003/0105728 A1 | 6/2003 | Hirobe et al. |
| 2003/0154094 A1 | 8/2003 | Bredemeier et al. |
| 2003/0154129 A1 | 8/2003 | Goff |
| 2003/0172016 A1 | 9/2003 | Chandran et al. |
| 2003/0212619 A1 | 11/2003 | Jain et al. |
| 2003/0212628 A1 | 11/2003 | Kuttan et al. |
| 2003/0216995 A1 | 11/2003 | DePauw |
| 2003/0229528 A1 | 12/2003 | Nitao et al. |
| 2004/0039690 A1 | 2/2004 | Brown et al. |
| 2004/0103041 A1 | 5/2004 | Alston |
| 2004/0130746 A1 | 7/2004 | Wu |
| 2004/0148181 A1 | 7/2004 | McKnight et al. |
| 2004/0167897 A1 | 8/2004 | Kuhlmann et al. |
| 2004/0179215 A1 | 9/2004 | Reese et al. |
| 2004/0181480 A1 | 9/2004 | Greenberg et al. |
| 2004/0243669 A1 | 12/2004 | Green et al. |
| 2004/0254819 A1 | 12/2004 | Halim et al. |
| 2005/0021378 A1 | 1/2005 | Weinstock et al. |
| 2005/0049911 A1 | 3/2005 | Engelking et al. |
| 2005/0091087 A1 | 4/2005 | Smith et al. |
| 2005/0165639 A1 | 7/2005 | Ross et al. |
| 2005/0171896 A1 | 8/2005 | Seretti et al. |
| 2005/0177337 A1 | 8/2005 | Beyer |
| 2006/0004626 A1 | 1/2006 | Holmen et al. |
| 2006/0020477 A1 | 1/2006 | Retzbach et al. |
| 2006/0064340 A1 | 3/2006 | Cook |
| 2006/0085283 A1 | 4/2006 | Griffiths |
| 2006/0129423 A1 | 6/2006 | Sheinson et al. |
| 2006/0139679 A1 | 6/2006 | Barry et al. |
| 2006/0143112 A1 | 6/2006 | Donarski et al. |
| 2006/0155439 A1 | 7/2006 | Slawinski et al. |
| 2006/0184379 A1 | 8/2006 | Tan et al. |
| 2006/0229981 A1 | 10/2006 | Crites |
| 2007/0129954 A1 | 6/2007 | Dessureault |
| 2007/0136163 A1 | 6/2007 | Bell |
| 2007/0179798 A1 | 8/2007 | Inbarajan |
| 2007/0282712 A1 | 12/2007 | Ullman et al. |
| 2007/0282713 A1 | 12/2007 | Ullman et al. |

(56) References Cited

U.S. PATENT DOCUMENTS

| | | |
|---|---|---|
| 2008/0103785 A1 | 5/2008 | Logan |
| 2008/0120155 A1 | 5/2008 | Pliha |
| 2008/0183616 A1 | 7/2008 | Hankey et al. |
| 2008/0201163 A1 | 8/2008 | Barker et al. |
| 2008/0201184 A1 | 8/2008 | Rose et al. |
| 2008/0288332 A1 | 11/2008 | Altounian et al. |
| 2008/0294996 A1 | 11/2008 | Hunt et al. |
| 2008/0300962 A1 | 12/2008 | Cawston et al. |
| 2009/0171737 A1 | 7/2009 | Polanco |
| 2010/0082780 A1 | 4/2010 | Muilenburg et al. |
| 2010/0106597 A1* | 4/2010 | Jayakody ............... G06Q 30/02 705/14.53 |
| 2010/0217616 A1 | 8/2010 | Colson et al. |
| 2010/0223106 A1 | 9/2010 | Hallowell |
| 2010/0274571 A1 | 10/2010 | McFall et al. |
| 2010/0274631 A1 | 10/2010 | McFall et al. |
| 2010/0278318 A1 | 11/2010 | Flockhart et al. |
| 2010/0287058 A1 | 11/2010 | Rosskamm et al. |
| 2011/0173111 A1 | 7/2011 | Cotton |
| 2011/0173112 A1* | 7/2011 | Cotton ................... G06Q 40/00 705/35 |
| 2011/0270659 A1 | 11/2011 | Crites |
| 2012/0036033 A1 | 2/2012 | Serrgy et al. |
| 2012/0059725 A1 | 3/2012 | Colson et al. |
| 2012/0060112 A1 | 3/2012 | Wilson et al. |
| 2012/0116890 A1 | 5/2012 | Colson et al. |
| 2012/0130778 A1* | 5/2012 | Cotton ................. G06Q 30/012 705/14.1 |
| 2012/0136775 A1* | 5/2012 | Cotton ................... G06Q 40/00 705/38 |
| 2013/0185190 A1 | 7/2013 | Cotton |
| 2013/0211865 A1 | 8/2013 | Cotton |
| 2013/0218336 A1 | 8/2013 | Colson et al. |
| 2013/0268315 A1* | 10/2013 | Cotton ............... G06Q 30/0201 705/7.29 |
| 2014/0006108 A1 | 1/2014 | Cotton |
| 2014/0081751 A1 | 3/2014 | Hogan et al. |
| 2014/0229311 A1* | 8/2014 | Colson ................... G06Q 30/02 705/26.2 |
| 2014/0236655 A1 | 8/2014 | Warner et al. |
| 2014/0245015 A1 | 8/2014 | Velamoor et al. |
| 2014/0324531 A1 | 10/2014 | Cotton |
| 2014/0324536 A1* | 10/2014 | Cotton ............... G06Q 30/0201 705/7.31 |
| 2015/0019407 A1* | 1/2015 | Cotton ................... G06Q 40/00 705/38 |
| 2015/0235241 A1 | 8/2015 | Schnabl et al. |
| 2015/0332390 A1 | 11/2015 | Cotton |
| 2016/0110804 A1 | 4/2016 | Cotton |
| 2018/0108058 A1* | 4/2018 | Cotton ............... G06Q 30/0631 |

FOREIGN PATENT DOCUMENTS

| | | |
|---|---|---|
| EP | 1278140 | 1/2003 |
| EP | 1288822 | 3/2003 |
| EP | 1298561 | 4/2003 |
| JP | H 10143564 | 5/1998 |
| JP | 2002041876 | 2/2002 |
| JP | 2003242338 | 8/2003 |
| JP | 2004094702 | 3/2004 |
| WO | WO 92/12488 | 7/1992 |
| WO | WO 97/15023 | 4/1997 |
| WO | WO 01/18704 | 3/2001 |
| WO | WO 01/18728 | 3/2001 |
| WO | WO 01/17458 | 9/2001 |
| WO | WO 01/67210 | 9/2001 |
| WO | WO 01/91010 | 11/2001 |
| WO | WO 02/057967 | 7/2002 |
| WO | WO 03/083603 | 10/2003 |
| WO | WO 2004/008367 | 1/2004 |
| WO | WO 2008/110939 | 9/2008 |

OTHER PUBLICATIONS

Aizcorbe, Ana; Starr, Martha; Hickman, James. T. "Vehicle purchases, leasing, and replacement demand: evidence from the Federal Reserve's Survey of Consumer Finances"; Apr. 1, 2004.

Alvarez et al., "The Development of an Expert System for Credit Control, Integrated with a Transactional Accounting System", AICA Annual Conference Proceedings, vol. 2, 1990, pp. 865-870.

Arend, M., "New Automated"Experts Ready for Lenders, ABA Bank Journal, Jan. 1992.

AutoExcavations web site from the Internet Archive, http://web.archive.org/web/20090206035139/http://autoexcavations.com/, captured Feb. 6, 2009.

Bulldog Marketing web site from the Internet Archive, http://web.archive.org/web/20091216052319/http://www.bdogm.com/Products.html, captured Dec. 16, 2009.

Clarke Jim, "Move Over ATM, Automated Loan Officer is Here," Associated Press, Times Advocate, 1995.

Danis et al., Issues and Concerns in Internet Based Financial Applications: An Example from an Auto Finance System. Proceedings of the 32nd Hawaii International Conference on System Sciences—1999.

Eisemann et al., "Sharp Dealer Practices Could Menance Bank Lenders", Journal of Retail Banking, vol. 15, No. 2, pp. 21-23. Summer 1993.

E-LEAD web site, www1.eleadcrm.com/fresh/elead_sales/products/golddigger.html, last modified Nov. 9, 2010.

Gazis, "Real Estate Investment Analysis System," IBM Technical Disclosure Bulletin, 04-71, Apr. 1, 1971, pp. 3274-3275.

Hart Peter E., "Syntel: An Architecture for Financial Applications," Innovative Applications of Artificial Intelligence, pp. 63-70 1989.

Hutson, "Analyst: An Advisor for Financial Analysis of Automobile Dealerships," Innovative Applications of Artificial Intelligence, Mar. 1989, pp. 27-42.

Kindle et al., "PFPS: Personal Financial Planning System," Innovative Applications of Artificial Intelligence, 1989, pp. 51-61.

Mortgageware Resource Guide, Release 5.4d, 1992, Chapter Get, QUA, Pro.

Morton, Fiona Scott et al. Internet Car Retailing. 34 pages. Sep. 2000.

Power, Richard, "A System for Assessing Credit-Worthiness", 8th International Workshop of Expert Systems & Their Applications, vol. 3, 1988, pp. 619.

ProspectVision web site from the Internet Archive, http://web.archive.org/web/20100606060554/http://prospectvision.com/products.asp, captured Jun. 6, 2006.

Reynolds and Reynolds, "Equity Calculator for ERA Contact Management," flyer from http://www.reyrey.com/solutions/era/internet_crm/eq_calc.asp, dated Oct. 20, 2008.

Rusnak, Raymond, "Consumer Credit-Scoring: Are There Lessons for Commercial Lenders?", Journal of Commercial Lending, vol. 76, No. 11, pp. 37-42, Jul. 1994.

Screen shots of 1992 Lotus 1-2-3 spreadsheet program in 4 pp.

Sivasankaran et al., "An Expert System for Analysis of Credit Profiles," The Journal of Computer Information Systems, vol. 30, No. 4, pp. 31-38, Summer 1990.

Tyson, David, "Interlinq Mortgage Software Hits Big:", American Banker, 1987, vol. 152, No. 226.

Vu, Hao, "Potential Applications of Artificial Intelligence and Expert Systems in Financial and Banking Institutions," Proceedings of the 2nd Annual Artificial Intelligence & Advanced Computer Technology Conference, pp. 28-33, May 1986.

Written Opinion of the International Preliminary Examining Authority for PCT/US2017/057048 dated Jan. 24, 2019.

U.S. Appl. No. 61/155,388, filed Feb. 25, 2009, Colson.

"Replacing Vehicle on Existing Policy," Webpp. printout from https://www.weimerover.com/autoreplace-vehicle.php, printed Sep. 1, 2011.

"Reynolds and Reynolds Introduces New Tools to Help Dealers Make Most of Vehicle Value Data," article from www.thefreelibrary.com/_/print/PrintArticle.aspx?id=155431488, dated Dec. 4, 2006.

DealerSocket MoneyMaker web site from the Internet Archive, http://web.archive.org/web/20110703215521/http://www.dealersocket.com/dsdev/products/money-maker, captured Jul. 3, 2011.

(56) References Cited

OTHER PUBLICATIONS

DealerWizard web site from the Internet Archive, http://web.archive.org/web/20101217225909/http://dealerwizard.com/publicFiles/faq.htm, captured Dec. 17, 2010.
OneCommand web site from the Internet Archive, http://web.archive.org/web/20110128200926/http://www.onecommand.com/solutions/index.php, captured Jan. 28, 2011.
Warner, Boyd H., "AutoAlert® for New Dealerships," Presentation to Potential Customers, created Apr. 2, 2007.
Xtream web site from the Internet Archive, http://web.archive.org/web/20100112093637/http://www.xtreamsales.com, captured Jan. 12, 2010.
"Answer to Second Amended Complaint," *AutoAlert v. Dominion Dealer Solutions et al.*, Case No. 8:12-CV-01661 (U.S. District Court for the Central District of California), filed Mar. 31, 2014.
"Appendix A to AutoAlert, Inc.'s Corrected Opening Claim Construction Brief," *AutoAlert v. DealerSocket*, Case No. 8:13-CV-00657 (U.S. District Court for the Central District of California), filed Apr. 14, 2014.
"Appendix A to AutoAlert, Inc.'s Updated Opening Claim Construction Brief," *AutoAlert v. DealerSocket*, Case No. 8:13-CV-00657 (U.S. District Court for the Central District of California), filed Apr. 21, 2014.
"Appendix A to AutoAlert's Opening Brief on Claim Construction," *AutoAlert v. Dominion*, Case No. 8:12-CV-01661 (U.S. District Court for the Central District of California), filed Jul. 31, 2014.
"AutoAlert, Inc.'s Answer to Dominion Dealer Solutions, LLC's Amended Counterclaims," *AutoAlert v. Dominion Dealer Solutions et al.*, Case No. 8:12-CV-01661 (U.S. District Court for the Central District of California), filed Mar. 14, 2014.
"AutoAlert, Inc.'s Corrected Opening Claim Construction Brief," *AutoAlert v. DealerSocket*, Case No. 8:13-CV-00657 (U.S. District Court for the Central District of California), filed Apr. 14, 2014.
"AutoAlert, Inc.'s Notice of Motion and Motion for Preliminary Injunction," *AutoAlert v. DealerSocket*, Case No. 8:13-CV-00657 (U.S. District Court for the Central District of California), filed Sep. 13, 2013.
"AutoAlert, Inc.'s Preliminary Response to Petition," *Dominion Dealer Solutions v. AutoAlert*, Case No. IPR2013-00220 (USPTO Patent Trial and Appeal Board), Paper 7, filed Jul. 3, 2013.
"AutoAlert, Inc.'s Preliminary Response to Petition," *Dominion Dealer Solutions v. AutoAlert*, Case No. IPR2013-00222 (USPTO Patent Trial and Appeal Board), Paper 11, filed Jul. 3, 2013.
"AutoAlert, Inc.'s Preliminary Response to Petition," *Dominion Dealer Solutions v. AutoAlert*, Case No. IPR2013-00223 (USPTO Patent Trial and Appeal Board), Paper 8, filed Jul. 3, 2013.
"AutoAlert, Inc.'s Preliminary Response to Petition," *Dominion Dealer Solutions v. AutoAlert*, Case No. IPR2013-00224 (USPTO Patent Trial and Appeal Board), Paper 9, filed Jul. 3, 2013.
"AutoAlert, Inc.'s Preliminary Response to Petition," *Dominion Dealer Solutions v. AutoAlert*, Case No. IPR2013-00225 (USPTO Patent Trial and Appeal Board), Paper 9, filed Jul. 3, 2013.
"AutoAlert, Inc.'s Reply Brief on Claim Construction," *AutoAlert v. DealerSocket*, Case No. 8:13-CV-00657 (U.S. District Court for the Central District of California), filed May 19, 2014.
"AutoAlert, Inc.'s Reply in Support of Its Motion for Preliminary Injunction," *AutoAlert v. DealerSocket*, Case No. 8:13-CV-00657 (U.S. District Court for the Central District of California), filed Dec. 16, 2013.
"AutoAlert, Inc.'s Updated Opening Claim Construction Brief," *AutoAlert v. DealerSocket*, Case No. 8:13-CV-00657 (U.S. District Court for the Central District of California), filed Apr. 21, 2014.
"AutoAlert, LLC's Opposition to 110 Reynolds, LLC's Motion for Summary Judgment or, in Alternative, Partial Summary Judgment, of Invalidity under 35 USC 112 for Indefiniteness," *AutoAlert v. Dominion*, Case No. 8:12-CV-01661 (U.S. District Court for the Central District of California), filed Sep. 5, 2014.
"AutoAlert, LLC's Opposition to Autobase, Inc.'s Motion for Summary Judgment of Invalidity Under 35 U.S.C. 101 for Lack of Patent Eligibility," *AutoAlert v. Dominion*, Case No. 8:12-CV-01661 (U.S. District Court for the Central District of California), filed Nov. 14, 2014.
"AutoAlert, LLC's Patent Owner Response," *DealerSocket v. AutoAlert*, Case No. CBM2014-00132 (USPTO Patent Trial and Appeal Board), Paper 21, filed Dec. 29, 2014.
"AutoAlert, LLC's Patent Owner Response," *DealerSocket v. AutoAlert*, Case No. CBM2014-00146 (USPTO Patent Trial and Appeal Board), Paper 25, filed Feb. 9, 2015.
"AutoAlert, LLC's Patent Owner Response," *DealerSocket v. AutoAlert*, Case No. CBM2014-00201 (USPTO Patent Trial and Appeal Board), Paper 16, filed Apr. 13, 2015.
"AutoAlert, LLC's Patent Owner's Response," *DealerSocket v. AutoAlert*, Case No. CBM2014-00202 (USPTO Patent Trial and Appeal Board), Paper 16, filed Apr. 13, 2015.
"AutoAlert, LLC's Statement of Genuine Disputes in Opposition to Autobase, Inc.'s Motion for Summary Judgment of Invalidity Under 35 U.S.C. 101 for Lack of Patent Eligibility," *AutoAlert v. Dominion*, Case No. 8:12-CV-01661 (U.S. District Court for the Central District of California), filed Nov. 14, 2014.
"AutoAlert's Opening Brief on Claim Construction," *AutoAlert v. Dominion*, Case No. 8:12-CV-01661 (U.S. District Court for the Central District of California), filed Jul. 31, 2014.
"AutoAlert's Responsive Brief on Claim Construction," *AutoAlert v. Dominion*, Case No. 8:12-CV-01661 (U.S. District Court for the Central District of California), filed Aug. 14, 2014.
"Corrected and Amended Petition for Covered Business Method Patent Review of U.S. Pat. No. 7,827,099," *DealerSocket v. AutoAlert*, Case No. CBM2014-00142 (USPTO Patent Trial and Appeal Board), Paper 6, filed Aug. 29, 2014.
"Corrected Motion to Terminate Proceeding," *DealerSocket v. AutoAlert*, Case No. CBM2014-00132 (USPTO Patent Trial and Appeal Board), Paper 39, filed May 22, 2015.
"Corrected Petition for Covered Business Method Patent Review of U.S. Pat. No. 8,005,752," *DealerSocket v. AutoAlert*, Case No. CBM2014-00147 (USPTO Patent Trial and Appeal Board), Paper 6, filed Sep. 2, 2014.
"Corrected Petition for Covered Business Method Patent Review of U.S. Pat. No. 8,086,529," *DealerSocket v. AutoAlert*, Case No. CBM2014-00146 (USPTO Patent Trial and Appeal Board), Paper 4, filed Jul. 2, 2014.
"DealerSocket, Inc.'s Amended Preliminary Election of Asserted Prior Art," *AutoAlert v. DealerSocket*, Case No. 8:13-CV-00657 (U.S. District Court for the Central District of California), served Jul. 16, 2014.
"DealerSocket, Inc.'s Answer to AutoAlert, Inc.'s First Amended Complaint; and Counterclaims," *AutoAlert v. DealerSocket*, Case No. 8:13-CV-00657 (U.S. District Court for the Central District of California), filed Dec. 5, 2013.
"DealerSocket, Inc.'s Opposition to AutoAlert, Inc.'s Motion for Preliminary Injunction," *AutoAlert v. DealerSocket*, Case No. 8:13-CV-00657 (U.S. District Court for the Central District of California), filed Dec. 2, 2013.
"DealerSocket, Inc.'s Responsive Claim Construction Brief," *AutoAlert v. DealerSocket*, Case No. 8:13-CV-00657 (U.S. District Court for the Central District of California), filed May 5, 2014.
"Decision Denying Institution of Inter Partes Review," *Dominion Dealer Solutions v. AutoAlert*, Case No. IPR2013-00220 (USPTO Patent Trial and Appeal Board), Paper 8, filed Aug. 15, 2013.
"Decision Denying Institution of Inter Partes Review," *Dominion Dealer Solutions v. AutoAlert*, Case No. IPR2013-00222 (USPTO Patent Trial and Appeal Board), Paper 12, filed Aug. 12, 2013.
"Decision Denying Institution of Inter Partes Review," *Dominion Dealer Solutions v. AutoAlert*, Case No. IPR2013-00223 (USPTO Patent Trial and Appeal Board), Paper 9, filed Aug. 15, 2013.
"Decision Denying Institution of Inter Partes Review," *Dominion Dealer Solutions v. AutoAlert*, Case No. IPR2013-00224 (USPTO Patent Trial and Appeal Board), Paper 10, filed Aug. 15, 2013.
"Decision Denying Institution of Inter Partes Review," *Dominion Dealer Solutions v. AutoAlert*, Case No. IPR2013-00225 (USPTO Patent Trial and Appeal Board), Paper 10, filed Aug. 15, 2013.

(56) References Cited

OTHER PUBLICATIONS

"Decision Denying Request for Rehearing," *Dominion Dealer Solutions* v. *AutoAlert*, Case No. IPR2013-00220 (USPTO Patent Trial and Appeal Board), Paper 13, filed Oct. 10, 2013.
"Decision Denying Request for Rehearing," *Dominion Dealer Solutions* v. *AutoAlert*, Case No. IPR2013-00222 (USPTO Patent Trial and Appeal Board), Paper 17, filed Oct. 10, 2013.
"Decision Denying Request for Rehearing," *Dominion Dealer Solutions* v. *AutoAlert*, Case No. IPR2013-00223 (USPTO Patent Trial and Appeal Board), Paper 14, filed Oct. 10, 2013.
"Decision Denying Request for Rehearing," *Dominion Dealer Solutions* . *AutoAlert*, Case No. IPR2013-00224 (USPTO Patent Trial and Appeal Board), Paper 15, filed Oct. 10, 2013.
"Decision Denying Request for Rehearing," *Dominion Dealer Solutions* v. *AutoAlert*, Case No. IPR2013-00225 (USPTO Patent Trial and Appeal Board), Paper 15, filed Oct. 10, 2013.
"Decision: Institution of Covered Business Method Patent Review," *DealerSocket* v. *AutoAlert*, Case No. CBM2014-00132 (USPTO Patent Trial and Appeal Board), Paper 11, filed Oct. 29, 2014.
"Decision: Institution of Covered Business Method Patent Review," *DealerSocket* v. *AutoAlert*, Case No. CBM2014-00139 (USPTO Patent Trial and Appeal Board), Paper 12, filed Oct. 23, 2014.
"Decision: Institution of Covered Business Method Patent Review," *DealerSocket* v. *AutoAlert*, Case No. CBM2014-00146 (USPTO Patent Trial and Appeal Board), Paper 19, filed Dec. 9, 2014.
"Decision: Institution of Inter Partes Review," *Dominion Dealer Solutions* v. *AutoAlert*, Case No. IPR2014-00684 (USPTO Patent Trial and Appeal Board), Paper 9, filed Oct. 6, 2014.
"Declaration of Dr. Jaime G. Carbonell in Support of AutoAlert, LLC's Patent Owner Response," *DealerSocket* v. *AutoAlert*, Case No. CBM2014-00146 (USPTO Patent Trial and Appeal Board), Exhibit 2005, filed Feb. 9, 2015.
"Declaration of Dr. Jaime G. Carbonell in Support of AutoAlert, LLC's Patent Owner's Response," *DealerSocket* v. *AutoAlert*, Case No. CBM2014-00132 (USPTO Patent Trial and Appeal Board), Exhibit 2004, filed Dec. 29, 2014.
"Declaration of Jaime G. Carbonell in Support of AutoAlert, LLC's Patent Owner's Response," *DealerSocket* v. *AutoAlert*, Case No. CBM2014-00202 (USPTO Patent Trial and Appeal Board), Exhibit 2004, filed Apr. 13, 2015.
"Declaration of Jaime G. Carbonell in Support of AutoAlert, LLC's Patent Owner's Response," *Dominion Dealer Solutions* v. *AutoAlert*, Case No. CBM2014-00139 (USPTO Patent Trial and Appeal Board), Exhibit 2004, filed Dec. 22, 2014.
"Declaration of Jaime G. Carbonell in Support of AutoAlert, LLC's Patent Owner's Response," *Dominion Dealer Solutions* v. *AutoAlert*, Case No. IPR2014-00684 (USPTO Patent Trial and Appeal Board), Exhibit 2004, filed Dec. 22, 2014.
"Declaration of Jaime G. Carbonell in Support ofAutoAlert, LLC's Patent Owner Response," *DealerSocket* v. *AutoAlert*, Case No. CBM2014-00201 (USPTO Patent Trial and Appeal Board), Exhibit 2004, filed Apr. 13, 2015.
"Declaration of James Maxwell in Support of AutoAlert, LLC's Patent Owner's Response," *Dominion Dealer Solutions* v. *AutoAlert*, Case No. IPR2014-00684 (USPTO Patent Trial and Appeal Board), Exhibit 2009, filed Dec. 22, 2014.
"Declaration of Michael Brairton in Support of AutoAlert, LLC's Patent Owner's Response," *Dominion Dealer Solutions* v. *AutoAlert*, Case No. IPR2014-00684 (USPTO Patent Trial and Appeal Board), Exhibit 2007, filed Dec. 22, 2014.
"Docket Entries," *DealerSocket* v. *AutoAlert*, Case No. CBM2014-00132 (USPTO Patent Trial and Appeal Board), retrieved Jan. 15, 2014.
"Docket Entries," *DealerSocket* v. *AutoAlert*, Case No. CBM2014-00132 (USPTO Patent Trial and Appeal Board), retrieved Jun. 15, 2015.
"Docket Entries," *DealerSocket* v. *AutoAlert*, Case No. CBM2014-00132 (USPTO Patent Trial and Appeal Board), retrieved Oct. 6, 2014.
"Docket Entries," *DealerSocket* v. *AutoAlert*, Case No. CBM2014-00139 (USPTO Patent Trial and Appeal Board), retrieved Dec. 29, 2014.
"Docket Entries," *DealerSocket* v. *AutoAlert*, Case No. CBM2014-00139 (USPTO Patent Trial and Appeal Board), retrieved Jun. 15, 2015.
"Docket Entries," *DealerSocket* v. *AutoAlert*, Case No. CBM2014-00139 (USPTO Patent Trial and Appeal Board), retrieved Oct. 6, 2014.
"Docket Entries," *DealerSocket* v. *AutoAlert*, Case No. CBM2014-00142 (USPTO Patent Trial and Appeal Board), retrieved Oct. 6, 2014.
"Docket Entries," *DealerSocket* v. *AutoAlert*, Case No. CBM2014-00146 (USPTO Patent Trial and Appeal Board), retrieved Dec. 29, 2014.
"Docket Entries," *DealerSocket* v. *AutoAlert*, Case No. CBM2014-00146 (USPTO Patent Trial and Appeal Board), retrieved Jun. 15, 2015.
"Docket Entries," *DealerSocket* v. *AutoAlert*, Case No. CBM2014-00146 (USPTO Patent Trial and Appeal Board), retrieved Oct. 6, 2014.
"Docket Entries," *DealerSocket* v. *AutoAlert*, Case No. CBM2014-00147 (USPTO Patent Trial and Appeal Board), retrieved Oct. 6, 2014.
"Docket Entries," *DealerSocket* v. *AutoAlert*, Case No. CBM2014-00201 (USPTO Patent Trial and Appeal Board), retrieved Jan. 15, 2014.
"Docket Entries," *DealerSocket* v. *AutoAlert*, Case No. CBM2014-00201 (USPTO Patent Trial and Appeal Board), retrieved Jun. 15, 2015.
"Docket Entries," *DealerSocket* v. *AutoAlert*, Case No. CBM2014-00201 (USPTO Patent Trial and Appeal Board), retrieved Oct. 6, 2014.
"Docket Entries," *DealerSocket* v. *AutoAlert*, Case No. CBM2014-00202 (USPTO Patent Trial and Appeal Board), retrieved Jan. 15, 2014.
"Docket Entries," *DealerSocket* v. *AutoAlert*, Case No. CBM2014-00202 (USPTO Patent Trial and Appeal Board), retrieved Jun. 15, 2015.
"Docket Entries," *DealerSocket* v. *AutoAlert*, Case No. CBM2014-00202 (USPTO Patent Trial and Appeal Board), retrieved Oct. 6, 2014.
"Docket Entries," *DealerSocket* v. *AutoAlert*, Case No. CBM2014-00203 (USPTO Patent Trial and Appeal Board), retrieved Jan. 15, 2014.
"Docket Entries," *DealerSocket* v. *AutoAlert*, Case No. CBM2014-00203 (USPTO Patent Trial and Appeal Board), retrieved Jun. 15, 2015.
"Docket Entries," *DealerSocket* v. *AutoAlert*, Case No. CBM2014-00203 (USPTO Patent Trial and Appeal Board), retrieved Oct. 6, 2014.
"Docket Entries," *Dominion Dealer Solutions* v. *AutoAlert*, Case No. IPR2013-00220 (USPTO Patent Trial and Appeal Board), retrieved May 16, 2014.
"Docket Entries," *Dominion Dealer Solutions* v. *AutoAlert*, Case No. IPR2013-00222 (USPTO Patent Trial and Appeal Board), retrieved May 16, 2014.
"Docket Entries," *Dominion Dealer Solutions* v. *AutoAlert*, Case No. IPR2013-00223 (USPTO Patent Trial and Appeal Board), retrieved May 16, 2014.
"Docket Entries," *Dominion Dealer Solutions* v. *AutoAlert*, Case No. IPR2013-00224 (USPTO Patent Trial and Appeal Board), retrieved May 16, 2014.
"Docket Entries," *Dominion Dealer Solutions* v. *AutoAlert*, Case No. IPR2013-00225 (USPTO Patent Trial and Appeal Board), retrieved May 16, 2014.
"Docket Entries," *Dominion Dealer Solutions* v. *AutoAlert*, Case No. IPR2014-00684 (USPTO Patent Trial and Appeal Board), retrieved Dec. 29, 2014.
"Docket Entries," *Dominion Dealer Solutions* v. *AutoAlert*, Case No. IPR2014-00684 (USPTO Patent Trial and Appeal Board), retrieved Jun. 15, 2015.

(56) References Cited

OTHER PUBLICATIONS

"Docket Entries," *Dominion Dealer Solutions* v. *AutoAlert*, Case No. IPR2014-00684 (USPTO Patent Trial and Appeal Board), retrieved May 16, 2014.
"Docket Entries," *Dominion Dealer Solutions* v. *AutoAlert*, Case No. IPR2014-00684 (USPTO Patent Trial and Appeal Board), retrieved Oct. 9, 2014.
"Docket Report," *AutoAlert* v. *DealerSocket Inc.*, Case No. 8:13-CV-00657 (U.S. District Court for the Central District of California), retrieved Jun. 15, 2015.
"Docket Report," *AutoAlert* v. *DealerSocket*, Case No. 8:13-CV-00657 (U.S. District Court for the Central District of California), retrieved Dec. 26, 2014.
"Docket Report," *AutoAlert* v. *DealerSocket*, Case No. 8:13-CV-00657 (U.S. District Court for the Central District of California), retrieved May 9, 2014.
"Docket Report," *AutoAlert* v. *Dominion Dealer Solutions et al.*, Case No. 8:12-CV-01661 (U.S. District Court for the Central District of California), retrieved Dec. 26, 2014.
"Docket Report," *AutoAlert* v. *Dominion Dealer Solutions et al.*, Case No. 8:12-CV-01661 (U.S. District Court for the Central District of California), retrieved Jun. 15, 2015.
"Docket Report," *AutoAlert* v. *Dominion Dealer Solutions et al.*, Case No. 8:12-CV-01661 (U.S. District Court for the Central District of California), retrieved May 9, 2014.
"Docket Report," *AutoAlert* v. *Dominion Dealer Solutions et al.*, Case No. 8:12-CV-01661 (U.S. District Court for the Central District of California), retrieved Oct. 6, 2014.
"Docket Report," *Dominion Dealer Solutions, LLC* v. *Michelle K. Lee (Director of the USPTO)*, Case No. 3:13-CV-00699 (U.S. District Court for the Eastern District of Virginia), retrieved May 15, 2014.
"Docket," In re Dominion Dealer Solutions, LLC, Case No. 14-109 (U.S. Court of Appeals for the Federal Circuit), retrieved May 15, 2014.
"Dominion Dealer Solutions, LLC's Second Amended Counterclaims for Declaratory Judgment," *AutoAlert* v. *Dominion Dealer Solutions et al.*, Case No. 8:12-CV-01661 (U.S. District Court for the Central District of California), filed Mar. 31, 2014.
"Dominion Defendants' Joint Opening Brief on Claim Construction," *AutoAlert* v. *Dominion*, Case No. 8:12-CV-01661 (U.S. District Court for the Central District of California), filed Jul. 31, 2014.
"Dominion Defendants' Joint Responsive Brief on Claim Construction," *AutoAlert* v. *Dominion*, Case No. 8:12-CV-01661 (U.S. District Court for the Central District of California), filed Aug. 14, 2014.
"First Amended Complaint for Patent Infringement," *AutoAlert* v. *DealerSocket*, Case No. 8:13-CV-00657 (U.S. District Court for the Central District of California), filed Nov. 21, 2013.
"Institution of Covered Business Method Patent Review," *DealerSocket* v. *AutoAlert*, Case No. CBM2014-00201 (USPTO Patent Trial and Appeal Board), Paper 11, entered Feb. 17, 2015.
"Institution of Covered Business Method Review," *DealerSocket* v. *AutoAlert*, Case No. CBM2014-00202 (USPTO Patent Trial and Appeal Board), Paper 11, entered Feb. 17, 2015.
"Institution of Covered Business Method Review," *DealerSocket* v. *AutoAlert*, Case No. CBM2014-00203 (USPTO Patent Trial and Appeal Board), Paper 11, entered Apr. 2, 2015.
International Search Report and Written Opinion dated Mar. 19, 2018 for PCT/US2017/057048 in 24 pages.
"Joint Motion to Terminate Inter Partes Review," *Dominion Dealer Solutions* v. *AutoAlert*, Case No. IPR2014-00684 (USPTO Patent Trial and Appeal Board), Paper 26, filed Mar. 11, 2015.
"Judgment: Termination of Proceeding After Institution," *DealerSocket* v. *AutoAlert*, Case No. CBM2014-00132 (USPTO Patent Trial and Appeal Board), Paper 41, entered May 28, 2015.
"Judgment: Termination of Proceeding After Institution," *DealerSocket* v. *AutoAlert*, Case No. CBM2014-00139 (USPTO Patent Trial and Appeal Board), Paper 42, entered May 28, 2015.
"Judgment: Termination of Proceeding After Institution," *DealerSocket* v. *AutoAlert*, Case No. CBM2014-00146 (USPTO Patent Trial and Appeal Board), Paper 40, entered May 28, 2015.
"Judgment: Termination of Proceeding After Institution," *DealerSocket* v. *AutoAlert*, Case No. CBM2014-00201 (USPTO Patent Trial and Appeal Board), Paper 26, entered May 28, 2015.
"Judgment: Termination of Proceeding After Institution," *DealerSocket* v. *AutoAlert*, Case No. CBM2014-00202 (USPTO Patent Trial and Appeal Board), Paper 26, entered May 28, 2015.
"Judgment: Termination of Proceeding After Institution," *DealerSocket* v. *AutoAlert*, Case No. CBM2014-00203 (USPTO Patent Trial and Appeal Board), Paper 21, entered May 28, 2015.
"Judgment: Termination of Proceeding," *Dominion Dealer Solutions* v. *AutoAlert*, Case No. IPR2014-00684 (USPTO Patent Trial and Appeal Board), Paper 28, entered Mar. 16, 2015.
"Leasing versus Buying That New Car," Web pp. printout from http://www.infoplease.com/ipa/A0193143.html, printed on Sep. 1, 2011.
"Memorandum in Support of Autobase's Motion for Summary Judgment of Invalidity Under 35 U.S.C. 101 for Lack of Patent Eligibility," *AutoAlert* v. *Dominion*, Case No. 8:12-CV-01661 (U.S. District Court for the Central District of California), filed Oct. 31, 2014.
"Memorandum in Support of Motion of 110 Reynolds, LLC for Summary Judgment or, in the Alternative, for Partial Summary Judgment, of Invalidity under 35 USC 112 for Indefiniteness," *AutoAlert* v. *Dominion*, Case No. 8:12-CV-01661 (U.S. District Court for the Central District of California), filed Aug. 12, 2014.
"Memorandum of Points and Authorities in Support of Plaintiff AutoAlert, Inc.'s Motion for Preliminary Injunction," *AutoAlert* v. *DealerSocket*, Case No. 8:13-CV-00657 (U.S. District Court for the Central District of California), filed Sep. 13, 2013.
"Minute Order in Chambers: Order on Claim Construction," *AutoAlert* v. *Dominion*, Case No. 8:12-CV-01661 (U.S. District Court for the Central District of California), filed Dec. 23, 2014.
"Order Construing Claim Terms Following Markman Hearing," *AutoAlert* v. *DealerSocket*, Case No. 8:13-CV-00657 (U.S. District Court for the Central District of California), filed Jun. 18, 2014.
"Order Denying 110 Reynolds, LLC's Motion for Summary Judgment (Doc. 83)," *AutoAlert* v. *Dominion*, Case No. 8:12-CV-01661 (U.S. District Court for the Central District of California), filed Dec. 23, 2014.
"Order Granting Autobase's Motion for Summary Judgment," *AutoAlert* v. *Dominion*, Case No. 8:12-CV-01661 (U.S. District Court for the Central District of California), filed Dec. 23, 2014.
"Order Granting Voluntary Dismissal With Prejudice," *AutoAlert* v. *Dominion Dealer Solutions et al.*, Case No. 8:12-CV-01661 (U.S. District Court for the Central District of California), entered Mar. 6, 2015.
"Order of Voluntary Dismissal of Entire Action with Prejudice," *AutoAlert* v. *DealerSocket, Inc.*, Case No. 8:13-CV-0657 (U.S. District Court for the Central District of California), entered May 15, 2015.
"Order: Late Filing and Dismissal of Petition," *DealerSocket* v. *AutoAlert*, Case No. CBM2014-00142 (USPTO Patent Trial and Appeal Board), Paper 10, filed Sep. 8, 2014.
"Order: Late Filing and Dismissal of Petition," *DealerSocket* v. *AutoAlert*, Case No. CBM2014-00147 (USPTO Patent Trial and Appeal Board), Paper 8, filed Sep. 8, 2014.
"Patent Owner AutoAlert LLC's Preliminary Response," *DealerSocket* v. *AutoAlert*, Case No. CBM2014-00132 (USPTO Patent Trial and Appeal Board), Paper 6, filed Aug. 29, 2014.
"Patent Owner AutoAlert LLC's Preliminary Response," *DealerSocket* v. *AutoAlert*, Case No. CBM2014-00139 (USPTO Patent Trial and Appeal Board), Paper 8, filed Sep. 4, 2014.
"Patent Owner AutoAlert LLC's Preliminary Response," *DealerSocket* v. *AutoAlert*, Case No. CBM2014-00146 (USPTO Patent Trial and Appeal Board), Paper 8, filed Sep. 25, 2014.
"Patent Owner AutoAlert LLC's Response," *DealerSocket* v. *AutoAlert*, Case No. CBM2014-00139 (USPTO Patent Trial and Appeal Board), Paper 22, filed Dec. 22, 2014.

(56) References Cited

OTHER PUBLICATIONS

"Patent Owner's Preliminary Response," *Dominion Dealer Solutions* v. *AutoAlert*, Case No. IPR2014-00684 (USPTO Patent Trial and Appeal Board), Paper 8, filed Jul. 25, 2014.
"Patent Owner's Response Pursuant to 37 C.F.R. 42.120," *Dominion Dealer Solutions* v. *AutoAlert*, Case No. IPR2014-00684 (USPTO Patent Trial and Appeal Board), Paper 18, filed Dec. 22, 2014.
"Petition for Covered Business Method Patent Review of U.S. Pat. No. 7,827,099," *DealerSocket* v. *AutoAlert*, Case No. CBM2014-00201 (USPTO Patent Trial and Appeal Board), Paper 1, filed Sep. 26, 2014.
"Petition for Covered Business Method Patent Review of U.S. Pat. No. 7,827,099," *DealerSocket* v. *AutoAlert*, Case No. CBM2014-00202 (USPTO Patent Trial and Appeal Board), Paper 1, filed Sep. 26, 2014.
"Petition for Covered Business Method Patent Review of U.S. Pat. No. 8,005,752," *DealerSocket* v. *AutoAlert*, Case No. CBM2014-00203 (USPTO Patent Trial and Appeal Board), Paper 1, filed Sep. 26, 2014.
"Petition for Covered Business Method Patent Review of U.S. Pat. No. 8,095,461," *DealerSocket* v. *AutoAlert*, Case No. CBM2014-00132 (USPTO Patent Trial and Appeal Board), Paper 1, filed May 19, 2014.
"Petition for Covered Business Method Patent Review of U.S. Pat. No. 8,396,791," *DealerSocket* v. *AutoAlert*, Case No. CBM2014-00139 (USPTO Patent Trial and Appeal Board), Paper 1, filed May 26, 2014.
"Petition for Inter Partes Review," *Dominion Dealer Solutions* v. *AutoAlert*, Case No. IPR2013-00220 (USPTO Patent Trial and Appeal Board), Paper 1, filed Mar. 28, 2013.
"Petition for Inter Partes Review," *Dominion Dealer Solutions* v. *AutoAlert*, Case No. IPR2013-00222 (USPTO Patent Trial and Appeal Board), Paper 1, filed Mar. 28, 2013.
"Petition for Inter Partes Review," *Dominion Dealer Solutions* v. *AutoAlert*, Case No. IPR2013-00223 (USPTO Patent Trial and Appeal Board), Paper 1, filed Mar. 28, 2013.
"Petition for Inter Partes Review," *Dominion Dealer Solutions* v. *AutoAlert*, Case No. IPR2013-00224 (USPTO Patent Trial and Appeal Board), Paper 1, filed Mar. 28, 2013.
"Petition for Inter Partes Review," *Dominion Dealer Solutions* v. *AutoAlert*, Case No. IPR2013-00225 (USPTO Patent Trial and Appeal Board), Paper 1, filed Mar. 28, 2013.
"Petition for Inter Partes Review," *Dominion Dealer Solutions* v. *AutoAlert*, Case No. IPR2014-00684 (USPTO Patent Trial and Appeal Board), Paper 1, filed Apr. 23, 2014.
"Petitioner's and Patent Owner's Corrected Joint Motion to Terminate Proceeding," *DealerSocket* v. *AutoAlert*, Case No. CBM2014-00139 (USPTO Patent Trial and Appeal Board), Paper 40, filed May 22, 2015.
"Petitioner's and Patent Owner's Corrected Joint Motion to Terminate Proceeding," *DealerSocket* v. *AutoAlert*, Case No. CBM2014-00146 (USPTO Patent Trial and Appeal Board), Paper 38, filed May 22, 2015.
"Petitioner's and Patent Owner's Corrected Joint Motion to Terminate Proceeding," *DealerSocket* v. *AutoAlert*, Case No. CBM2014-00201 (USPTO Patent Trial and Appeal Board), Paper 24, filed May 22, 2015.
"Petitioner's and Patent Owner's Corrected Joint Motion to Terminate Proceeding," *DealerSocket* v. *AutoAlert*, Case No. CBM2014-00202 (USPTO Patent Trial and Appeal Board), Paper 24, filed May 22, 2015.
"Petitioner's and Patent Owner's Corrected Joint Motion to Terminate Proceeding," *DealerSocket* v. *AutoAlert*, Case No. CBM2014-00203 (USPTO Patent Trial and Appeal Board), Paper 19, filed May 22, 2015.
"Petitioner's Reply to Patent Owner's Response," *DealerSocket* v. *AutoAlert*, Case No. CBM2014-00132 (USPTO Patent Trial and Appeal Board), Paper 25, filed Mar. 2, 2015.

"Petitioner's Reply to Patent Owner's Response," *DealerSocket* v. *AutoAlert*, Case No. CBM2014-00139 (USPTO Patent Trial and Appeal Board), Paper 26, filed Feb. 23, 2015.
"Petitioner's Reply to Patent Owner's Response," *DealerSocket* v. *AutoAlert*, Case No. CBM2014-00146 (USPTO Patent Trial and Appeal Board), Paper 27, filed Apr. 8, 2015.
"Redacted Order Denying Plaintiff's Motion for Preliminary Injunction," *AutoAlert* v. *DealerSocket*, Case No. 8:13-CV-00657 (U.S. District Court for the Central District of California), filed Feb. 4, 2014.
"Reply in Support of Motion of 110 Reynolds, LLC for Summary Judgment or, in Alternative, Partial Summary Judgment, of Invalidity under 35 USC 112 for Indefiniteness," *AutoAlert* v. *Dominion*, Case No. 8:12-CV-01661 (U.S. District Court for the Central District of California), filed Sep. 12, 2014.
"Reply re Autobase's Motion for Summary Judgment of Invalidity Under 35 U.S.C. 101 for Lack of Patent Eligibility," *AutoAlert* v. *Dominion*, Case No. 8:12-CV-01661 (U.S. District Court for the Central District of California), filed Nov. 21, 2014.
"Second Amended Complaint for Patent Infringement," *AutoAlert* v. *Dominion Dealer Solutions et al.*, Case No. 8:12-CV-01661 (U.S. District Court for the Central District of California), filed Mar. 13, 2014.
"Statement of Undisputed Facts and Conclusions of Law in Support of Motion for Summary Judgment of Invalidity Under 35 U.S.C. 101 for Lack of Patent Eligibility," *AutoAlert* v. *Dominion*, Case No. 8:12-CV-01661 (U.S. District Court for the Central District of California), filed Oct. 31, 2014.
"Stipulated Voluntary Dismissal," *AutoAlert* v. *DealerSocket, Inc.*, Case No. 8:13-CV-0657 (U.S. District Court for the Central District of California), filed May 15, 2015.
"Stipulated Voluntary Dismissal," *AutoAlert* v. *Dominion Dealer Solutions et al.*, Case No. 8:12-CV-01661 (U.S. District Court for the Central District of California), filed Mar. 4, 2015.
"Transcript of the Deposition of Dominick A. Minotti Jr., Taken Dec. 9, 2014," *Dominion Dealer Solutions* v. *AutoAlert*, Case No. IPR2014-00684 (USPTO Patent Trial and Appeal Board), Exhibit 2016, filed Dec. 22, 2014.
Allan, "Declaration of Brian Allan in Opposition to AutoAlert, Inc.'s Motion for Preliminary Injunction," *AutoAlert* v. *DealerSocket*, Case No. 8:13-CV-00657 (U.S. District Court for the Central District of California), filed Nov. 18, 2013.
AutoAlert Complaint for Patent Infringement and Jury Demand versus DealerSocket, Inc., Case No. SACV13-00657, Apr. 25, 2013.
AutoAlert Complaint for Patent Infringement and Jury Demand versus Dominion Dealer Solutions et al., Case No. SACV12-01661, Oct. 1, 2012.
AutoAlert's Answer to Dominion's Counter Claims, Feb. 27, 2013.
AutoAlert's First Amended Complaint for Patent Infringement, Apr. 23, 2013.
Carbonell, "Declaration of Dr. Jamie G. Carbonell in Support of AutoAlert's Opening Brief on Claim Construction," *AutoAlert* v. *Dominion*, Case No. 8:12-CV-01661 (U.S. District Court for the Central District of California), filed Jul. 31, 2014.
Carbonell, "Declaration of Jamie G. Carbonell in Support of AutoAlert, Inc.'s Opening Claim Construction Brief," *AutoAlert* v. *DealerSocket*, Case No. 8:13-CV-00657 (U.S. District Court for the Central District of California), filed Apr. 14, 2014.
Codd, "Declaration of Brad Codd in Opposition to AutoAlert, Inc.'s Motion for Preliminary Injunction," *AutoAlert* v. *DealerSocket*, Case No. 8:13-CV-00657 (U.S. District Court for the Central District of California), filed Nov. 18, 2013.
Complaint for Patent Infringement, *AutoAlert* v. *Dominion Dealer Solutions*, filed Oct. 1, 2012.
Declaration of Ward Hanson in Support of Petitions for Inter Partes Review, Mar. 28, 2013.
Dominion et al.'s Answer to First Amended Complaint, May 10, 2013.
Dominion's Amended Counterclaims for Declaratory Judgment, May 10, 2013.
Dominion's Counterclaims for Declaratory Judgment, Feb. 8, 2013.
Fichter, "Declaration of Joshua Fichter in Opposition to AutoAlert, Inc.'s Motion for Preliminary Injunction," *AutoAlert* v. *DealerSocket*,

(56) References Cited

OTHER PUBLICATIONS

Case No. 8:13-CV-00657 (U.S. District Court for the Central District of California), filed Nov. 18, 2013.
Hanson Detailed Claim Charts for '099 Patent, Mar. 28, 2013.
Hanson Detailed Claim Charts for '461 Patent, Mar. 28, 2013.
Hanson Detailed Claim Charts for '529 Patent, Mar. 28, 2013.
Hanson Detailed Claim Charts for '752 Patent, Mar. 28, 2013.
Hanson Detailed Claim Charts for '791 Patent, Mar. 28, 2013.
Joint Answer from Dominion et al., Feb. 7, 2013.
List of Documents Considered by Ward Hanson for Declaration, Mar. 28, 2013.
Minotti, "Declaration of Dominick A. Minotti, Jr. in Support of 110 Reynolds, LLC's Motion for Summary Judgment of Indefiniteness," *AutoAlert* v. *Dominion*, Case No. 8:12-CV-01661 (U.S. District Court for the Central District of California), filed Aug. 12, 2014.
Minotti, "Declaration of Dominick A. Minotti, Jr. in Support of Dominion Defendants' Joint Responsive Claim Construction Brief," *AutoAlert* v. *DealerSocket*, Case No. 8:13-CV-00657 (U.S. District Court for the Central District of California), filed Aug. 12, 2014.
Paszek, "Deposition of Robert Paszek" (Redacted Transcript), *AutoAlert* v. *DealerSocket*, Case No. 8:13-CV-00657 (U.S. District Court for the Central District of California), Dec. 19, 2013.
Petition for Inter Partes Review of '099 Patent, filed Mar. 28, 2013.
Petition for Inter Partes Review of '461 Patent, filed Mar. 28, 2013.
Petition for Inter Partes Review of '529 Patent, filed Mar. 28, 2013.
Petition for Inter Partes Review of '752 Patent, filed Mar. 28, 2013.
Petition for Inter Partes Review of '791 Patent, filed Mar. 28, 2013.
Redacted and Unfiled Petition for Inter Partes Review of U.S. Pat. No. 7,827,099 (which was issued Nov. 2, 2010), received on Jan. 16, 2013.
Redacted and Unfiled Petition for Inter Partes Review of U.S. Pat. No. 7,827,099 (which was issued Nov. 2, 2010), unfiled as of Feb. 1, 2013.
Redacted and Unfiled Petition for Inter Partes Review of U.S. Pat. No. 8,005,752 (which was issued Aug. 23, 2011), received on Jan. 16, 2013.
Redacted and Unfiled Petition for Inter Partes Review of U.S. Pat. No. 8,005,752 (which was issued Aug. 23, 2011), unfiled as of Feb. 1, 2013.
Redacted and Unfiled Petition for Inter Partes Review of U.S. Pat. No. 8,086,529 (which was issued Dec. 27, 2011), received on Jan. 16, 2013.
Redacted and Unfiled Petition for Inter Partes Review of U.S. Pat. No. 8,086,529 (which was issued Dec. 27, 2011), unfiled as of Feb. 1, 2013.
Redacted and Unfiled Petition for Inter Partes Review of U.S. Pat. No. 8,095,461 (which was issued Dec. 27, 2011), received on Jan. 16, 2013.
Redacted and Unfiled Petition for Inter Partes Review of U.S. Pat. No. 8,095,461 (which was issued Dec. 27, 2011), unfiled as of Feb. 1, 2013.
Stapleton, "Declaration of Melody J. Stapleton in Support of DealerSocket, Inc.'s Responsive Claim Construction Brief," *AutoAlert* v. *DealerSocket*, Case No. 8:13-CV-00657 (U.S. District Court for the Central District of California), filed May 5, 2014.
Vancleave, "Declaration of Darren VanCleave in Opposition to AutoAlert, Inc.'s Motion for Preliminary Injunction," *AutoAlert* v. *DealerSocket*, Case No. 8:13-CV-00657 (U.S. District Court for the Central District of California), filed Nov. 18, 2013.
Wilson, "Declaration of David A. Wilson, Ph.D., in Opposition to AutoAlert, Inc.'s Motion for Preliminary Injunction," *AutoAlert* v. *DealerSocket*, Case No. 8:13-CV-00657 (U.S. District Court for the Central District of California), filed Nov. 18, 2013.
Wilson, "Second Declaration of David A. Wilson, Ph.D., in Opposition to AutoAlert, Inc.'s Motion for Preliminary Injunction," *AutoAlert* v. *DealerSocket*, Case No. 8:13-CV-00657 (U.S. District Court for the Central District of California), filed Jan. 6, 2014.

\* cited by examiner

POPULAR INVENTORY TRANSFORMATIONS

DELETES:
    StockID or Stock Number Empty or Null
    VIN Length <> 17 characters CHANGES:
    DateInInventory from DaysInInventory
    New / used Changes based on Mileage

Figure 20A

POPULAR SERVICE TRANSFORMATIONS

DELETES:
- RO_ID or RepairOrderID is Empty or Null
- CustomerID is Empty or Null
- VIN Length <> 17 or VIN is NULL
- CustomerLastName is Empty or NULL (No Cust!)
- OpenDate of RO > 12 Months CHANGES:
- Removal of ODD characters ([^\w\ @-])
- Cleanse of Phone Numbers (not enough digits)
- Trim VIN of spaces

VISUAL DISCOVERY TOOL FOR AUTOMOTIVE MANUFACTURERS, WITH NETWORK ENCRYPTION, DATA CONDITIONING, AND PREDICTION ENGINE

CROSS REFERENCE TO RELATED APPLICATIONS

This application is a continuation of U.S. patent application Ser. No. 15/786,540, filed Oct. 17, 2017, which claims the benefit of U.S. Provisional Application No. 62/409,824, filed Oct. 18, 2016, U.S. Provisional Application No. 62/443,633, filed Jan. 6, 2017, and U.S. Provisional Application No. 62/444,262, filed Jan. 9, 2017. The entire contents of the foregoing applications (including appendices) are hereby incorporated by reference for all that they contain and are made part of this specification.

BACKGROUND

Field

Original Equipment Manufacturers (such as automobile manufacturers), sometimes referred to as OEMs, have difficulty obtaining limited access to data from dealer management systems and planning to determine the likely effects of their actions on dealer databases and inventories. Automotive dealerships have problems with their computer systems relating to how data are transmitted, shared, and displayed. These computer issues create problems in addition to logistical difficulties related to other operations of the automotive manufacturers and dealerships.

Related Art

The problems described above persist, and some are made more acute by the use of inefficient computer processes and the flood of available data. Typically, OEMs are completely prevented from accessing automotive dealership data, for security and privacy purposes.

SUMMARY

This disclosure solves some of these problems, allows for greatly improved data conditioning, display, storage, prediction, manipulation, and transmission—while maintaining sufficient data privacy and security—leading to efficient solutions and improvement in OEM strategies and implementation.

BRIEF DESCRIPTION OF THE DRAWINGS

FIG. 6A illustrates an example list of alerts for which deal sheets could be generated.

FIG. 7A shows a portion of a "deal sheet" alerting a dealer to a sales opportunity for a candidate customer.

FIG. 20A shows example transformations to the inventory data category.

FIG. 20D shows example service transformations.

Figure 22B:
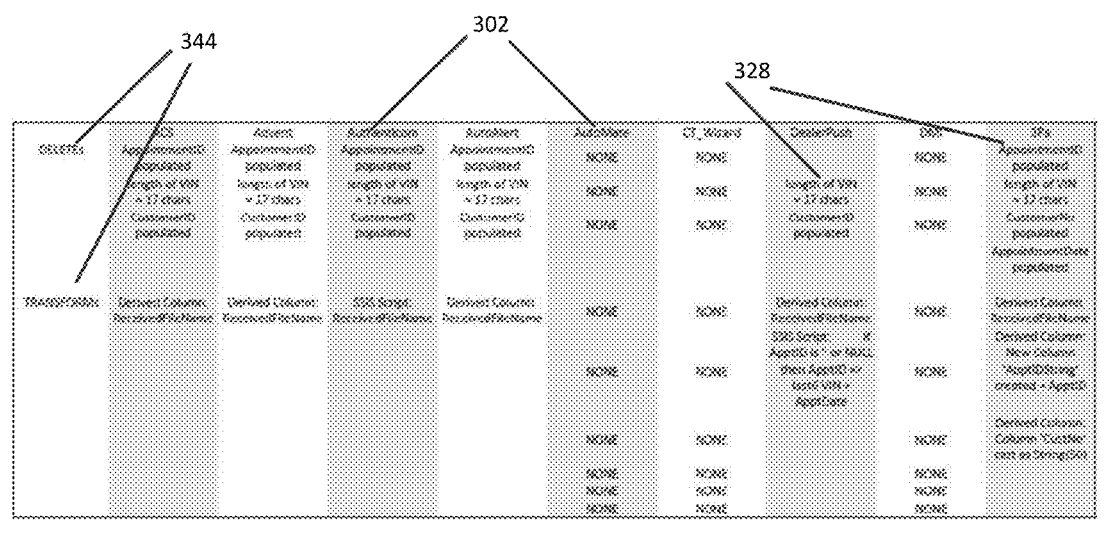

FIG. 22B illustrates a number of examples of data transformation conditions.

FIG. 26D shows a counters page.

FIG. 27 shows a dealer information report.

FIG. 28 shows an example display of records regarding an estimated and/or actual mileage (e.g., odometer) reading.

FIG. 29 shows an example set of records received by a dealer by the data conditioning system.

DETAILED DESCRIPTION

Figure 1:
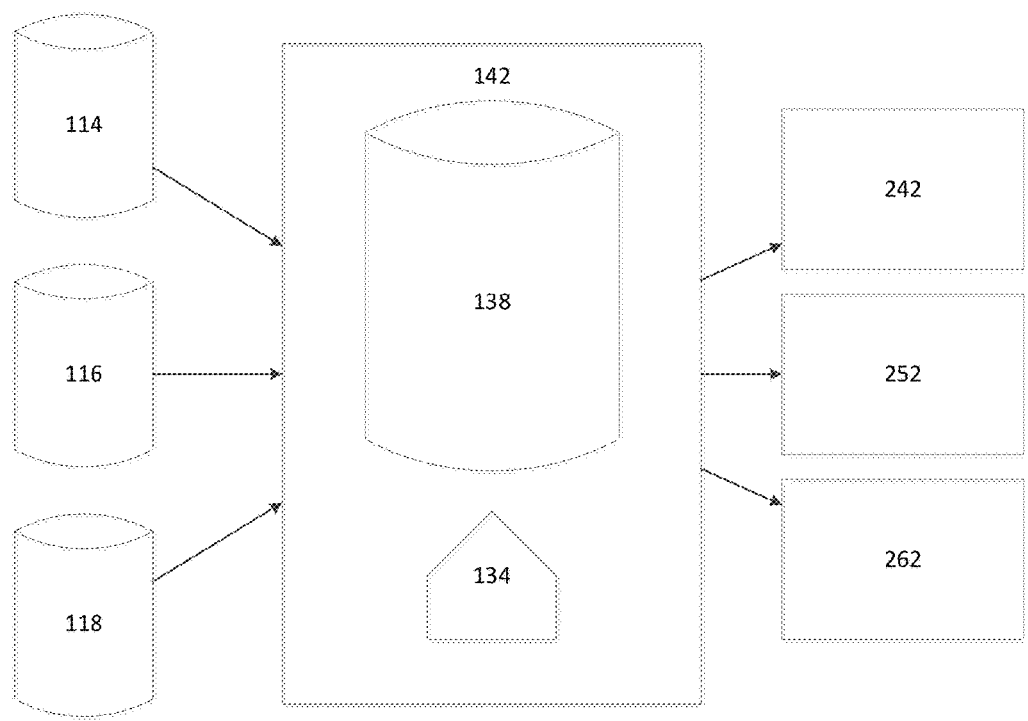
FIG. 1 shows a schematic view of hardware and other systems for data conditioning and visualization.

Original Equipment Manufacturers ("OEMs") in the automotive industry have several technical problems in dealing with their many independently-owned dealerships, arising from ineffective data processing, ineffective security, and lack of analytical tools, among other problems. Automotive dealerships also have related problems. Dealerships legitimately wish to maintain some independence from the OEMs and provide customers some level of privacy and security relating to data maintained by the dealership. However, it is in the interest of the OEM, the dealership, and ultimately the automotive customers and prospects, to use the data effectively but securely.

Auto dealerships started tracking and archiving data on their computer systems many years ago, but the amount of data became very large and unwieldy. The amount of stored data impacts the network and system resources, not only of automotive dealerships, but also any third-party vendors that assist the dealerships in storing, accessing, and using their data. Typical dealerships use a "Dealer Management System" or "DMS" for this and other purposes.

However, even with the help of a sophisticated DMS, when automotive dealerships tried to search within their vast data archives, the system resources were strained by the number of search results, and the results were not high quality. For example, searching contained redundancies, incorrect results, and useless entries—whether the searches were performed for parts and service orders, for maintenance, for sales, for marketing, or for other purposes. In one example, a search initiated to find candidates for repair coupons may have been sent to owners of vehicles that were too new to require any repairs or for leased vehicles that were about to be returned. Such poor quality search result problems are compounded by the independent decisions by automotive dealerships to contract with different DMS providers, making it difficult or impossible for an OEM to standardize access to information from its dealers, if the dealers are even willing to grant permission to the OEM to access their customer data for any purpose. For example, some dealers choose to locate their databases on site, some choose remote locations. Some use cloud storage for accessibility and backup reasons, and some locate their servers and data onsite to maintain greater security and control. Some allow access through encrypted channels, while others maintain security differently. Some rely on third party vendors, while others prefer to maintain their own information technology (or "IT") staff. Thus, the great diversity in modes of data storage, access, maintenance, use, formatting, and volume, as well as trust among the various automotive entities, leads to inefficiencies and difficulties for searching and analysis using OEM and dealership data.

The great diversity in database management, access, and usage described above exists even between automotive dealerships that partner with a common OEM. However, the complexity and diversity described is further compounded for dealerships that work with multiple OEMs. Further complexity arises from the need to share data maintained by dealerships not only within the dealership, but with an OEM, with potential lenders, and with third party vendors (including the DMS vendor, if applicable) such as vendors that supply customer relationship management (or "CRM") software and services. Such sharing can result in a need for translation into multiple data formats, multiple layers of security restrictions, etc. Automotive dealerships would hypothetically be in favor of sharing data, but they were concerned about third parties (including OEMs) taking their data and potentially making customers upset by failing to protect personal information or by otherwise troubling customers (e.g., with too much advertising or cross-selling through unwanted emails or calls). Thus, numerous technical problems exist with data management, data usage, data access, system resources, and data usage perspective in the automotive dealership context.

The systems and methods described further herein address these and additional problems, e.g., in the automotive data industry. Some of the solutions allow access to DMS data on a limited basis—aggregate, but not granular access (to OEMs, for example). Some solutions refine the data and searching results by comparing result pools automatically and iteratively. Some solutions establish constraints on OEM access by customizing an interface for the user, providing secondary and limited data access, using unique user identifiers and/or geography-specific constraints, and establishing a high level of security with firewalls and other restriction approaches by default, absent specific grant of access. The following discussion includes figures to assist in illustrating the non-limiting examples discussed.

FIG. 1 shows a schematic view of hardware and other systems that can help resolve the problems discussed above. These systems may use or involve SQL Server Integration Services (SSIS) systems. A data conditioning system 142 can receive information from a variety of sources including, such as, for example, a DMS data source 114, an OEM data source 116, a lender data source 118, and/or additional internal or external data sources (not pictured). The data conditioning system 142 of the embodiment shown in FIG. 1 includes an alert database 138 and an alert engine 134. The data conditioning system 142 can process data in a variety of ways, as described more fully herein. The data conditioning system can transmit data to one or more systems within the system depicted in FIG. 1. Such systems can include, for example, a lender data system 242, a dealership management system 252, and/or an OEM data system 262.

Figure 2:
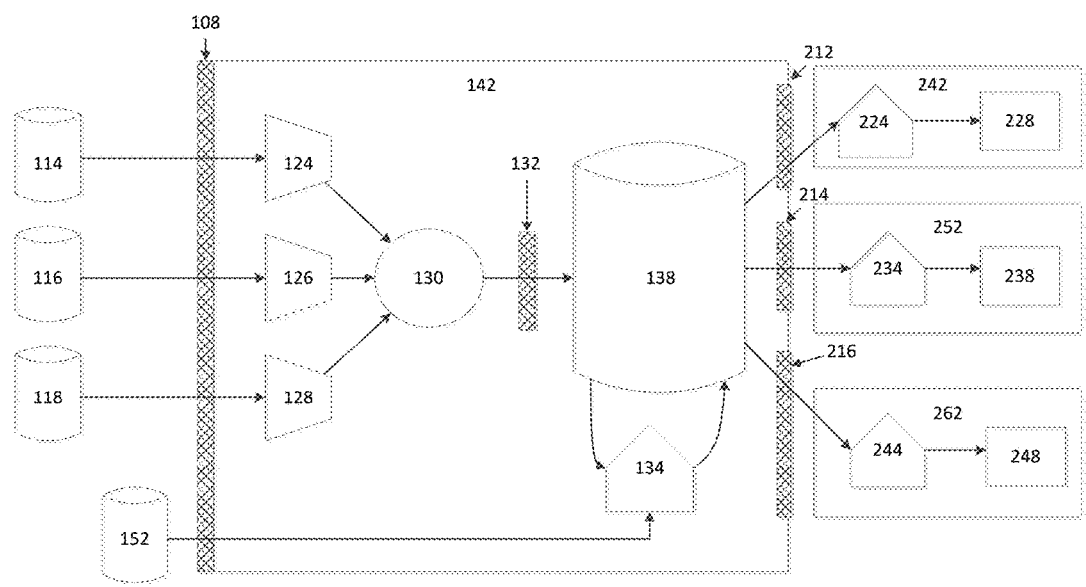
FIG. 2 shows a data conditioning and visualization system.

FIG. 2 illustrates detail view of an embodiment of the system of FIG. 1. The data sources 114, 116, 118 transmit data through a data conditioning system security device 108 (which can comprise a firewall, encryption systems, captcha, identification protocols, components of a security garden, etc.) The system security device can involve multiple encryption layers to help prevent unauthorized users from accessing data inappropriately. For example, a central server can track permitted IP addresses for certain types of data access. A double-handshake security protocol can be used. Security certificates can be used and managed from a centralized server to guard the data and those accessing it. As illustrated, each data source transmits the data to a corresponding data extraction application 124, 126, 128. The data extraction applications may be referred to as SSIS packages. Vendor suppliers may supply files and other data to the system in different formats. For example, the data may come in the form of a .csv, a .txt, a .xml, and/or a .doc file or similar format. The data may come as a combination of different formats. The data extraction applications can be tailored to receive the specific data and/or data formatting of the respective data sources.

Each data extraction application 124, 126, 128 can extract the data and/or harmonize formatting of the data. Formatted data can be sent to one or more temporary storage modules 130 until they are needed. The data are transferred between the temporary storage module 130 and the alert database 138 through one or more data conditioning modules 132. A data conditioning module 132 can condition the data in a number of ways, as described more fully herein. The alert engine receives from and transmits to the alert database 138 information that can be transferred to the various management systems 242, 252, 262. The alert engine 134 may receive information directly from other sources 152. These are sources 152 will generally transmit their data through the security device 108, but this is not required. In some embodiments the data may be received via (s)ftp to SSH and/or vm3 servers.

The alert database 138 can transmit information to one or more management systems, such as a lender data system 242, a dealership management system 252, and/or an OEM data system 262. In some embodiments, such as the one shown in FIG. 2, information transmitted from the alert database to the one or more management systems passes through a corresponding security protocol system 212, 214, 216. These are discussed more fully below.

With continued reference to FIG. 2, corresponding usage engines, such as a lender usage engine 224, a dealership usage engine 234, and/or an OEM usage engine 244, can process the received information and display it on corresponding user interfaces (UIs) and/or graphical user interfaces (GUIs), such as a dealer user interface 238, an OEM user interface 248, and/or a lender user interface 228. The interfaces can provide display as well as user controls that allow the view and/or underlying calculations to be changed such that the view is dynamic and responsive to user input. Details of the aspects and functionality of many of these elements are described more fully below.

Data Extraction and Aggregation

Figure 3:
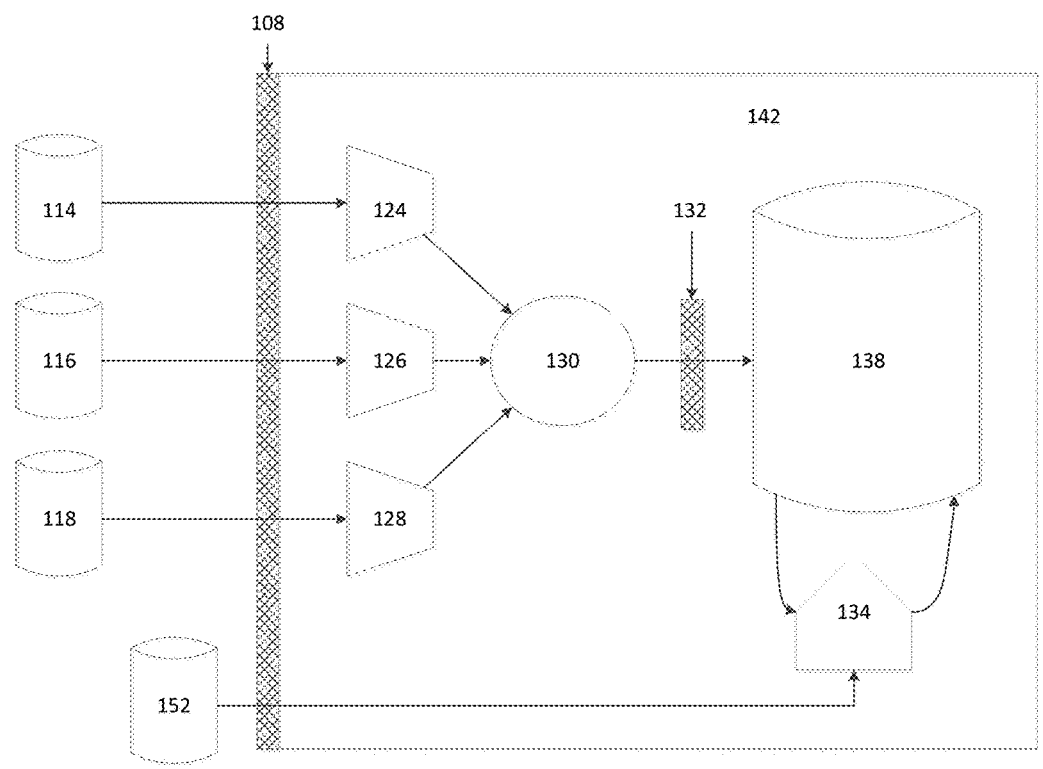
FIG. 3 illustrates a detail view of part of FIG. 2.

Initial problems arise from a diversity of data sources and modes for storage and transfer. These problems and this diversity are illustrated by data sources 114, 116, 118 in FIG. 3. FIG. 3 illustrates a portion of FIG. 2. According to FIG. 3, a number of data sources can feed data into a data conditioning system 142. A DMS data source 114 sends data to a corresponding data extraction application 124. Data may also come from the OEM data source 116, which sends its data to an OEM data extraction application 126. A lender, such as a bank, can send data from a lender data source 118. The corresponding lender data extraction application 128 can be configured to receive the information from the lender data source 118. Often the information sent to the data conditioning system 142 from the various data sources is not compatible or standardized, or it does not otherwise function effectively with data from other sources. For example, data may not be uniformly formatted or consistently stored, named, gathered, or conditioned across the different data sources. In some cases, this information is not uniform within the same data source. This creates an enormous challenge when a dealer or OEM seeks to analyze the data.

A solution shown in FIG. 3 involves customized data extraction applications 124, 126, 128 that automatically handle each unique data stream or interact with each unique data source. The data extraction can occur periodically and/or regularly. Some extractions may occur every few minutes (e.g., every 15 minutes or hourly) while some may occur less frequently (e.g., daily). The frequency of the extraction may be based on the amount of information to be extracted, the likelihood of the information to change frequently, and/or the importance of the data for dealership and/or OEM search functionality. The extraction may occur at one or more specified times of the day or week (e.g., during the night) or at changing times. This may be determined by various factors, such as, for example, when the data may be most easily extracted or when it will cause the fewest interruptions. For example, nightly updates may reduce the likelihood of interruption for users. However, updating during the day may provide the most up-to-date information at the time when users need the newest information most.

The extraction (e.g., importation) of data can vary based on the type of data. For example, information related to vehicle service (e.g., service alerts, service alert email notifications, vehicle mileage, service history) may be updated more frequently (e.g., every 15 minutes). Information related to appointments (e.g., pending service alerts, appointment email notifications) may be extracted less frequently (e.g., hourly). Sales or pending sales information (e.g., sales reports, closing alerts, false conquests) may be extracted daily. Information related to inventory (e.g., alerts in a change of used vehicles status, vehicle information in inventory) may also be updated daily. One or more algorithms, such as a file watcher, may track updates from one or more source databases and/or make determinations on when and/or to what extent updated data should be extracted. Thus, extractions may occur at non-regular intervals under the circumstances. Further information about extraction may be found in Appendix 1 of U.S. Provisional No. 62/443,633, pages 34-43. Appendix 1 of U.S. Provisional No. 62/443,633, to which this application claims priority, is hereby incorporated bodily and by reference in its entirety.

Often, dealerships (or even different departments within the same dealership) will use different third-party software to keep track of their own data. In some cases, this may be software from a company different than the one that handles the Dealer Management System (DMS). Examples of some third-party software providers may be found in Appendix 1 of U.S. Provisional No. 62/443,633, pages 3-5. The third-party algorithms that provide the data to the data extraction applications 124, 126, 128 may be referred to as Dealer Push algorithms.

In the embodiment of FIG. 3, each data extraction application receives the data through a data conditioning system security device 108. The data conditioning system security device 108 as shown can be used to monitor and control the incoming data traffic. In some embodiments, the data conditioning system security device 108 also monitors and controls outgoing data traffic. The security access of the system may be referred to as a walled garden, a closed platform, and/or a closed ecosystem. A username and/or password may be required to extract the information. Other types of permissioning requirements can be implemented to prevent the unauthorized extraction, upload, and/or use of the data. The data conditioning system security device 108 can be configured to protect the data conditioning system 142 and its constituent elements from malicious activity, such as, for example, hacking, data/information overload, and/or malevolent code, such as viruses. The data conditioning system security device 108 may include one or more types of firewall functionality, such as, for example, packet filters, application-layer firewalls, proxy servers, and/or network address translation (NAT) capabilities. In certain embodiments, the data conditioning system security device 108 can be used to adjust permissioning of access levels for client computers (not shown).

Example pseudo code and/or code for a customized data extraction application that handles extraction and/or data condition can be found in Appendix 1 of U.S. Provisional No. 62/443,633, pages 5-31 and 38-42.

Data Conditioning and Storage

A second stage of a system such as that shown in FIG. 3 can help resolve problems arising from inconsistent database design. The automotive data are automatically categorized into a system having at least as much granularity and detail as the most detailed version of that data type in any of the data sources (e.g., OEM, lender, and/or DMS databases). This process can involve identification of data type (or recognition of lack of a relevant data type), transformation or insertion of units and data label, storage or association with corresponding data, and/or maintenance of associations with related data. This process may involve establishing a common base, methodology, and/or apparatus for handling all possible automotive data. For example, additional expansion fields can be provided where a relevant data type does not yet exist in the common base. This process may be referred to as, for example, transformation, conditioning, scrubbing, cleansing, normalizing, harmonizing, formatting, and/or reformatting, and it may involve aspects of each.

The data extraction applications 124, 126, 128 can be specifically tailored to receive the particular data format of the corresponding data sources. As described above, it can be challenging to handle a vast amount of data, particularly when that data comes from multiple sources and arrives in different formats. In this way, the data extraction applications can format the data into a form usable by one or more elements of data conditioning system 142. As shown in FIG. 3, for example, the data extraction applications send the formatted data to a temporary storage module 130. The temporary storage module 130 may be an SQL table. This step may be referred to as loading. The temporary storage module 130 can then send the data through a data conditioning module 132. Whereas the data extraction applications 124, 126, 128 may have provided a first pass at formatting the data, the data conditioning module 132 can provide a more detailed "scrub" of the data. In some embodiments, the data conditioning module 132 can fill in missing entries or otherwise supplement the data. Example pseudo code and/or code for a conditioning process is provided in Appendix 1 of U.S. Provisional No. 62/443,633, pages 14-23.

The data conditioning module 132 can condition the data it receives from the temporary storage module 130 in one or more of a number of ways. It may be desirable to remove incomplete data entries. In some embodiments, the system can remove data entries based on one or more criteria. For instance, the module 132 can be configured to remove an entry when no contact information is provided for a particular customer. In some embodiments, a vehicle identification number (VIN) may be removed if it is not seventeen characters in length. Similarly, the data conditioning module 132 may be configured to remove duplicate entries. Under certain circumstances, the incorrect entry itself may be removed, updated, and/or amended. In some cases, the entry along with other associated entries may also be removed, updated, and/or amended. For example, an incorrect VIN may cause the deletion of the VIN number (if it cannot be updated or amended) as well as the make, model, year, and/or trim of the vehicle. Further information about data removal may be found, for example, in Appendix 1 of U.S. Provisional No. 62/443,633, pages 5-17.

In some embodiments, the module 132 can use review and/or comparison algorithms to suggest entries for missing fields and/or amendments for incorrect fields. For example, the module 132 may identify a missing address from data received from the DMS data source 114 but compare other data associated with that entry against data received from another data source (e.g., the lender data source 118), which may supply an address corresponding to information from the DMS data source 114, and suggest the address from the lender data source 118 to be filled in for the missing address in the entry from the DMS data source 114. In some embodiments, information may be extracted from the filename or from metadata related to the file and used to populate entries related to the data. The system may be able to change the status of a vehicle based on the vehicle's mileage (e.g., a new vehicle can be reclassified as used if the mileage on the car is greater than a threshold number of miles, or a used vehicle may be reclassified as new if the mileage is less than a threshold number of miles).

Various embodiments of the module 132 can perform one or more data conditioning actions, such as, for example: deleting entries with missing stock IDs or stock numbers; removing entries with the VINs having fewer than 17 characters; converting a number of days in inventory to a date in inventory; converting the type of car to or from used based on the number of miles on the vehicle and/or year of the vehicle; removing an entry if an appointment ID or appointment number is incomplete or missing; deleting an entry if the customer ID or customer number is incomplete or missing; removal of unexpected characters (e.g., "[", "^", "@"); removal of an entry if the deal number ordeal ID is missing or incomplete; deleting entries where the file source status is "final" or "closed"; change to the term of the lease and/or purchase information; change of the sale type based on the amount of the down payment, the monthly payment, the total cost of the vehicle, residual equity, and/or balloon values; removal of a phone number if there are too few or too many digits; removal or update of a salesman name (e.g., removal of misspellings and/or stray characters); removal of entry if the repair order or repair ID is incomplete or missing; removal of an entry if the length of time repair order has been open is greater than a threshold amount of time (e.g., 12 months); and/or removal of white space within the data (e.g., removal of spaces within or after a VIN). Other examples of data conditioning that the system can perform are provided in Appendix 1 of U.S. Provisional No. 62/443,633, pages 5-24.

In some embodiments, a dealer mask can be used to transform or condition irregular DMS data. A dealer mask can comprise a stored collection of information and instructions for handling an automotive dealer's data streams. For example, the system can preemptively delete certain fields or portions of a data stream that are known to store unneeded or ill-adjusted data, based on past experience in conditioning data from that source. Such dealer masks can save valuable time and processing resources by avoiding a need for further searching and conditioning. A system can automatically perform a selected spot check process to confirm a dealer mask is still applicable prior to applying the mask on an aggregate basis to large batches of data. Dealer masks can greatly improve batch processing and provide a basis for efficient periodic processing to avoid overuse of limited bandwidth, processing power, and temporary and permanent storage.

In some embodiments, quality control (QC) rules can be implemented by one or more components of the system. QC rules can be examples of the spot check process that can improve a dealer mask approach. Some examples of QC rules can include flagging errors or irregular data. It may also be helpful to compare the raw DMS data to the conditioned data. This may provide helpful information on the effectiveness of the scrubbing or conditioning processes. For example, the system may compare a percentage of vehicles that have a warranty against a threshold percentage, compare a certain entry against a threshold number of instances of that entry (e.g., a high number of salesmen named "HOUSE" may be reviewed by QC and require updating), and/or compare a certain customer name against a threshold number of deals. In some cases, a dealer mask can be used to account for this issue.

Alert Database

After data transformation and storage (which may involve conditioning as described above, if warranted), it can be helpful to store the normalized or otherwise standardized data in an alert database 138. An approach to organizing data in this working database is shown in Appendix 1 of U.S. Provisional No. 62/443,633, for example at pages 24, 32-37, and 42.

Once the data have been sufficiently transformed or otherwise adjusted by the data extraction applications 124, 126, 128 and conditioned by the conditioning module 132, the data are sent to an alert database 138. A transformation or other conditioning process can store the data in a separate (often more temporary) repository to facilitate those processes. However, the alert database can be a less temporary repository, designed to make the data accessible for use once confidence in the data quality, format, and consistency has been improved. An alert engine 134 can access the alert database 138. In the embodiment shown by FIG. 3, the alert engine 134 can receive data from other data sources 152. The other data sources 152 can include one or more of a variety of sources, such as, for example, state government databases, web repositories, analyst or think-tank databases, government agency databases (e.g., NHTSA, GSA, CPSC), licensor databases, publicly available databases, and/or competitor databases. The types and/or amounts of data that the alert engine 134 may pull from the other data sources 152 may be expansive or limited, based on how accessible information is, how quickly information can be received by the alert engine 134, how regularly the data are updated, and/or the type of data needed. The data from the other sources 152 may enter through the data conditioning system security device 108, as shown in FIG. 3. For simplicity, FIG. 3 does not illustrate a separate data extraction application corresponding to the data from the other data sources. However, in some embodiments, one or more data extraction applications are included in the data conditioning system 142 in order to reformat and condition the data from the other data sources 152, similar to the description above for the data from the first data sources 114, 116, 118. More information on the functionality of the alert engine 134 may be found, for example, in U.S. Pat. No. 7,827,099, U.S. Patent Publication No. 2012/0130778, U.S. Patent Publication No. 2013/0268315, U.S. patent application Ser. No. 14/152,932, U.S. patent application Ser. No. 14/152,949, and U.S. patent application Ser. No. 14/205,214, the entirety of each of which is hereby incorporated by reference for all that each contains, for all purposes.

In some embodiments, the alert database can be a system for data restriction and separating functionality by user. The system can restrict access to certain data based on a user credential and/or access provision. The system may specify data usage with specific user interfaces. For example, an OEM user interface may provide specifically tailored information and/or a specifically tailored user experience for the OEM. Likewise, a dealership or other entity (e.g., lender, public entity) may have a unique user interface specifically tailored to create a different user experience for each of them. OEM information can be prevented from appearing in a dealer interface. Dealer information can be prevented from appearing in an OEM interface, while at the same time influencing the results and views available in an OEM interface. A third party provider can act as a buffer that has access to OEM users and dealer users, while preventing unauthorized access of both and enabling use of the data of both. For example, an OEM user may review results from aggregated data of many dealers to develop a global or regional plan of action. The OEM may work with dealers to accomplish that plan using the services of a third party provider. The system can facilitate such interaction by preventing granular data sharing while enabling aggregate data usage and analytics (including automated analytics) as described further herein.

The alert database may comprise or interact with an aggregated data engine and anonymizer. The system may be able to anonymize sensitive information (e.g., customer names, customer contact information, proprietary dealership information, etc.) using an anonymizer. An anonymizer may include, for example, a pseudonym, an alias, a nickname, a false name, a codename, a symbol, and/or other representative reference to the data that is being anonymized. For example, when viewing a record of a customer of the dealership, an OEM may see an anonymized reference, for example, to the customer name, customer address, vehicle identification number, and/or from which dealership the customer purchased the vehicle.

Figure 4:
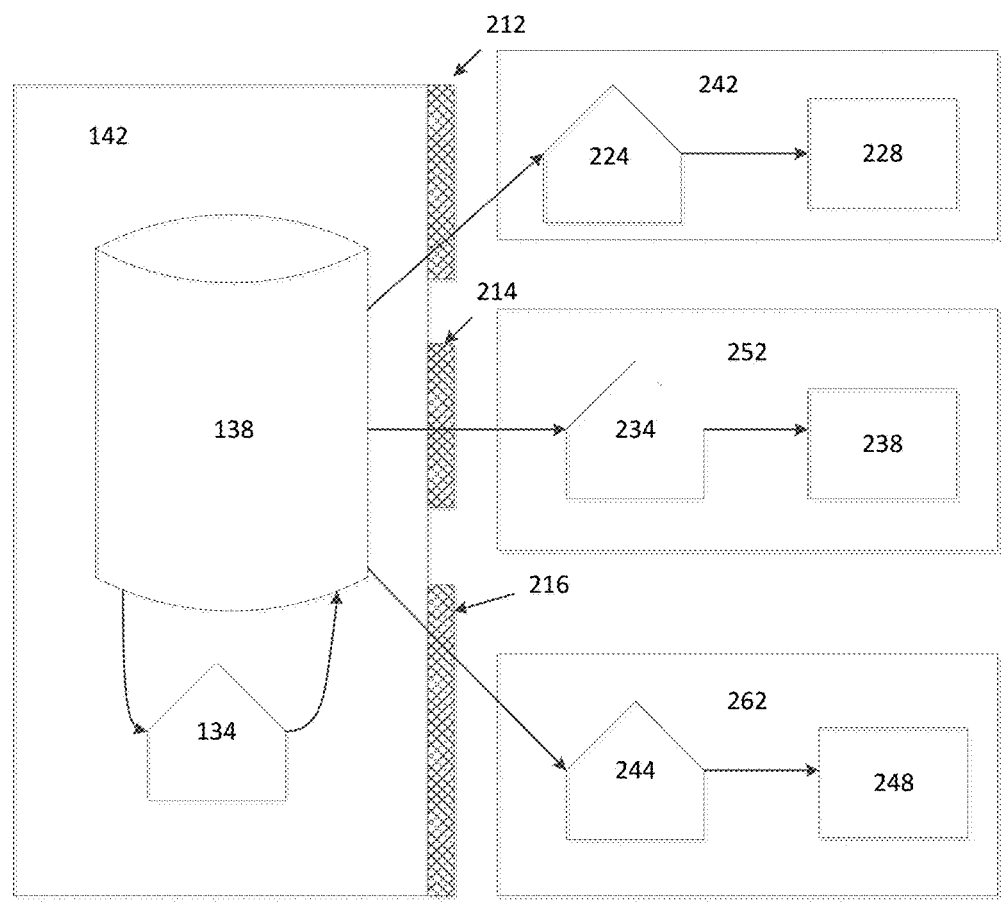
FIG. 4 illustrates a detail view of a part of FIG. 2.

FIG. 4 illustrates an output of the data conditioning system 142. As illustrated, the management systems can include a lender data system 242, a dealership management system 252, and/or an OEM data system 262. Each may receive data from the alert database 138. The data are transferred from the alert database 138 to corresponding usage engines 224, 234, 244.

In some embodiments, before data can be sent to the lender usage engine 224, a lender security protocol system 212 must be passed. Similarly, in the embodiment shown, data cannot pass between the alert database 138 and the dealership usage engine 234 or the OEM usage engine 244 without passing through the respective security protocol system 214, 216. The security protocol systems 212, 214, 216 may share some similarities with the data conditioning system security device 108. For example, the security protocol systems 212, 214, 216 may serve as one or more types of firewall, such as, for example, packet filter, application-layer firewall, proxy server, and/or provide network address translation (NAT) functionality.

In the embodiment shown in FIG. 4, the security protocol systems 212, 214, 216 can be used to adjust permissioning of access levels for client computers (not shown). For example, the lender engine 224 may pass the security protocol system 212 if it has proper credentials and/or those credentials are properly authenticated. Properly authenticating the dealership credentials may include, for example, communicating with the data conditioning system 142 and/or providing an acceptable username and password combination. Similarly, the dealership usage engine 234 and OEM usage engine 244 may also be required to have proper credentials and to authenticate those credentials before being able to receive information from the alert database 138. The security protocol systems 212, 214, 216, collectively or individually, may be referred to as closes platforms, walled gardens, and/or closed ecosystems. In some embodiments, the alert engine 134 and/or the alert database 138 control the permissioning of the security protocol systems.

The system can connect with a client system. The client system may be a computer system operated and controlled by a financial institution interested in financing new vehicles. The user of the client system may connect to the enterprise portfolio analyst system via a HTML web browser that may be used to access a web page. In some embodiments, the user may by authenticated using a username/password. The user may also be authenticated by checking the IP address of the clients system to ensure that the client is accessing the enterprise portfolio system from inside an authorized network. In addition, the authentication may include a validation of the MAC address of the client computing system to ensure that only those devices permitted access to the enterprise portfolio analyst system may access it.

In some embodiments, the enterprise portfolio analyst system may only accept connections over an HTTPS SSL (or otherwise encrypted or verified) connection. Periodical data uploads and exchanges may be advantageously performed via a SSH FTP connection and encryption. In some embodiments, the system comprises a firewall, web server, an application server and one or more database storage devices. The database storage devices may store data related to current customers of the user. The data may include current financial terms of the customers of the user. Such network encryption may prevent anyone other than authorized users to access the data. The system may use a cipher to create ciphertext that is unreadable by unauthorized users. The ciphertext may be deciphered using a public key or private key encryption scheme. Network level (or network layer) encryption can be used to protect data and enhance security. This can apply crypto services at the network transfer layer (above the data link level but below the application level). Alternatively, crypto services can be applied at the data link level. Data can be encrypted while in transit, and in some embodiments may also be encrypted on the originating and/or receiving ends. If network encryption is used, it can be implemented through Internet Protocol Security (using Internet Engineering Task Force (IETF) standards.

In some embodiments, the information available to the dealership usage engine 234 is not identical to the information available to the lender usage engine 224 and/or the OEM usage engine 244. In some cases, sensitive data belonging to the dealership may be passed between the dealer data system 252 and the alert database 138 while this data may be withheld from the OEM data system and/or lender data system. Such sensitive data may include, for example, customer names, customer telephone numbers, customer email addresses, customer addresses, and/or other identifying information about particular customers. The data may also include information that does not necessarily include identifying information about particular customers but may simply be proprietary information held by the dealership. Such information may include, for example, automobile sales history, inventory lists and/or numbers, customer demographics, sales trends, employee information, and/or automobile financing details. This may be important for protecting the privacy and/or security of the customers of the lender, dealership, and/or OEM. Such data may need to be treated sensitively. As such, the security protocol systems 212, 214, 216 can protect the privacy of individuals and of companies that do not prefer or cannot allow (e.g., legally) their data to be viewed by unauthorized parties. Thus, for example, an OEM may be able to receive information about data in the aggregate, but it may not be able to view sensitive data about particular individuals. Even some aggregate information may be withheld as necessary.

Dealership Usage Engine

A dealership can use existing customer information stored in DMS databases to identify prime opportunities for marketing outreach, even before potential customers consider themselves to be in a market for a new car. Such outreach can be to loyal customers as part of a loyalty or rewards program. Automotive deals are particularly likely when a potential customer can make monthly payments that are less than, equal to, or not greatly exceed the customer's current monthly automotive payments. A system can calculate when customers can renew a contract or financing terms to allow them to drive an equivalent or newer car while making a lower or similar payment.

Thus a dealership usage engine 234 that identifies, ranks, or limits its search results to these potential customers who are most likely to make a new lease or purchase is highly valuable. It can be especially helpful for such a search function to remove or eliminate search results for those that do not meet these conditions, or focus on those that do meet them. Results from a customer data mining or searching process within a DMS for high-likelihood potential deal prospects can be referred to as "alerts," because an automated system can alert a dealership to a prime opportunity for a new sale that the dealership may have otherwise missed, given how complicated and difficult it is to identify such candidates with all the variables in a new car deal.

Thus, automotive database searching is best served by predictive systems and methods that can alert dealers to the small percentage of favorable sales opportunities that exist at any given time within the large population of potential customers (e.g., past customers still making payments) who are not actively shopping for a new vehicle. Ideally, such systems are configured to transmit an alert to a dealer in cases in which the system determines that a customer is able to enter into a new financial arrangement on terms favorable to the customer. Such alerts identify the customer and the favorable financial terms. Using the alerts, a person (such as a salesperson) may proactively contact a customer to offer the potential replacement agreement."

To find favorable sales opportunities within a population not actively shopping for a new vehicle, a system can search for and target people currently paying on an existing vehicle (loan or lease). An example existing arrangement for a current vehicle is shown below:

| Existing Vehicle | |
|---|---|
| Class Description | X-Class |
| Series Description | X155 Sedan 4E |
| Year | 2015 |
| VIN | CVB499 |
| Deal Recap | |
| Contract Start Date | Mar. 20, 2015 |
| Capitalized Cost | $53,258 |
| Residual Amount | $34,160 |
| Contract Term | 39 |

-continued

| | |
|---|---|
| Base Payment | $856 |
| Total Payment | $922 |
| Payoff Amount | $37,136 |
| Trade-In Amount | $30,050 |
| Trade Equity | $7,086- |
| Security Deposit | $0 |
| Balance To Maturity | |
| Payments Made | 35 |
| Payments Remaining | 4 |
| Payment History | 30-0, 60-0, 90-0 |
| Balance to Maturity | $4,039- |
| Preferred Equity | |
| Equity | $4,039- |

The financial terms include, among other things, the candidate customer's monthly payment and the number of payments made, and remaining, on the customer's existing vehicle. The system can determine a trade-in value for the existing vehicle derived from one or more suitable sources (e.g., based on the mileage and condition of the vehicle). The system can estimate an equity value for the existing vehicle derived from the financial terms for the vehicle. To assess whether a favorable deal may be offered, the system determines prospective financing terms for vehicles that may be offered as replacements for the existing vehicle.

The system determines the new monthly payments that the candidate customer would pay for the replacement vehicle based on the equity in the existing vehicle and on the prospective financing terms for the replacement vehicle. The chart below shows example prospective financing terms for the potential customer to finance the replacement vehicle identified for him or her. Financing terms are provided for two lenders, "Dealer Credit" and "Big Bank," for different financing periods: 36, 48, and 60 months. The system can use any financing scheme, such as a lease, a balloon payment loan, or a purchase payment loan. The chart below also shows the new monthly payments that the potential customer would pay for the replacement vehicle for the two lenders under the different financing terms.

The system calculates the difference between the candidate customer's existing monthly payment (for the existing vehicle) and the new monthly payment (for the replacement vehicle). For this example, below are the results of calculating the differences between his existing payment ($856) and the new candidate payments:

| | Contract Term | | |
|---|---|---|---|
| | 36 | 48 | 60 |
| Dealer Credit | | | |
| Payment | $1,037 | $901 | $823 |
| Difference | $181 | $45 | $33- |
| Big Bank, Inc. | | | |
| Payment | $907 | $783 | $705 |
| Difference | $51 | $73- | $151- |

The system uses this difference in monthly payment as a predictor as to whether a sales opportunity exists for the dealer, i.e., whether it may be favorable for the candidate customer to replace the existing vehicle with the new vehicle. To conduct this assessment without input from the candidate customer, the system uses preset criteria for what is deemed to be favorable. The system, for example, may be configured to consider a deal "favorable" when the difference in payments is zero or negative (i.e., the new payment is less than or equal to the existing monthly payment). The system may also be configured to consider a deal favorable when the difference in payments is less than or equal to 10% of the existing monthly payment (i.e., the new payment is less than or equal to 110% of the existing monthly payment), or any other value deemed suitable to the dealer.

Figure 7A:
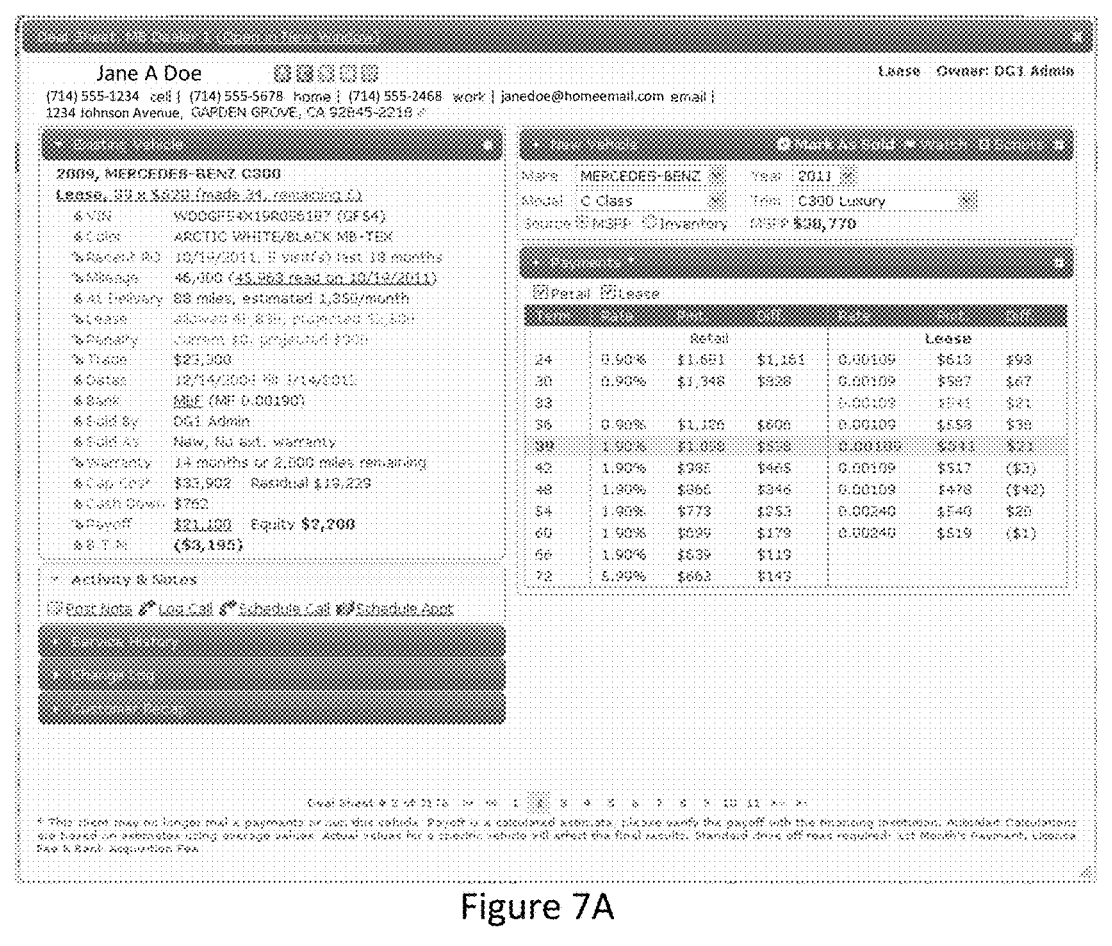

When the system determines that a deal is "favorable" under the dealer's criteria, it can generate a message and transmits the message to the dealer, alerting the dealer to the associated sales opportunity. As an example, FIG. 7A shows portions of a "deal sheet" alerting a dealer to a sales opportunity for a candidate customer. The deal sheet can include information on the candidate customer, the existing vehicle, and the existing financial terms. It can further include information on the new vehicle and prospective financing terms.

Many people paying off car loans have little equity, no equity, or negative equity in their existing vehicles, and for such people the system may find no favorable transactions and may generate no alerts for the dealer. The system may perform batch comparisons to allow a dealer to look for alerts within a large database of candidate customers (e.g., a population of past customers who purchased vehicles from the dealer under a loan or lease). Batch processing is an efficient way to generate from a large database of candidate customers only those select customers most likely to be receptive to replacing their existing vehicle with a new one. Thus, a dealership usage engine 234 can be selective and predictive in identifying for the dealer which candidate customers not actively shopping for a new vehicle are the best targets for a sales pitch.

Figure 5:
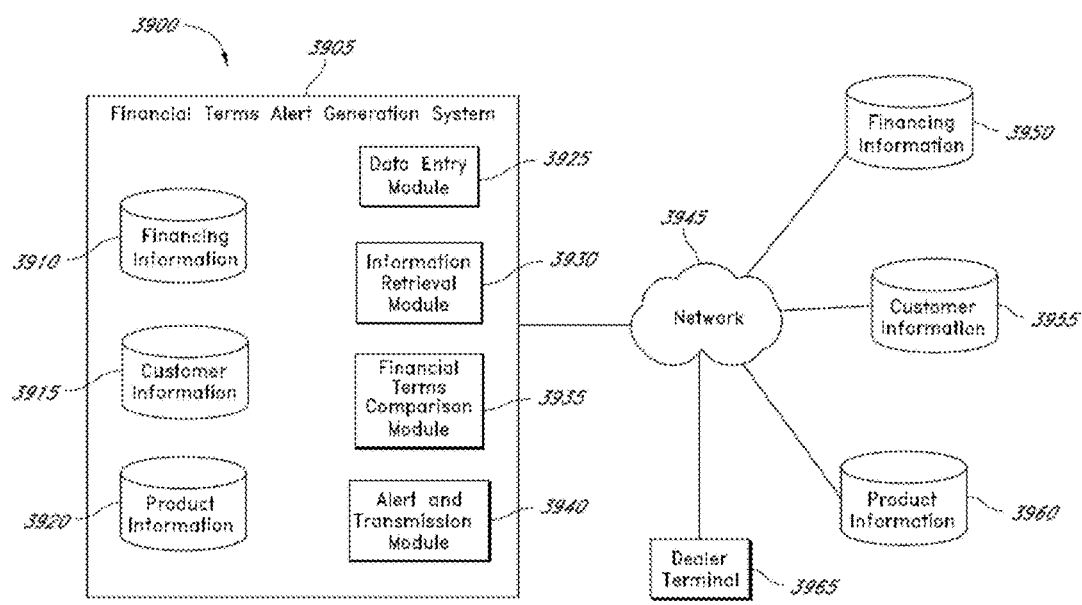
FIG. 5 illustrates a data conditioning system.

FIG. 5 illustrates a financial terms alert generation system attached to a computer network. A financial terms alert generation system 3905 comprises financing information 3910, customer information 3915, product information 3920, a data entry module 3925, an information retrieval module 3930, a financial terms comparison module 3935, and an alert transmission module 3940. The financial terms alert generation system 3905 is preferably connected, via a computer network 3945, to external financing information 3950, external customer information 3955, external product information 3960, and at least one dealer terminal 3965. In some embodiments, the financing information 3910, customer information 3915, and product information 3920 does not exist permanently within the financial terms alert generation system, but is retrieved from external sources 3950, 3955, and 3960, as needed. In other embodiments, at least portions of the financing information 3910, the customer information 3915, and product information 3920 is stored permanently within the financial terms alert generation system 3905 to provide local storage and caching of data. A skilled artisan will appreciate, in light of this disclosure, that the illustrated storage and modules can be distributed across multiple network hosts rather than being centralized in one location.

In some embodiments, the data entry module 3925 is configured to receive input from a user to enter or modify data stored in the financing information 3910, the customer information 3915, the product information 3920, the external financing information 3950, the external customer information 3955, or the external product information 3960. In general, the data entry module 3925 is not used for a large percentage of data entry, because the information retrieval module 3930 generally automatically retrieves information from sources available on the network 3945. However, advantageously the data entry module 3925 provides a manual tool for entering data for cases in which a user desires to fine tune the information stored in the databases. For example, in certain cases, a dealership may have special incentive programs that are not captured in sources available on the network 3945, and a dealer may want to manually enter data that takes such special incentive programs into account.

In some embodiments, the information retrieval module 3930 is configured to automatically retrieve information about products, customers, and financing from sources available on the network 3945, such as, for example, from the external financing information 3950, the external customer information 3955, and the external product information 3960. Upon retrieving such information from sources available on the network 3945, the information retrieval module 3930 makes the information available to the financial terms alert generation system 3905, such that the system 3905 can use the information in order to perform the calculations necessary to determine whether a customer can advantageously enter a new lease or purchase transaction. For example, in some embodiments, the information retrieval module 3930 stores the retrieved information in local storage accessible to the financial terms alert generation system 3905, such as by storing the information in the financing information 3910, the customer information 3915, and the product information 3920. Alternatively or additionally, the information retrieval module 3930 can store the information in memory rather than in local storage. A skilled artisan will appreciate, in light of this disclosure, a variety of techniques for retrieving information from sources available on the network 3945, including, for example, by scraping public websites. In light of these known techniques, a skilled artisan will readily understand, in light of this disclosure, how to implement the information retrieval module 3930.

Advantageously, by automatically retrieving a large amount of information relating to products, customers, and financing, the information retrieval module 3930 contributes to the ability of the financial terms alert generation system 3905 to generate a large amount of alerts regarding financing opportunities in a timely fashion such that dealers can be informed of such opportunities in time to convert many such opportunities into sales. Advantageously, the automation provided by the information retrieval module 3930 also allows for periodic alert generation based on up-to-date information. Accordingly, the financial terms alert generation system 3905 can generate alerts whenever new information is retrieved by the information retrieval module 3930 that affects whether customers are able to advantageously enter a new lease or purchase transaction.

In some embodiments, the financial terms comparison module 3935 performs comparisons and calculations necessary to generate deals and alerts. For example, it can be determined whether a customer is able to advantageously enter a new lease or purchase transaction, and a corresponding alert can be generated. In one mode of operation, the financial terms comparison module 3935 performs batch comparisons periodically. In another mode of operation, the financial terms comparison module 3935 performs batch comparisons whenever new information is added to any one or more of the financing information 3910, the customer information 3915, or the product information 3920. In another mode of operation, the financial terms comparison module 3935 performs a comparison for a particular identified customer and returns results of such a comparison in real time. When operating in this mode, the financial terms comparison module 3935 can advantageously lead to the generation of an alert in real time while, for example, a customer is in a dealership showroom. Advantageously, the financial terms comparison module 3935, in some embodiments, is configured to be able to perform comparisons and calculations in any one or more of the above-described modes of operation, such that the most advantageous mode of operation under the circumstances can be chosen.

In various embodiments, financial terms comparison module 3935 can begin processing alerts for one or more client entities and distribute the processing among a number of processing nodes (e.g., processors, processes, scripts, machines, virtual machines, data centers, cloud computing services, the like, or combinations thereof). The processing nodes can begin processing alerts for client entity customers, can further divide and distribute processing tasks, or both. For example, a processing node can continue to distribute processing tasks when its resource utilization is above a specified threshold or when the portion of client entity processing or data allocated to it exceeds a determined amount. In various embodiments, alert processing for a client entity can take place by dividing the processing task into a plurality of subtasks and distributing the subtasks to a plurality of processing nodes to be processed in parallel.

Preferably, the financial terms comparison module 3935 compares each customer's current financial arrangements with potential financial arrangements for similar or related products in order to determine whether a replacement arrangement can be entered into on more favorable or almost as favorable terms. To perform such calculations and comparisons, the financial terms comparison module 3935 employs the comparison method steps and calculation formulas as are described herein above. Upon performing the calculations and comparisons, the financial terms comparison module 3935 generates information for an alert to a customer whenever a favorable replacement financial arrangement can be had.

In various embodiments, the system uses internal data, external data, or both. The internal data may comprise rebates, adjustments, average selling prices, historical sales data. The external data can comprise trade-in values, payoff values, money factors, and residual. In some embodiments, alerts are provided to any suitable person, including but not limited to outbound marketers (e.g., telephone or the like), salespersons, managers, or the like.

Dealership Interface and Control

Figure 6A:
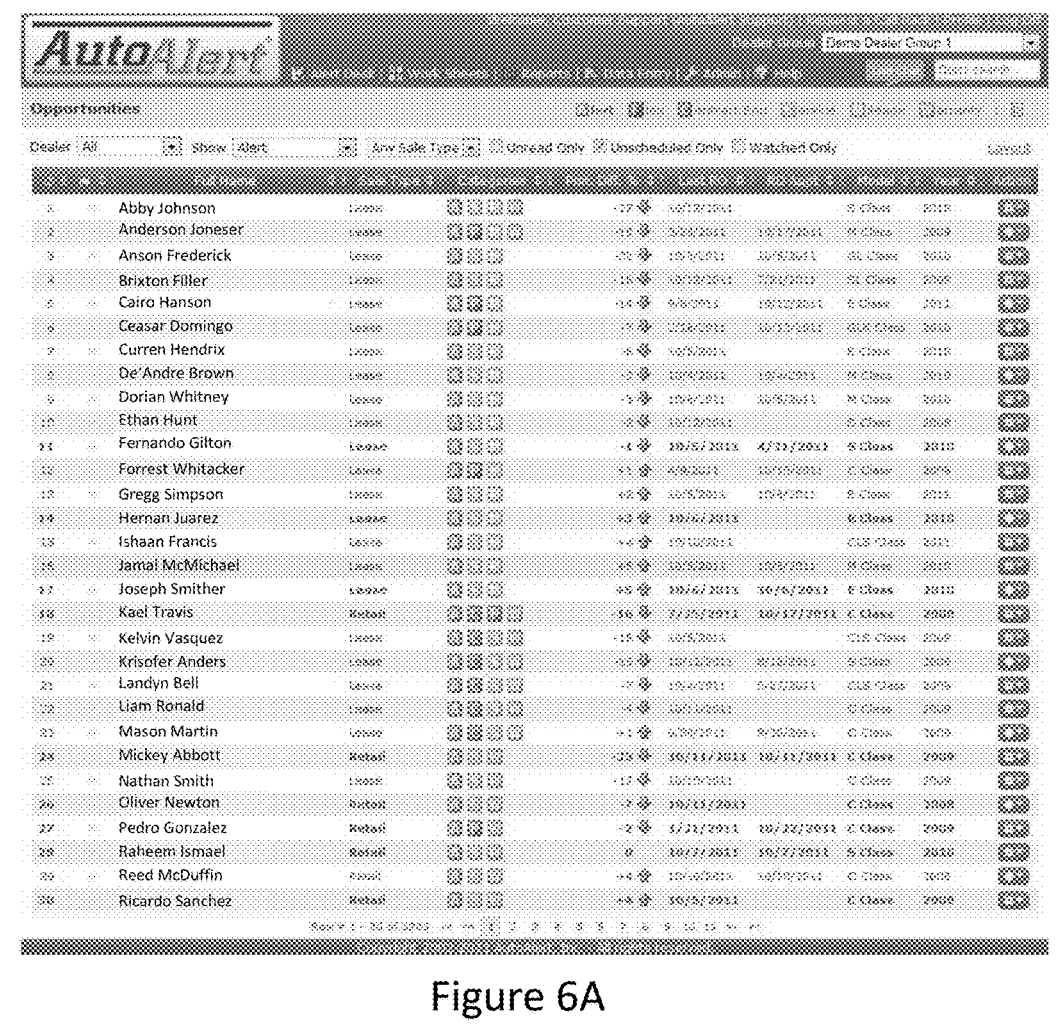

The dealership user interface 238 of FIG. 4 can be in the form of a number of different embodiments. For example, FIG. 6A shows an example of an interface that allows a user to view and sort alerts and opportunities. A categories column can contain textual or graphical indications of the various categories in which an alert falls. Categories can include the following: "Alert" or "[A]," which can indicate a customer who can get into a new vehicle and continue paying about the same; "Flex" or "[F]," which can indicate a customer who is flexible to different contract terms (e.g., longer or shorter duration) and can get into a new vehicle and continue paying the same; "Contract End" or "[E]," which can indicate a customer whose contract (e.g., lease or financing contract) is nearing maturity; "Service" or "[S]," which can indicate a customer whose car is currently in or scheduled for service; "Mileage or "[M]," which can indicate a customer who has exceeded or is about to exceed lease mileage allowance; and "Warranty" or "[W]," which can indicate a customer whose standard warranty is about to expire and who has not yet purchased an extended warranty. A user can sort the list of alerts or opportunities based on any available criteria (e.g., the criteria listed in the heading of any column of FIG. 6A). In some embodiments, the system can list a single customer and associated product or agreement under multiple alert categories. In some embodiments, a category can be selected by the system for display (for a given potential customer), to the exclusion of other categories or listed before other categories, if a particular alert category is likely to create a comparatively more powerful incentive than an alert for that same potential customer in another category. Alternatively, as shown in FIG. 6A, alerts can be listed in alphabetical or some other standard order.

Alerts can be ranked by the system according to various criteria and presented to the user. In some embodiments, alerts conforming to particular criteria that indicate a high priority can be ranked higher. For example, a customer whose vehicle is scheduled for service, whose contract is nearing maturity, and who is projected to exceed mileage allowance can be ranked higher. Alerts falling in multiple categories can also be given higher priority. Alerts having similar category criteria can be ranked against each other using still additional criteria, such as difference between a customer's current payment and a potential payment under a new agreement. Thus, customers who can save the most by entering a new contract can be given a higher priority. Alternatively, customers with more buying power (e.g., a higher credit score) can be listed as a priority.

As shown in FIG. 6A, alerts can be presented according to a ranking. Additionally, alerts can be by dealer, alert type, sale type, read status, scheduled status, or watched status. The watched function can allow the user to mark certain alerts for follow-up or later inspection. A user can indicate that an alert should be watched by selecting, for example, the flag icon in the table row corresponding to the alert. Icons corresponding to the different categories of alerts (e.g., alert, flex, contract end, service, mileage, and warranty) above the alerts table can be selected to display only alerts that fall into a certain category. Selecting an alert, for example by clicking the customer name in a column of the alert table shown in FIG. 6A, can present the user with a deal sheet corresponding to the alert. For example, selecting an alert can bring the user to a deal sheet similar to that illustrated in FIG. 7A.

Figure 6B:
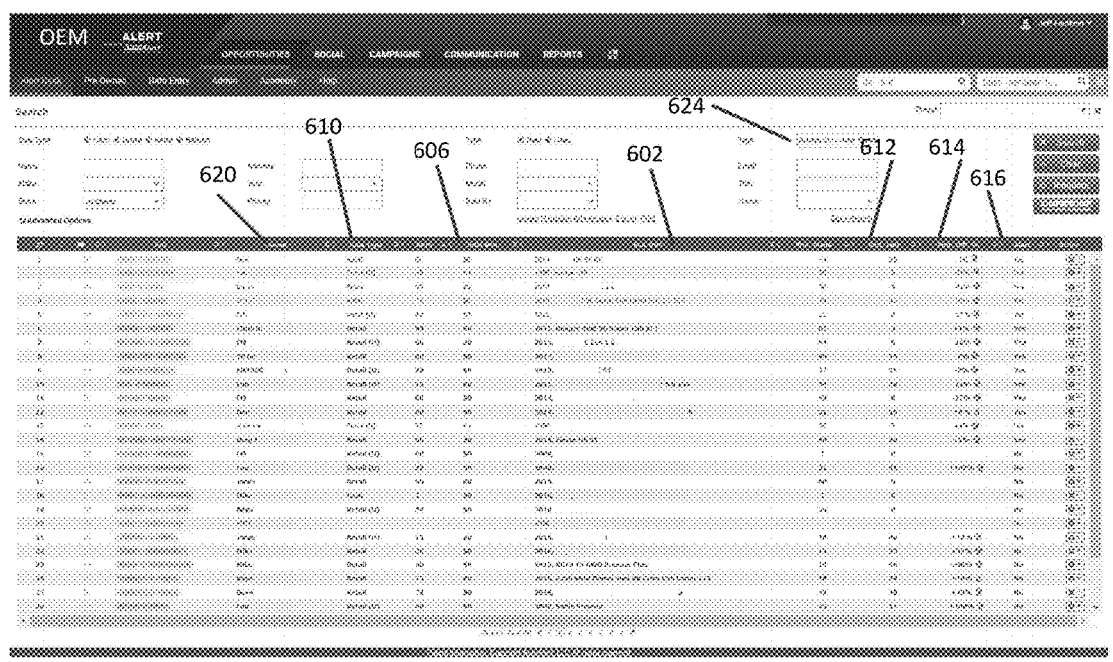
FIG. 6B shows an example of a dealer interface that allows a user to view and sort alerts and opportunities.

FIG. 6B shows an example of a user (e.g. dealer or manufacturer) interface that allows a user to view and sort alerts and opportunities. This display interface may allow a user (e.g., manufacturer or dealer) to search for OEM-specific offers and/or sort according to one or more variables. The system can be configured to provide an automatic and/or seamless transfer of instructions and data from the OEM to the dealer or from the dealer to the OEM. Customers can be prioritized by score and/or offer. A user may be able to use the search functionality of the OEM-sourced deal search 624 to discover additional offers provided by the OEM. The OEM-sourced deal search 624 can give a user (e.g., dealer) the ability to search for deals that are from the OEM. This can help a dealer find the most current and relevant offers. In some embodiments, a similar interface is used by an OEM but where the customer names have been removed, masked, or not included at all.

The user may be able to sort according to a variety of variables. For example, the user may be able to sort based on an owner name 620, a sale type 610 (e.g., retail, cash, lease), a total payment amount 606 (e.g., a down payment, a monthly payment), a trim type 602, a number of payments left 612, a payment difference 614 (e.g., percent difference, dollar difference), an alert status 616 (e.g., yes, no), a total number of payments made, a model type, a model year, a customer location (e.g., city, zip code, state, county, region), and/or other type of variable. In some designs, the sorting can be done by hierarchy where an initial sort is done according to a first variable and then a secondary sorting within the first variable is done according to a second variable. The display and/or instructions for display may be configured to be updated automatically. This may be done in response to a real-world update (e.g., actual mileage reading, payment status, calculated mileage update, payment difference update, etc.). In some designs, a dealer interface may allow the dealer to sort based on a particular OEM or to include all OEMs of a particular market in the sorting. A user may be able to search according to one or more of the variables discussed above with regard to sorting. The display may be configured to allow a user to toggle a dial, slider, or other interactive object to return the updated results.

FIG. 7A shows an example embodiment of a deal sheet. At the top of the deal sheet, the customer's name can be displayed along with other contact information. (Such a view is typically used by an automotive dealer, but if viewed by an OEM a customer name would typically be omitted, along with other customer-specific data such as the VIN, etc.). Icons can be displayed to indicate what kind of alerts the deal sheet corresponds to. In FIG. 7A, for example, the deal sheet has been generated for customer Natalie A Bennington based on a general alert ("A"), a contract end alert ("C"), a service alert ("S"), a mileage alert ("M"), and a warranty alert ("W"). Information about the customer's current vehicle can be displayed. Notably, this information can include the vehicle's predicted (estimated, extrapolated, or interpolated) current mileage with a note indicating the last verified mileage recordation and its date. Listed information can also include estimated monthly mileage, mileage allowed under the lease, current mileage-based financial penalty, trade-in value, lease start and end dates, warranty term in months or miles, payoff amount, and current equity. Based on the lease end date and estimated monthly mileage, the deal sheet can also provide predicted mileage at the lease end date, predicted financial penalty at the lease end date, and predicted warranty expiration date based on the earlier of the warranty's end date or the customer's predicted mileage exceeding the mileage term of the warranty. Such information can be calculated in real-time or can be displayed based on alerts generated previously and stored, transmitted, queued, or the like.

As further shown in FIG. 7A, the deal sheet can include an area for selecting criteria for a replacement product (e.g., "New Vehicle"). For example, replacement vehicle make, model, year, and trim can be selected. In various embodiments, these fields can be pre-populated with criteria corresponding to the same general product family, price level, or luxury degree as the customer's existing product. In FIG. 7A, for example, the customer's current vehicle is a 2009 Mercedes-Benz C300. Accordingly, the replacement product criteria can be pre-populated with information corresponding to the 2011 model of the same C300 model. Pre-population can help reduce calculation load on a prediction and analysis system by identifying alerts based on assumptions of desired upgrades to the most similar new car and trim level available. This can be the basis for calculating the alert in the first place, and later, different selections can change the alert status. The replacement product area can also include a selection. A selection field can also be provided to specify the source for the replacement product data. For example, the data about replacement products can be retrieved from a retail listing (e.g., a MSRP listing), or from local inventory. Information about local inventory can be retrieved from a data source, for example, located at the dealership or stored in a remotely accessible data repository.

Although the selected replacement product criteria shown in FIG. 7A can be pre-populated with criteria corresponding to the same general product family, price level, or luxury degree as the customer's existing product, a customer may want to "buy up," or purchase a product with a higher level of quality of luxury. Accordingly, embodiments of the system and method described herein allow a dealer to determine financial arrangements that are available to a customer in such a "buy up" situation. Typically, however, the alert has been identified and the potential customer contacted before the "buy-up" situation is analyzed. This analysis can be performed in real time while a customer is in a dealership or on the phone, discussing the options. In certain embodiments, for example, a dealer selects, using, for example, a pull-down menu, a class of products that a customer potentially desires to buy. For example, with respect to cars, a dealer may select a model of car, such as a Mercedes-Benz C class, or a Mercedes-Benz E class. FIG. 7A illustrates an area for selecting criteria for a replacement product which allows a dealer to make such a selection. Upon receiving such a selection, embodiments of the system determine new financial arrangements that are available to the customer for that class of product. Advantageously, the dealer can use such information to present the customer with an offer to "buy up" to a higher quality product. Similarly, embodiments of the system and method allow a dealer to select a lower class of product to find out about opportunities for the customer to "buy down," or purchase a lower class product in order to save money. In certain embodiments, such "buy up" or "buy down" inquiries are limited to products from the same manufacturer as a product that the customer currently owns or is leasing. In other embodiments, such "buy up" or "buy down" inquiries can include manufacturers that are different from the manufacturer of a product that the customer currently owns or is leasing.

The payments area on the right hand side of FIG. 7A can display information about the options for leasing or financing a replacement product. This information can include a comparison of the customer's current financing agreement and the terms of various available replacement agreements. For example, the right side of the payments table in FIG. 7A shows the financial criteria corresponding to different lease terms ranging from 24-72 months. For each lease term, the table indicates the interest rate, the monthly payment, and the difference between the monthly payment under that lease and the customer's current monthly payment. The left hand side of the table shows the financial criteria corresponding to different financing periods for a retail purchase of the replacement product. For each financing period, the table indicates the interest rate, the monthly payment, and the difference between the monthly payment under the financing agreement and the customer's current monthly payment. Notably, this side-by-side display of lease payments and retail purchasing financing payments can allow the customer to compare the attractiveness of leasing a replacement product as compared to financing the purchase of a replacement product. Check boxes above the table can allow the user to remove either the retail purchase or lease columns from the table, for example, in the event that the customer specifies that she is only interested in one of leasing and buying. Also, as shown in FIG. 7A, the row of the payments table corresponding to the term-length of the customer's current agreement can be highlighted for comparison.

Figure 7B:
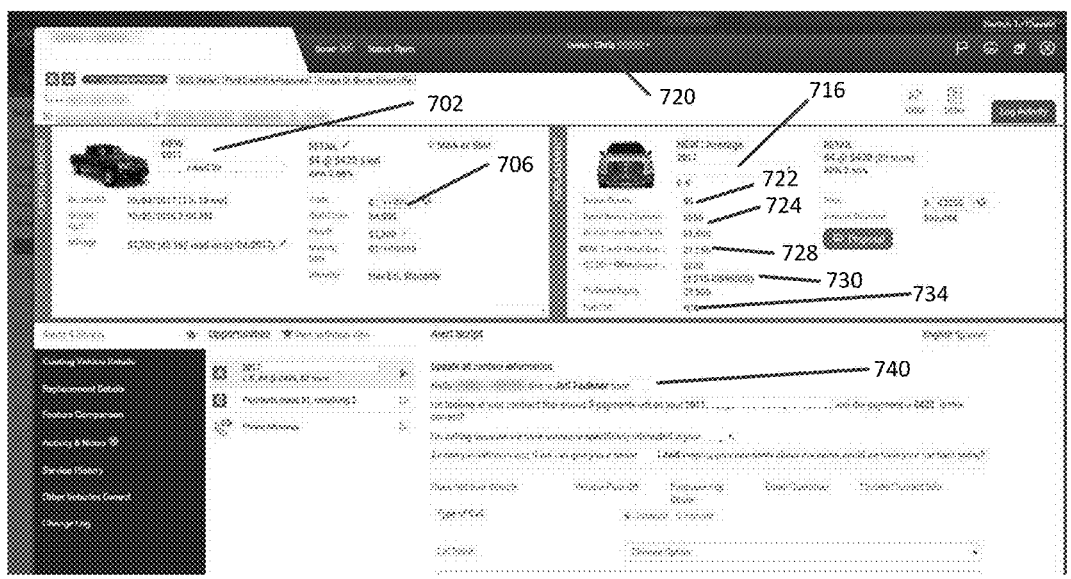
FIG. 7B shows an alternative embodiment of a deal sheet for an interactive display.

FIG. 7B shows an alternative embodiment of a deal sheet that can comprise an interactive display, for example. The display may be configured for use by a dealer (e.g., dealership employee). The user may be able to see a list of offers for which a potential customer likely qualifies. A potential customer may qualify for a public offer (e.g., one in which multiple customers are offered the same deal) and/or a direct offer (e.g., one in which the customer receives a specially tailored offer, which can be calculated to allow a dealership to adjust parameters such that the customer ultimately makes the same or a lower monthly payment, for example). The offer may include financing preapproval information.

As shown in FIG. 7B, a deal sheet view may show existing vehicle details 702 and/or replacement vehicle details 716. Juxtaposing or otherwise associating this information on a screen interface can be very helpful for both a potential customer and a user at a dealership. Such details may be shown, for example, side by side or above/below each other. The existing vehicle details 702 may include a current trade-in value 706 of the existing vehicle. The existing vehicle details 702 may also include an amount of cash down, a payoff amount, a maturity date of the financing, a status of a warranty, a number of payments made/remaining, a current interest rate, a most recent repair order (RO), a next scheduled service appointment, a status of sale (e.g., sold, open), and/or a current mileage. The current mileage may be estimated (e.g., from an estimated monthly mileage) or actual (e.g., from a recent RO, self-report), or some combination thereof. The mileage may be updated in real-time and/or automatically. Mileage data may be obtained directly from a repair shop or a RO from the dealership.

The deal sheet may further include replacement vehicle details 716. The replacement vehicle details 716 may include one or more incentives currently available for a particular potential customer 720 (e.g., current owner of the existing vehicle). Such incentives may be available from the dealer and/or the OEM. The incentives may be specially tailored for that potential customer 720 or they may be generally available (e.g., for that particular make/model, for a particular time, etc.). The replacement vehicle details 716 may show a specific dealer incentive 722, a general dealer incentive 724, a specific OEM incentive 728 (e.g., bonus customer cash, OEM credit), and/or a general dealer incentive 730 (e.g., Q2 incentive). The replacement vehicle details 716 can include offers created by the OEM that are then distributed directly to the dealer in the display system.

The replacement vehicle details 716 may also include a fuel efficiency differential 734. The fuel efficiency differential 734 may include an amount of savings that the replacement vehicle may provide. The fuel efficiency differential 734 may further supply a type of incentive to a potential customer. For example, a more fuel efficient replacement vehicle may provide a potential customer an estimated monthly or yearly savings. The fuel efficiency differential 734 may be determined based on a price of fuel in the area (e.g., country, state, zip code, region, etc.) of the potential customer (e.g., where the potential customer lives and/or works), a price based on the type of fuel (e.g., octane) required by the existing and/or replacement vehicle, an estimated fuel economy of the existing and/or replacement vehicle, and/or an estimated number of miles driven per month/year. The estimated number of miles driven may be based, for example, on a number of miles driven per period (e.g., month, year) by the potential customer in the existing vehicle. This may be determined based on actual mileage readings obtained at one or more ROs. A fuel efficiency differential can be displayed as a separate incentive, or it can be accounted for when alerts are determined. Thus, alerts can be established based on a total monthly cost (as opposed to total monthly auto financing payment). Such analysis can be helpful for sales of alternative fuel vehicles, hybrids, electric vehicles, etc.

The deal sheet may further provide an alert script 740 that a user may follow in making the offer to the potential customer 720. This alert script 740 may be read by a user during a phone call. In some designs, the alert script 740 may be automatically submitted to the potential customer 720 (e.g., by robocall, text message, email, mailing). Such an automatic submission may be made once the potential customer 720 becomes an alert. Other conditions are also possible.

Figure 7C:
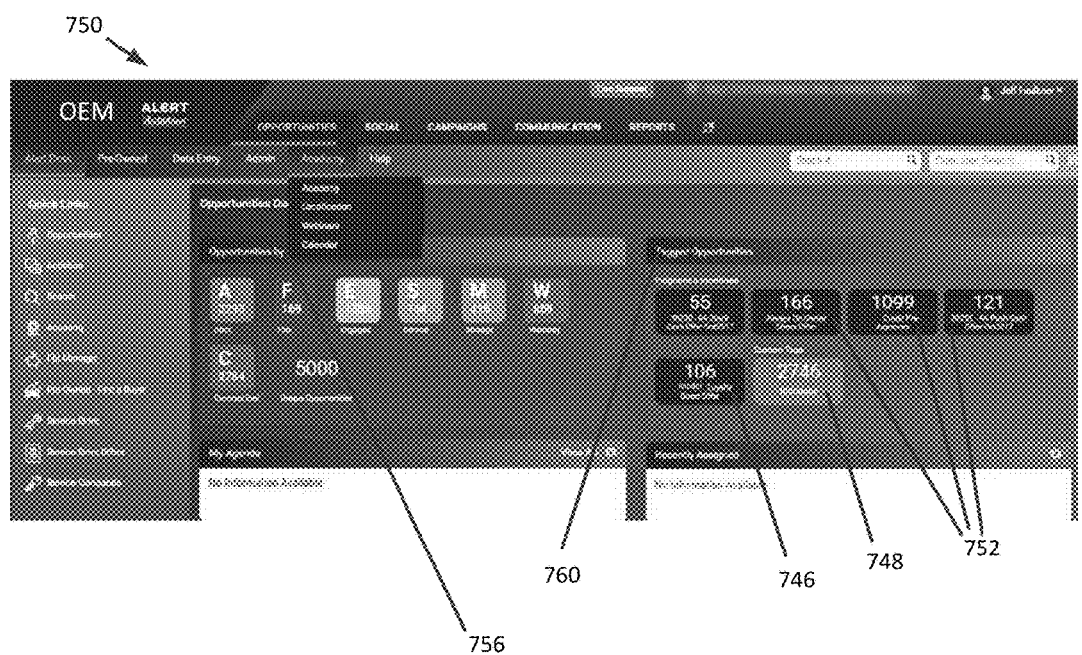
FIG. 7C illustrates a dealer dashboard display for use by a dealer.

Offers that an OEM wants to submit to potential customers may be made through a dealer. In such cases, it may be beneficial for a dealer to have a portal through which to see OEM offers. FIG. 7C illustrates a dealer dashboard display 750 (e.g., for use by a dealer). An OEM may transmit one or more offers and/or incentives to the dealer through the dealer dashboard display 750. The dealer dashboard display 750 may list one or more opportunities in an "opportunities by alert" section 756, such as near the left side of the display. The opportunities by alert section 756 may include one or more types of alerts. Such alerts may include a general (e.g., total) "alert" count. The opportunities by alert section 756 may include specific types of alerts, such as flex alerts, engaged alerts, service alerts, mileage alerts, warranty alerts, and/or end-of-contract alerts. The mileage alerts may include alerts based on a vehicle that has reached a specified number of miles (e.g., actual, estimated). The warrant alerts may include alerts relating to when a warranty of a vehicle ends (e.g., such as those vehicles who have recently gone off the warranty). Service alerts may include vehicles that have expected service requirements recently and/or coming up. Flex alerts may include specific alerts customized by the dealer. The opportunities by alert section 756 may include other data showing a number of unique opportunities (e.g., specific to one or more particular potential customers). The numbers and types of opportunities can be influenced by the OEM incentives as analyzed and calculated using other OEM interfaces such as those described herein.

The dealer dashboard display 750 may further include a "tagged opportunities" section 760. The tagged opportunities section 760 may include one or more incentive types 752 and/or custom tags. The custom tags may include a number of direct offers 746 and/or mailers 748. The tagged opportunities section may function as a delivery system for offers generated in the OEM tool to be displayed to a dealership. FIG. 7C shows an OEM that has made an offer available to 55 people at this dealership. When the user (e.g., dealership) clicks on this link, the user may be taken to a list of people that qualify for the offer. The link may show the user benefits that may apply to a potential customer. The system can match up the offers with the personal information of those to whom it applies, while preventing an OEM from knowing the identities of those offerees. However, because a dealership already knows their identities (from their own customer database, for example), the system can allow the dealership to see names and contact information for the offerees and facilitate that contact. Thus, the system can effectively allow the OEM and dealership to work together and share data, while preserving confidentiality and safely managing business information according to accepted privacy and professional standards.

With reference to FIG. 4, the dealership usage engine 234 can transmit data to one or more dealership user interfaces 238, such as the ones described above in FIGS. 6A-B and 7A-C. The dealership user interface 238 can simplify the interaction between the dealership (e.g., a dealership employee) and the dealer data system 252. More information on the functionality of the dealership usage engine 234 and other example embodiments may be found in U.S. Pat. No. 7,827,099, U.S. Patent Publication No. 2014/0236655, and U.S. Patent Publication No. 2014/0324536, each of which is incorporated in its entirety herein by reference. Functionality of a dealership usage engine can include that described with respect to embodiments of an AlertMiner system available from AutoAlert.

Example Dealership Analysis System

A dealership interface and control and a dealership usage system can comprise a dealership analysis system or elements of a lead-generating system. For example, a data mining and analysis system for automotive dealers can comprise a computer system for automatically identifying which past customers are candidates for new vehicle transactions on terms favorable to the customers for presentation to the candidates as new favorable deal proposals. The computer system can have access to a large database of records of previously sold vehicles. The records may include information on the previously sold vehicles, such as the customer for the previously sold vehicle and/or that customer's contact information, the vehicle identification number of the previously sold vehicle, and/or data from the deal that resulted in the previous sale to the customer. The data may be sufficient to show or obtain/derive the customer's current payment, (e.g., the customer's monthly payment for the previously sold vehicle), the estimated trade value of the previously sold vehicle, and/or the estimated payoff amount of the previously sold vehicle. The computer system can be configured to analyze the data from the deals that resulted in the previous sales to the customers and automatically prepare and/or analyze a new deal proposal for a given customer to determine whether that customer is a candidate for outreach based on a new favorable deal proposal.

The analysis of the new deal may include using the vehicle identification number to identify the make, model and/or year of the previously sold vehicle. The analysis may further include searching and/or making an inventory of the automotive dealer for a similar make and/or model in the current year to select a new suggested vehicle for the customer, thereby limiting use of computer resources by analyzing one new suggested vehicle for the determination of whether that customer is a candidate for outreach. The analysis may further include determining at least two new proposed payments by obtaining the price of the new suggested vehicle, obtaining a net trade-in equity by combining the estimated trade value with the estimated payoff amount of the previously sold vehicle, determining the amount to be financed by combining the price of the new suggested vehicle with any obtained net trade-in equity (e.g., positive or negative equity), using the amount to be financed and currently-available rate information for at least two different loan durations to determine the new proposed payments, comparing the customer's current payment and the new proposed payments to determine one or more differences, and/or analyzing the differences to determine if at least one of them meets a criterion to identify the customer for outreach because a new, favorable deal proposal has been identified to get that customer into an upgraded vehicle.

The first computer system may use this information to identify new revenue opportunities from the past customers that are candidates for new vehicle transactions, even when those candidates are not shopping for a new vehicle, and/or, for each candidate, identifying at least one specific and available proposal favorable to that candidate. The computer system may include a visual alert system for notifying dealership personnel of the new revenue opportunities automatically identified by the computer system by collecting and, for each specific and available proposal, displaying specific proposed transaction details to an automobile marketer to assist in marketing outreach to the candidates. In some embodiments, the visual alert system is configured to allow a user to select what is displayed and control the system to instantaneously switch between pre-defined views. The visual alert system may include at least one pre-defined view that arranges one or more pieces of candidate information into a simultaneously-viewable screen for display to a user to facilitate outreach to each candidate customer. The one or more pieces of candidate information may include, for example, the candidate customer's contact information, the candidate customer's previously sold vehicle, the year of the vehicle, the vehicle identification number, the candidate customer's current payment, the estimated trade value of the previously sold vehicle, the estimated payoff amount of the previously sold vehicle, the net trade-in equity of the vehicle previously sold vehicle, the new suggested vehicle, the year of the suggested vehicle, and/or multiple options for the new proposed payment under the different loan durations. The multiple options for the new proposed payment may be arranged side by side. Each new proposed payment may be juxtaposed with the difference between it and the customer's current payment.

Example Lead-Generating System

A dealership interface and control and a dealership usage system can comprise a lead-generating system or elements of a lead-generating system. A lead-generating system may include a data mining system to generate leads for, and/or facilitate outreach by, automotive dealerships. The lead-generating system may include a view server accessible by a dealer via a secure connection over the internet. The view server may provide a hypertext interface comprising hyperlinks for navigating between views. The lead-generating system may include access controls that can allow a user to access the system and/or allow the system to customize a view to an appropriate level of detail for the user. The access controls may include, for example, a secure log in screen that filters out information that particular user is not permitted to access.

The lead-generating system may also include a contact management subsystem that tracks automotive marketing interactions, such as telephone calls, visits, appointments, and/or emails. In some embodiments, the contact management subsystem comprises contact management entries stored in a computer database, contact information associated with the contact management entries (e.g., names, addresses, and/or telephone numbers for contacts of the dealer), and/or a task list view (including, e.g., a list of tasks, contact names associated with the tasks, one or more list controls (to allow the user to filter, sort, and/or rank the tasks), and/or notification indicators indicating which contacts the data mining system has automatically identified as prospects). The contact management subsystem may further include contact stage controls that may allow the user to specify a current stage for a particular contact in a multi-stage contact management process. The contract management system can advantageously simplify the visual information and/or decisions presented to a user by simply feeding them the next item in an automatically prioritized list of action items.

The lead-generating system may further include a notification generating subsystem integrated with the contact management subsystem. The notification generating subsystem may provide individualized offers for selected prospects. The notification generating system may have access to a computer database storing historical transaction data for contacts of the dealer, access to external data comprising automobile trade-in values, and/or an assessment server that is configured to automatically identify contacts as prospects (e.g., when certain calculated criteria are met).

The assessment server may automatically identify contacts as prospects by executing stored program instructions that determine and/or evaluate potential terms available to a contact for automotive financing. The program instructions may retrieve terms of a current financial agreement for the contact's current automobile (e.g., from the computer database storing historical transaction data), retrieve an automobile identifier for the contact's current automobile, automatically identify a particular type of replacement automobile for the contact based on the contact's current automobile, determine a payment under a potential replacement agreement for the contact (based on, e.g., a trade-in value for the current automobile, the terms of the current financial agreement, and/or the particular type of replacement automobile), perform a payment comparison between a current payment under the current financial agreement and the payment under the potential replacement agreement, and/or identify a contact as a prospect based on the payment comparison.

In some embodiments, the lead-generating system includes a deal sheet view may be configured to facilitate outreach to prospects by providing a single-page display that consolidates a result of a payment comparison for a prospect with contact information for that prospect. The deal sheet may also facilitate follow-through, by indicating a current stage for the prospect in the multi-stage contact management process.

OEM Usage Engine

Additional solutions can be used for granting limited access to the databases that result in alerts, and providing different functionality for users that are not dealerships or users that did not originate the potential customer data from their own DMS or CRM sources. The following section describing OEM usage is an example of the functionality indicated by the OEM data system 262 in FIG. 4.

The system that results in alerts as described above includes numerous inputs and database management and control elements allowing for rapid aggregate calculations. This can result from processing numerous potential deals on a periodic (e.g., nightly) basis based on changed input parameters such as automotive equity, residuals and financing terms as described above.

The system (which can comprise a visual discovery tool) may be able to provide real-time results for an OEM as various variables are manipulated. Real-time results can refer to results or changes that are rendered or occur within a conveniently short amount of time—less than a day or less than a minute, for example. Some systems allow for real-time updates to occur at least multiple times per day. Some systems allow for real-time updates to occur more rapidly than a human can detect the change on a screen. Often, the system must process large amounts of data, so minimizing the amount of data the system sorts through can assist by making it either much faster, more efficient, or more amenable to experimentation and therefore more intuitive. In some embodiments, some inputs can be variable, and some held fixed. Some variables can change to constants (e.g., be set as constant using one or more input controls described below). The system can make calculations on relevant data in advance so that when the input controls are adjusted the number of calculations required in real time is minimized, thus allowing for a smooth or otherwise convenient output on the display. Pre-packaging data, pre-calculation (e.g., of parameters or analysis results), pre-association of parameters with corresponding data sets, periodic storage of associations, and other techniques can be used to improve real-time functionality and otherwise save system resources. A user interface can take advantage of real-time functionality by visually presenting a curve or other dataset that changes dynamically as parameters are adjusted by a user. This can aid in optimizing how a marketing budget is spent, for example.

An OEM can use existing customer information stored in, for example, the OEM data system to identify prime opportunities for marketing outreach, even before potential customers consider themselves to be in a market for a new car. Such outreach can be to loyal customers as part of a loyalty or rewards program. Automotive deals are particularly likely when a potential customer can make monthly payments that are less than, equal to, or not greatly exceed the customer's current monthly automotive payments. The OEM data system can calculate when customers can renew a contract or financing terms to allow them to drive an equivalent or newer car while making a lower or similar payment.

Thus an OEM usage engine that identifies, ranks, or limits its search results to these potential customers who are most likely to make a new lease or purchase is highly valuable. It can be especially helpful for such a search function to remove or eliminate search results for those that do not meet these conditions, or focus on those that do meet them. Results from a customer data mining or searching process within a DMS for high-likelihood potential deal prospects can be referred to as "alerts," because an automated system can alert a dealership to a prime opportunity for a new sale that the dealership may have otherwise missed, given how complicated and difficult it is to identify such candidates with all the variables in a new car deal.

Thus, OEM database searching is best served by predictive systems and methods that can alert dealers to the small percentage of favorable sales opportunities that exist at any given time within the large population of potential customers (e.g., past customers still making payments) who are not actively shopping for a new vehicle. Ideally, such systems are configured to transmit an alert to a dealer in cases in which the system determines that a customer is able to enter into a new financial arrangement on terms favorable to the customer. Such alerts identify the customer and the favorable financial terms. Using the alerts, a person (such as an OEM employee) may proactively contact a customer to offer the potential replacement agreement or notify a dealership to do the same.

To find favorable sales opportunities within a population not actively shopping for a new vehicle, a system can search for and target offers or other deal proposals for people currently paying on an existing vehicle (loan or lease).

The financial terms of an example potential deal or transaction include, among other things, the candidate customer's monthly payment and the number of payments made, and remaining, on the customer's existing vehicle. The system can determine a trade-in value for the existing vehicle derived from one or more suitable sources (e.g., based on the mileage and condition of the vehicle). The system can estimate an equity value for the existing vehicle derived from the financial terms for the vehicle. The system may also assume a constant equity value based on a user input or on general vehicle ownership statistics. To assess whether a favorable deal may be offered, the system may determine prospective financing terms for vehicles that may be offered as replacements for the existing vehicle.

The system determines the new monthly payments that the candidate customer would pay for the replacement vehicle based on the equity in the existing vehicle and/or on the prospective financing terms for the replacement vehicle. The system can use any financing scheme, such as a lease, a balloon payment loan, or a purchase payment loan.

The OEM system calculates the difference between the candidate customer's existing monthly payment (for the existing vehicle) and the new monthly payment (for the replacement vehicle). The system may use this difference in monthly payment as a predictor as to whether a sales opportunity exists for the dealer, i.e., whether it may be favorable for the candidate customer to replace the existing vehicle with the new vehicle. To conduct this assessment without input from the candidate customer, the system uses preset criteria for what is deemed to be favorable. The system, for example, may be configured to consider a deal "favorable" when the difference in payments is below a certain threshold, such as zero, or if the result is negative (i.e., the new payment is less than or equal to the existing monthly payment). The system may also be configured to consider a deal favorable when the difference in payments is less than or equal to a threshold payment, such as 10% of the existing monthly payment (i.e., the new payment is less than or equal to 110% of the existing monthly payment), or any other value deemed suitable to the dealer.

When the system determines that a deal is "favorable" under the dealer's criteria, it can generate a message and transmits the message to the dealer, alerting the dealer to the associated sales opportunity. A deal sheet can be generated and may include information on the candidate customer, the existing vehicle, and the existing financial terms. It can further include information on the new vehicle and prospective financing terms. However, frequently sensitive data (e.g., customer name, customer contact information, dealership from whom the customer has purchased the vehicle, etc.) is withheld from the view of the OEM in the OEM system. In this way, an OEM can retrieve the necessary information needed to set an incentive for an offer and to send out the offer to a targeted individual, subset of individuals, or band of customers without being exposed to information that should not be provided to the OEM.

Many people paying off car loans have little equity, no equity, or negative equity in their existing vehicles, and for such people the system may find no favorable transactions and may generate no alerts for the dealer. The system may perform batch comparisons to allow an OEM to look for alerts within a large database of candidate customers (e.g., a population of past customers who purchased vehicles from the dealer under a loan or lease). Batch processing is an efficient way to generate from a large database of candidate customers only those select customers most likely to be receptive to replacing their existing vehicle with a new one. Thus, an OEM usage engine 244 can be selective and predictive in identifying for the dealer which candidate customers not actively shopping for a new vehicle are the best targets for a sales pitch.

The system may provide "stealth" (e.g., customized or private) offers to individuals who qualify based on one or more invitation variables, such as, for example, the type of vehicle they own, the value of the vehicle, the current interest rate on the vehicle, the current available interest rate, a level of loyalty with the OEM's vehicles, a geographic location, and/or an available incentive. Stealth can refer to the fact that the OEM's competitors are not immediately aware of the offers (undermining their ability to provide similar competitive offers). Stealth offers can be a form of benign but effective "price discrimination" that tries to find individual transactions between willing parties to the overall economic benefit of both. A stealth offer campaign can be helpful to an OEM that wishes to improve the chances that individuals contacted will accept the offers, while avoiding a public campaign that could be copied by another OEM (e.g., a competitor to the OEM user). Stealth can be desirable to gain extra time before a marketing campaign is discovered, copied, or otherwise undermined by public knowledge. These stealth offers can be sent to targeted individuals, e.g., before a more broadly available incentive is provided to a larger group of potential customers. In some cases, the incentive for the stealth offers is more attractive than an incentive for a larger group of customers and/or potential customers because, for example, it can allocate funds more efficiently to achieve more numerous deals for the same marketing budget. The stealth offers may be made directly to the customers using, for example, mail, telephone, the Internet, and/or in person. In order to maintain privacy of customer information, a stealth offer communication can be initiated using a system that has access to the customer information but to which the OEM does not have access for this purpose, such as the data conditioning system 142 or the dealership data system 252. In this sense, a stealth campaign can assist an OEM in achieving deal parameters within a zone of efficient transactions, satisfactory to the OEM, the dealer, and a vehicle customer, while still providing different incentives to different customers. This can be accomplished while avoiding any notion of unfair discrimination based on a customer belonging to a legally protected class, because it may be based on vehicle age, lease age, and/or other objective and uncontroversial technical or commercial data. Similarly, the OEM can be prevented from knowing personal information about potential customers while dealerships retain control of such data (and the related relationships). The system may also allow an OEM to identify which dealership or dealerships include the customers where one or more incentive offers can be made. An OEM interface can include controls that allow for such adjustments in real time to analyze the data and results of different data inputs that an OEM can determine, as discussed herein. In certain embodiments, the system can identify a number of alerts based on which dealership the customers purchased or leased their last car from. In this way, private data can be restricted to only the authorized parties while providing targeted information to the OEM.

The OEM system may also allow the OEM to submit general offers to a group of individuals. Often, the general offers comprise the same incentive to each individual. The incentive used in general offers may be less attractive than incentive of stealth offers. Like stealth offers, general offers may be made using a variety of communication modes and may maintain data privacy as in the stealth offers above.

OEM Interface and Control

With reference to FIG. 4, the dealership usage engine 234 can transmit data to an OEM user interface 248. In certain embodiments, the OEM user interface 248 is more limited than the dealership user interface 238. This may be, for example, because the OEM does not have access to the same information as the dealership. In certain situations, the OEM may have access to far less data than the dealership. Examples of OEM user interfaces are included herein as FIGS. 8, 9A-9C, 12-14, etc. (Other interface options are also described).

Many of the problems described above with regard to an OEM's ability to determine the effect of a manufacturer's incentive (e.g., rebate) on its automobile sales while preserving the privacy of sensitive data (see above) can be addressed with a novel OEM user interface 248, backed by proper database control and security. Like dealerships, OEMs are often motivated to sell more automobiles. The OEM user interface 248 can help them do that. It can solve or at least greatly minimize the difficulty with which OEMs have with visualizing the effect of one incentive program or another.

Figure 8:
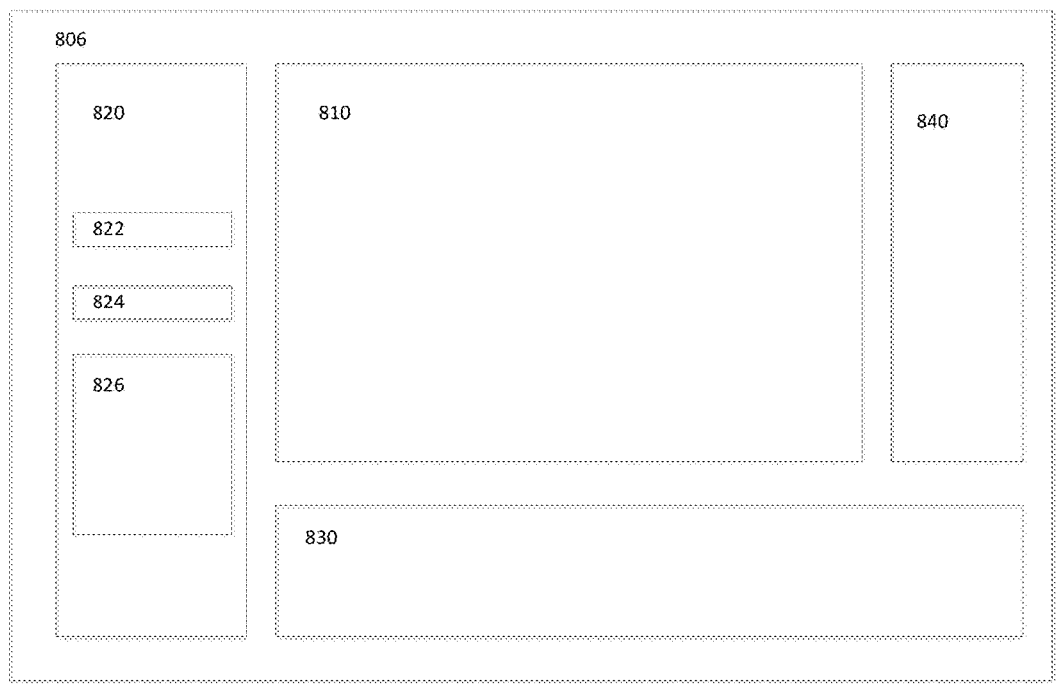
FIG. 8 illustrates a schematic view of an OEM user interface.

FIG. 8 illustrates a schematic view of certain embodiments of the OEM user interface 248. The user interface 248 may allow a user to toggle between two or more display screens 806. As illustrated, the OEM user interface 248 may include a display screen 806 that comprises two or more display fields 810, 820, 830, 840. A few of the available display screen configurations will now be discussed, but these do not represent all of the available displays in the various embodiments described herein. The size, arrangement and other design options shown in FIG. 8 et seq. are non-limiting examples.

In the embodiment illustrated in FIG. 8, the display screen 806 of the OEM user interface 248 includes a dynamic viewing window 810, an input control field 820, a summary field 830, and a miscellaneous field 840. The input control area 820 can include one or more virtual input controls 822, 824, 826. The input controls can include a virtual slider 822 that allows a user to adjust an amount of OEM incentive (e.g., rebate, subsidy, cash, better interest rate, number of APR "points" reduction, allowed budget). The slider 822 may range from zero to hundreds, thousands, or tens of thousands or more dollars representing the amount of incentive the OEM may be willing to provide on its vehicles. The input control 822 may take the form of one or more sliders, control knobs, a dials, up/down buttons, switches, and/or sorting devices. As shown in FIG. 8, the display screen 806 may include a second input control 824 similar to the input control 822, but some embodiments may have three or more input controls.

In some embodiments, other input controls 826 are available as well, such as, for example, checkboxes, text entry fields, multidimensional grids, a min-max slider or text entry field, and/or a selection tool. The display may further include a tool for entering a current and/or estimated annual interest rate of financing, a number of APR "points", and/or a term of the financing. The display may allow a user to identify vehicles based on one or more factors, such as, for example, whether a vehicle is leased or owned; the model, year, make, and/or trim of a vehicle; whether certain options are installed in a vehicle; the dealership from which the customer bought and/or leased her last vehicle; the level of loyalty of the vehicle owner/lessee; and/or a geographic location associated with the owner/lessee.

The dynamic viewing window 810 may include a map of a country or region where the OEM vehicles are sold. The country or region may be further divided into smaller geographic areas. The map may visually code one or more of the geographic areas to allow a user to quickly identify a number or approximate number of "alerts" in that geographic area. The visual code may include one or more colors, patterns, numbers, and/or textures for the geographic area based on the number of alerts. The number of alerts associated with each geographic area may be displayed on or near the geographic area to allow for easy identification of the number or trend of alerts in various geographic locations. The user interface 248 may provide one or more written and/or graphical outputs. The outputs can include a regional or country map, a bar chart, a line graph, a timeline, a heat map, one or more numbers, a probability and/or likelihood of success that a vehicle purchase will be made, and/or an image.

In certain embodiments, the system is able to dynamically display the results or a summary of the results of a user input in real time. Because of the vast amount of data that a system may be working with, it has historically been challenging to smoothly return dynamic results. However, the system may rely on one or more assumptions that can simplify the algorithm and reduce the burden of computation on the system, thus allowing for a seamless output. In some embodiments, the information on which the display relies is pre-computed and ready for access by the display module as needed. Computing the necessary information in advance may help provide a smoother viewing experience. The output may be based on a geographic region, dealership, type of car, year of the car, etc.

The user interface may project a simplified (e.g., minimalistic) design scheme in order to simplify use of the system for users (e.g., OEM employees). In some embodiments, the user interface initially presents the user with only a limited number of input options (e.g., fewer than three options, a single option). For example, the interface may provide a single input variable, such as, for example, a total available budget or incentive amount. The interface may take the user to a series of two or more screens, each of which allow a limited number (e.g., one or two) of inputs available from the user. In order to facilitate the simplified interface design, additional automation can be programmed to accomplish common tasks. For example if an OEM commonly performs analysis to identify a preferred slope of a ratio or curve associating budget spent with number of increased alerts based on current data, this analysis can be automated. A button can locate the steepest (or most efficient or productive) portion of such a curve, for example, and report to a user a midpoint or other characteristics of the curve. For example, if a standard public OEM incentive amount is $513 per customer, but a range of $344-$581 also provides similarly efficient predicted results, these data points can be calculated and reported through a simplified interface to a user without requiring the user to spot the pattern or eyeball the curve.

In some display options, alerts can be displayed individually (e.g., when the number of alerts is small enough, or when the option for individual alert display has been selected). In some embodiments, alerts may be displayed using different colors. An alert may be associated with, for example, a probability or likelihood that a future transaction may be completed with an individual associated with that alert. For example, an alert with an associated high likelihood of a completed transaction may be green whereas an alert with an associated lower likelihood of transaction may be red. In embodiments where data security and/or privacy is desired, the alert information that is displayed can be restricted to non-sensitive data, such as the likelihood a particular alert is willing to purchase a vehicle and/or a lease.

One or more summary fields may include many of the display elements described above. A summary field 830 may allow user to see the results in a different format side-by-side with the dynamic viewing window 810. The summary field 830 may include, for example, a total number of alerts, a percentage of customers who are alerts, a number of estimated sales, a total estimated cost of the subsidies, and/or a number of additional alerts over a baseline subsidy. The summary field 830 may also display graphical information. For example, the graphical information may include a bar chart of the number of alerts by vehicle trim, a bar chart of the number of alerts by region, a timeline of estimated costs and/or revenue, and/or a graph illustrating total net profit compared to incentive amount.

One or more miscellaneous fields 840 may optionally be included in the display screen 806. A miscellaneous field 840 may include any of the information described above. In some embodiments, a miscellaneous field 840 may include numerical data, graphical data, real-time alert data, one or more illustrations, a portion of one of the other fields of the display screen 806, and/or other information that may be useful to a user. For example, a miscellaneous field 840 may include a base alert count, a base percentage of customers, a dealer count, and/or a number of alerts by category. The category may include, for example, a vehicle make, model, trim, year, and or region, etc.

Figure 9A:
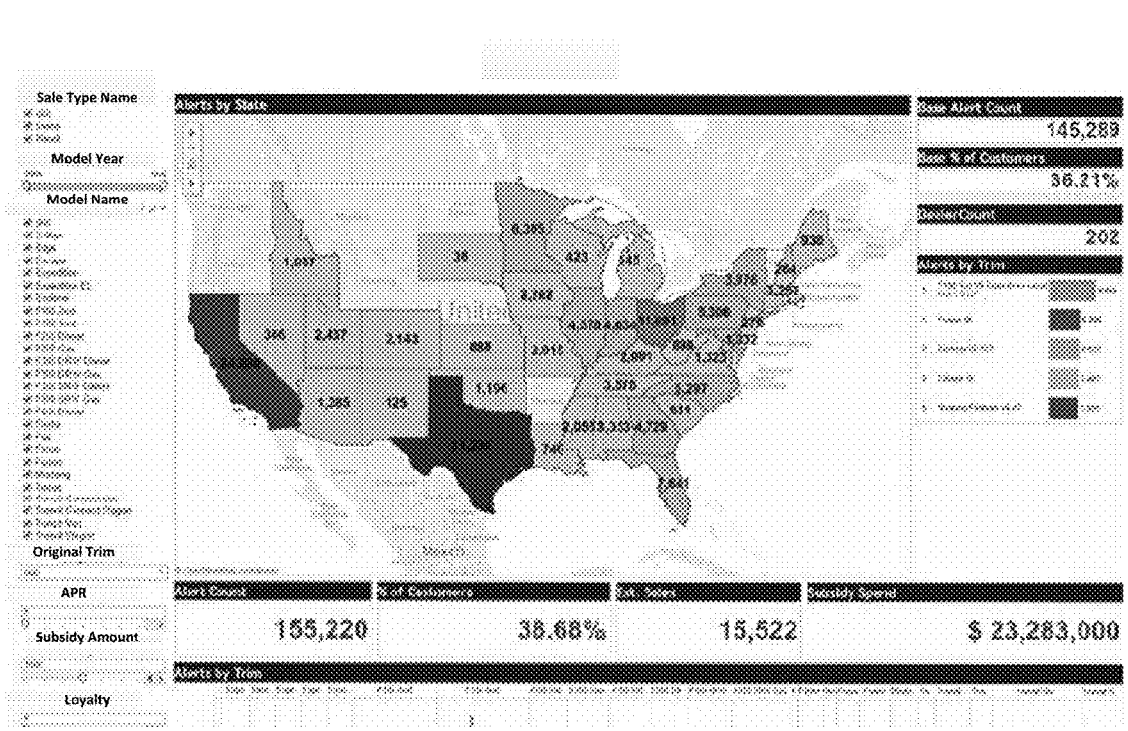
FIG. 9A illustrates an example output of an OEM user interface.

FIG. 9A illustrates an example output of the system. This display may be for a user (e.g., OEM employee). As shown in FIG. 9A, a geographic map of the United States includes geographic boundaries represented by some of the different states. As shown, each state indicates a number of the alerts associated with that state. The greater the number of alerts, the darker the color of the state is. In some embodiments, the color may be associated with a proportion of alerts for the region rather than an absolute number of alerts.

With further reference to the embodiment of FIG. 9A, the OEM can select the sale type name, a range of model year, a model name, a trim, an annual percentage rate (APR), a subsidy amount, and a level of loyalty. The OEM can receive outputs, such as, an alert account, the percentage of customers, and estimated number of sales, a subsidy spread, a base alert account, a base member of customers, a base percentage of customers, a dealer count, and/or a number of alerts based on a variable (e.g., make, model, year, location)

Figure 9B:
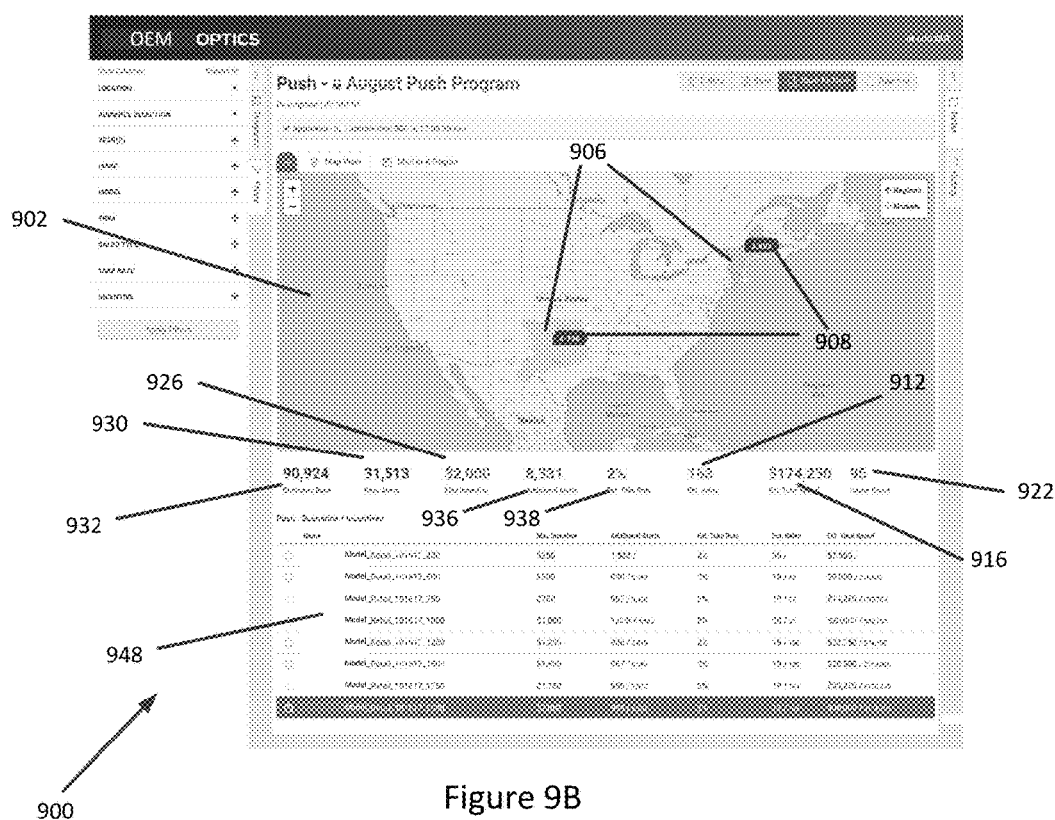
FIG. 9B shows an alternative embodiment of an OEM user interface.

FIG. 9B shows another example embodiment of an OEM user interface 900. The OEM user interface 900 may include a geographic map 902. The geographic map 902 may allow a user to select and/or establish one or more geographic regions 906. Each geographic region 906 may display a total number of region-specific alerts 908 for the corresponding region, and this number can adjust dynamically, for example. The display can be configured to allow a user to manipulate the size and/or shape of a geographic region 906. The system can be pre-populated with sales territories which can be selected individually or in combination. As the user changes the size and/or shape of a selected geographic region or regions 906, the display may update the corresponding region-specific alerts 908 in real-time and/or automatically. In this example, a sales territory in northern Texas and Oklahoma is shown to have 4,728 opportunities under current parameters, while a territory in the northeast U.S. is shown to have 3,603.

The OEM user interface 900 may include a current total customer base 932 and/or a base number of alerts 930 (e.g., of that current total customer base 932). These totals can apply to the selected marketing territories as a basis for comparison. The display may further include a maximum incentive amount 926. The display may be configured to allow a user to toggle or adjust the maximum incentive amount 926 (e.g., using a slider, using a dial, through direct input). The maximum incentive amount can be a total marketing budget established for a certain time period by an automotive manufacturer or OEM, for example. The display may be configured to update the geographic map 902 and/or one or more geographic regions 906 (e.g., with associated number of region-specific alerts 908) as the maximum incentive amount 926 is adjusted. This maximum incentive amount can be a cap on individual incentive offered to any given customer, and this cap can be established by a user of the system for analysis purposes. The OEM user interface 900 may show a number of additional alerts 936 in addition to the base number of alerts 930 based on the maximum incentive amount 926. Based on an estimated take rate 938 (e.g., an estimated rate at which those offered these opportunities will accept them), the display may be configured to display an estimated number of sales 912 and/or estimated total spend 916. These estimates can apply specifically to the presently-selected marketing territories. The display may allow a user to adjust the estimated take rate 938 to adjust the estimated number of sales 912 and/or estimated total spend 916. In some designs, the display may allow a user to set the estimated total spend 916 and/or estimated number of sales 912 to determine one or more variables (e.g., the maximum incentive amount 926). The OEM user interface 900 may show a total number of dealers 922 that would be involved in the estimated number of sales 912. The location and/or number of the dealers may be shown on the geographic map 902, such as in or near the corresponding geographic regions 906.

The OEM user interface 900 may display a vehicle-specific (or potential customer-specific) detail 948. This can include "Push-Scenarios/Incentives." The vehicle-specific detail 948 may allow a user to filter and/or search based on sale type or any of the variables described above. The vehicle-specific detail 948 may display specific vehicle types (e.g., model, make, trim, year), an associated max incentive for that vehicle and/or customer, a number of additional alerts, an estimated take rate (which typically corresponds to the overall estimated take rate above at 938), a number of estimated sales, and/or an estimated total spend (e.g., on that vehicle type). One or more of these vehicle types (e.g., combination of vehicle types) may be selected as shown. The geographic map 902 may be configured to show a number of region-specific alerts 908 associated with the one or more vehicle types. A user may search and/or sort based on the vehicle type, max incentive, number of additional alerts, estimated take rate, estimated number of sales, and/or estimated total spend for that vehicle type. An interface such as this can allow an OEM user to calculate and analyze the effect of incentives to sell a particular type of vehicle in one or more particular regions. Thus, this can act as a visual discovery tool allowing an OEM discover different ways to target marketing budgets to achieve desired and tailored results (including by adjusting inventory, making room for newly manufactured cars, reducing storage and maintenance costs, demonstrating market relevance, winning industry awards, impressing stock analysts, etc.)

Figure 9C:
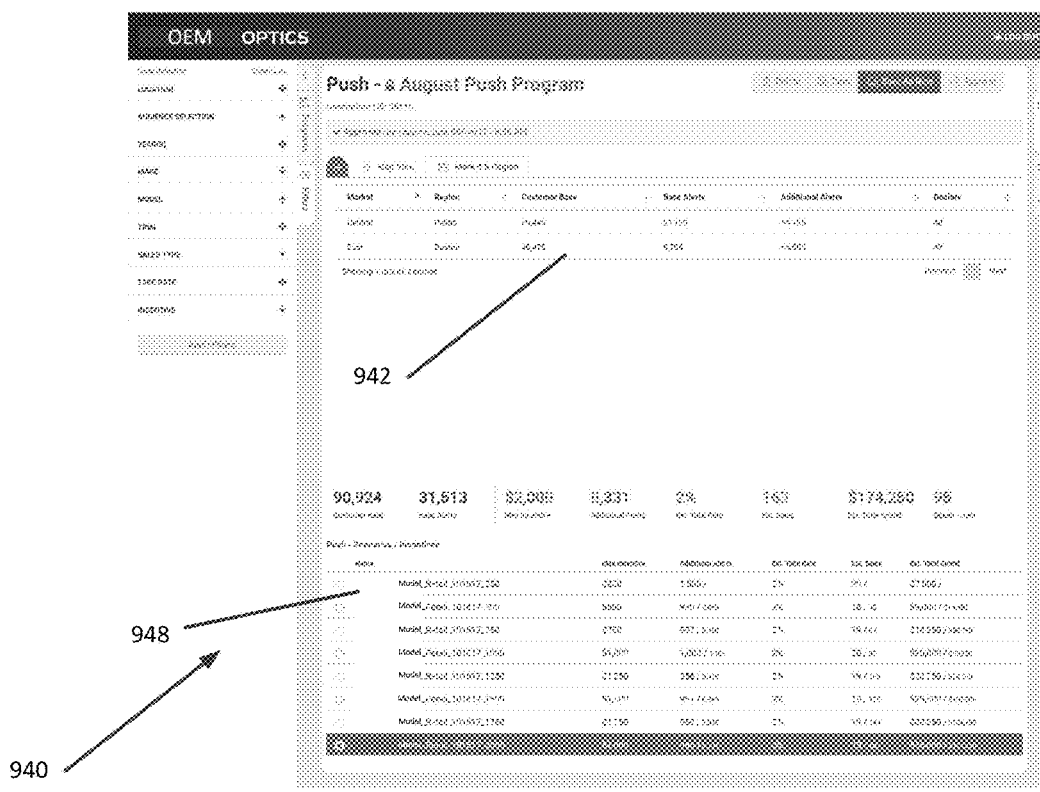
FIG. 9C shows an alternative list view of an OEM user interface.

The vehicle-specific detail 948 may represent a diminishing returns table. For example, the system may be configured to allow a user to sort a max incentive (e.g., based on the selected vehicle type(s)) from lowest to highest. The number of additional alerts corresponding to that vehicle type's max incentive may be displayed in the table of the vehicle-specific detail 948. A user may easily be able to see an increase in the number of additional alerts as the max incentive for a particular vehicle type is increased. For example, the number of additional alerts created by an incentive of $1000 results here in 1,003 additional alerts for a total of 4,463 alerts. The number of additional alerts for incremental increases in max incentive never exceeds 1,003 alerts for the dataset presented here. Accordingly, a user may conclude that a $1000 incentive should be used to maximize marginal returns on incentive dollars. As shown in FIG. 9C, a user may see diminishing returns in terms of alerts after a threshold max incentive value (e.g., $1000). As shown, each dollar of incentive above $1000 creates a smaller set of additional alerts. In this way the alert engine (e.g., alert engine 134) may be configured to maximize an aspect of the OEM offer.

In an alternative list view 940 shown by FIG. 9C, a regional alerts detail 942 may be shown (e.g., in place of a map). The OEM user interface 900 may be configured to allow a user to toggle between the map view (shown in FIG. 9B) and the list view 940. The regional alerts detail 942 may indicate markets (e.g., geographic region 906), a corresponding customer base (e.g., based on the current total customer base 932), a corresponding number of base alerts (e.g., based on the base number of alerts 930), a corresponding number of additional alerts (e.g., the corresponding number of region-specific alerts 908), and/or a number of dealers in the corresponding market (e.g., based on the total number of dealers 922). These numbers can dynamically adjust as other parameters are changed to assist in optimization for a particular goal of an OEM.

Figure 12:
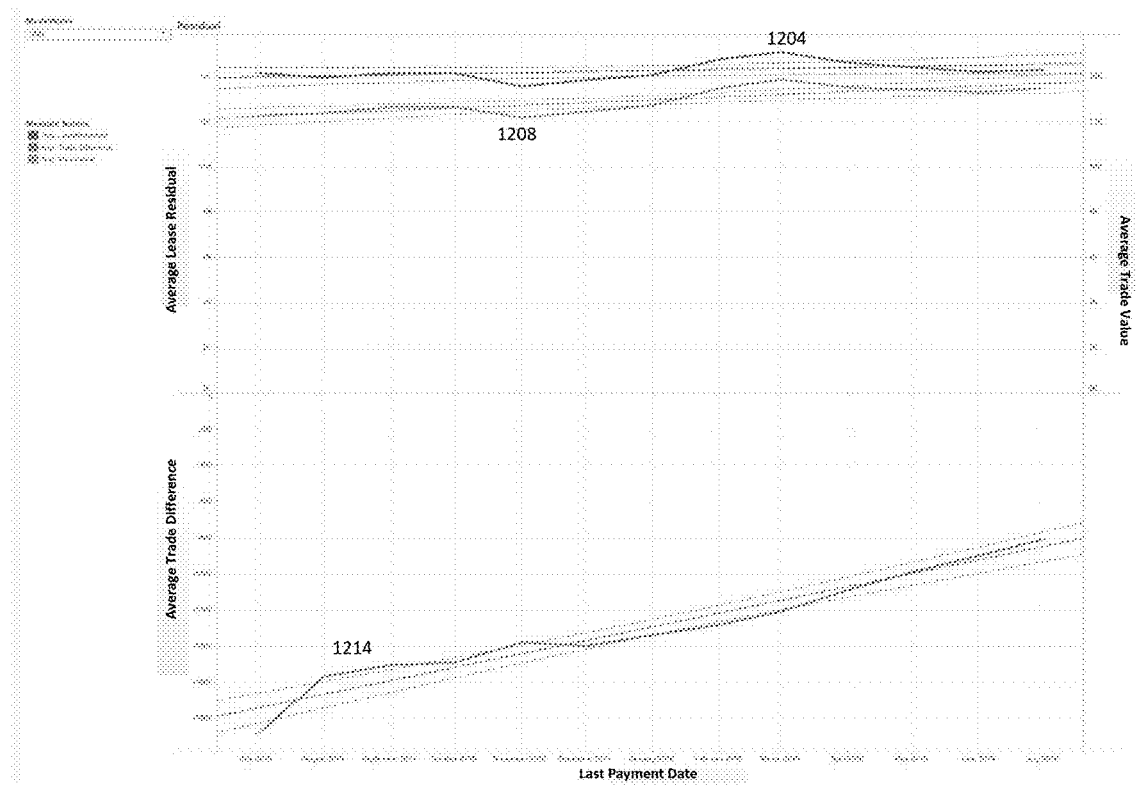
FIG. 12 illustrates an example output of the OEM user interface.

FIG. 12 provides another example output for an OEM user interface 248. FIG. 12 shows two graphs stacked on one another. The lower graph shows a line 1214 that tracks the average trade difference over time, based on a date of the last payment. The average trade difference may be calculated by subtracting a value in a customer's vehicle (or multiple customers' vehicles) from an estimated or known trade-in value of the vehicle. The trade-in value of the vehicle may be determined in a number of ways. For example, it may be estimated based on average trade-in values for other vehicles of similar make, model, year, and/or trim. The estimated trade-in value may also be based on an estimated mileage of the vehicle or a known mileage of the vehicle (e.g., after the mileage has been checked during a repair or inspection). The trade-in value may further depend on the quality of the vehicle exterior, interior, and/or mechanical function. The average trade-in value is displayed by the line 1208. The average lease residual of a vehicle or vehicles is also shown in FIG. 12, represented by the line 1204.

The average trade difference 1214 may be determined from a relationship between the average trade value 1208 and the average lease residual 1204. For example, the average trade difference 1214 may equal (for any given time) the difference between the average trade value 1208 and the average lease residual 1204. As shown in FIG. 12, the y-axis of the graph showing the average trade difference 1214 may run from –$2000 to $0. The x-axis may span an amount of time (e.g., 1 year, 2 years, 3 years, etc.). The graphs showing the average lease residual 1204 and average trade value 1208 may have values along the y-axis that span from $0 to $15,000. Thus, the value of the average trade difference 1214 may be substantially smaller than the average lease residual 1204 and/or the average trade value 1208. A user interface displaying the information shown here can assist in analyzing or setting a threshold amount or a time for an OEM incentive. For example, an OEM user can review the line 1214 to discover that for a particular model of car, average trade difference has reduced in absolute value and progressed from approximately negative $1,800 in July 2015 to approximately negative $800 in July 2016. Thus, an incentive can be offered in July 2016 of approximately $800 in "dealer cash" that may induce lessees of the vehicles that contributed to this data set to change vehicles and sign new lease agreements for similar payments. Reviewing the data here can also help an OEM decide a proper range for private offers—for example, offering not more than $1,800 and not less than $800 in dealer cash. Conclusions drawn will likely vary, depending on the goal and constraints of a marketing campaign.

The graphs shown in FIG. 12 may be modified by a user by adjusting one or more parameters. For example, as shown in FIG. 12, a vehicle type (e.g., model name) may be toggled to target a specific variable or combination of variables. Other variables not shown in FIG. 12 may be modified to display similar graphs for corresponding vehicles. For example, such variables may include a make, a model, a model year, a trim, a number of miles accumulated, a purchase date, a date range, a car color, a number of previous owners, a geographic location, and/or luxury type. A user may use one or more of these variables to focus in on a particular group of vehicles for comparison in determining an incentive amount. The user may use the graph (e.g., average trade difference 1214) for identifying a threshold limit. For example, the system may be configured to allow a user to determine a group of owners to whom to send specialized incentive offers (e.g., automatically). Owners of vehicles who may become alerts when offered an incentive greater than an absolute value of the average trade difference 1214 may receive such specialized offers. The system may be configured to submit a general offer to the remainder of car owners included in the graph of FIG. 12 who did not receive specialized offers. In this way, the system can reduce time and errors during outreach.

Figure 13:
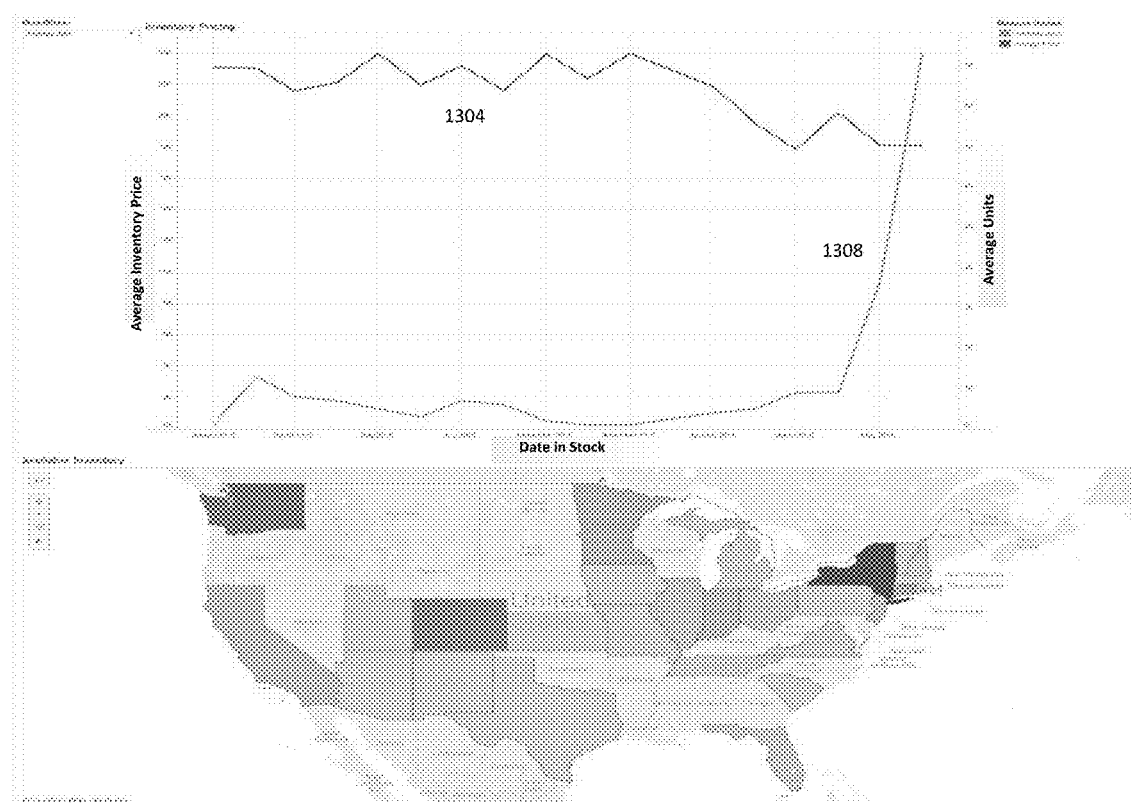
FIG. 13 illustrates another example output of the OEM user interface.

FIG. 13 illustrates an example output of the OEM user interface 248. In the embodiment illustrated, a graph illustrating inventory pricing and a number of vehicles in the inventory over time is displayed over a map of the United States, where the United States are separated into a number of states color-coded based on one or more variables. In the graph, a line 1304 represents the average price of a vehicle in a certain category of vehicles (e.g., according to the category preferences of the user) over time. The y-axis on the left-hand side of the graph can range from $0 to $24,000, for example. The x-axis may represent a date in stock, such as across a few months. A separate line 1308 represents the number of units in the inventory of, for example, the OEM and/or one or more dealerships with which the OEM works over time. The y-axis on the right-hand side of the graph may range from 0 to units. An OEM may use this information to help achieve desired (e.g., maintain constant) levels of vehicle inventory. For example, an OEM may offer greater incentives during periods when inventory is high, leading to more sales and inventory reduction. The juxtaposition of the graph of numerical data with the geographical information is useful for allowing a user to make decisions. For example, in some embodiments a user can place a cursor over a portion of one of the lines 1304 and/or 1308 to see a geographical distribution of inventory corresponding to the time or amount of the data at that point. Associating the display of information (and allowing a user to interact therewith) in this way can enhance the function of a computer and display running such a software interface because it reduces any need for constant switching back and forth between views and printing (or otherwise viewing) numerous snapshots. In some designs, the number of units 1308 may represent the number of units that are sold during a particular time. For example, the number of units 1308 may rise as the average price of a vehicle 1304 drops during that same period. An OEM may be able to use this information to determine an amount of an incentive. For example, an OEM may introduce an incentive after a drop in vehicle price. This may spur deals due to a perceived greater momentum of price reduction. An OEM may also use this visual discovery tool to correlate the effect of marketing campaigns with inventory changes of both new and used vehicles, thereby assisting with planning for future inventory changes and/or marketing campaigns.

A Residual Alert module can be used to watch or track the residual value of a vehicle (or an average residual of a set of vehicles) and create an alert (e.g., for an OEM) when the vehicle residual value and the trade-in value are within a threshold of each other. The threshold may be a value based on a monthly payment and/or a purchase price of the vehicle or average of a set of vehicles. This may increase the return on risk-adjusted capital provided as incentives (e.g., by an OEM). Such a module may employ data aggregation and security protocols to provide comfort to those who contribute sensitive data to an overall system through local auto dealerships, for example. For example, once data has been conditioned or otherwise standardized (as described elsewhere herein), it is more feasible to select fields or other data portions that should be suppressed, masked, or removed when data is shared with an OEM user. A state, region, city, or even dealership can be shared (as associated with a particular customer's financial and vehicle details), but not an auto owner's home address, cell phone, VIN, and/or credit score (or other data from which sensitive data can be inferred or reverse-engineered). Residual alert modules can be set to review aggregate data on a periodic basis, and a period can be selected (either by an OEM or otherwise).

A Lease Return Analysis module can be designed to monitor used-car values (e.g., through aggregation and averaging) and reduce the effect that spikes in these returns have on them. This module can help OEMs smooth out pricing by avoiding (or reducing) a flood of inventory on the market. For example, an OEM can use this tool to reduce incentives when a glut of returned vehicles is detected through this automated system. A graphic interface can be provided that shows a line reflecting number of returns, and when the line exceeds a certain threshold, for example, a warning can be provided that suggests suspending one or more factory rebates for vehicles of a similar or exchangeable type. Alternatively, the system can be used to dynamically adjust incentive levels in a more gradual and customized manner so that as more used cars are returned (and as the percentage of these types of cars creeps upward as a percentage of the overall market, for example), suggested incentive levels are commensurately increased or decreased, depending on the desired effect. Increased in new car incentives will tend to sell more new cars, thereby reducing inventory (and allowing for a more steady level of that type of car, new and used, to be available on the market). Decrease in new car incentives will tend to allow more new cars to be available for future shoppers so that if a typical percentage of used car shoppers change their minds, sufficient new cars are available for purchase.

Figure 14:
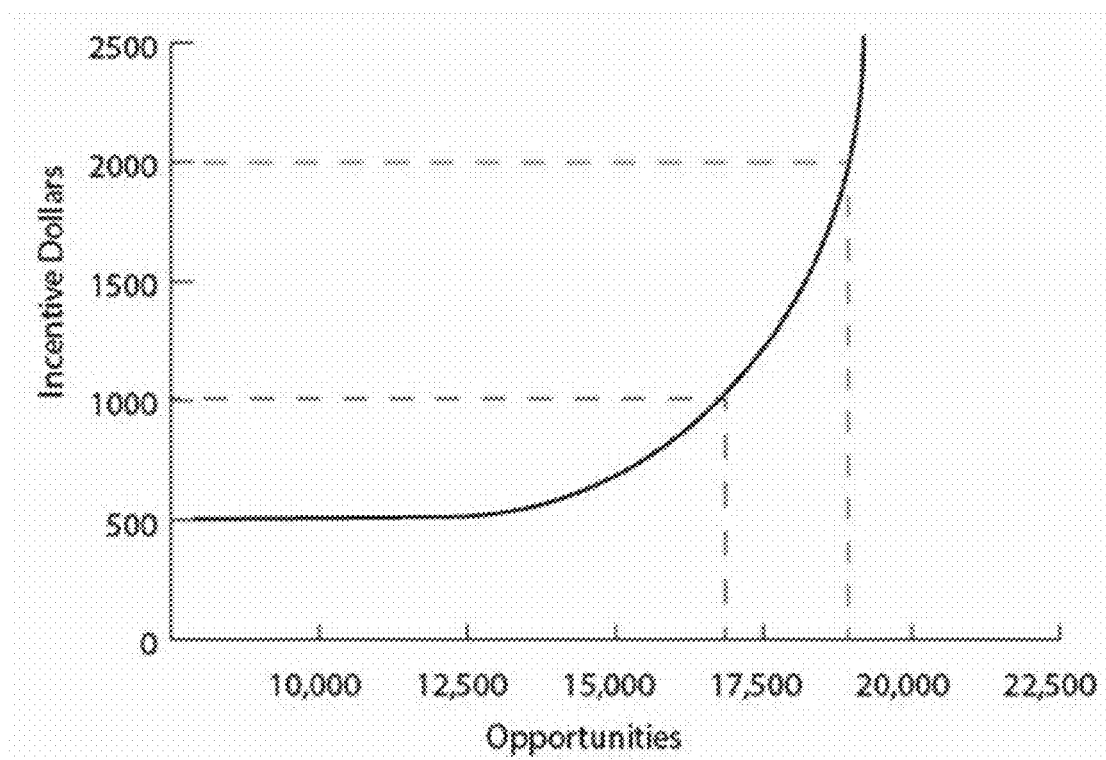
FIG. 14 illustrates a relationship between deal opportunities and incentive dollars.

A Subsidy Optimizer module can aid in identifying the diminishing returns on incentive dollars. A user interface version of this module can fill the role of a visual discovery tool. Local optima (with respect to different variables) can be "discovered" as on-screen interactive tools are adjusted with respect to each other. For example, FIG. 14 illustrates a relationship between a number of potential deal opportunities that are available and certain levels of incentives. The graph illustrates that as the number of deals increases, the incentive dollars required to achieve that number of opportunities may also increase (monotonically, linearly, or in other ways). As shown in the graph, the incremental return on investment of incentive dollars may decrease after a certain threshold number of opportunities that are available. A user interface that takes advantage of these relationships (e.g., by displaying them based on real data and allows points on the graph to be selected for display) can help an OEM quickly and/or visually identify (e.g. quantitatively, qualitatively) the boundaries or positions where the optimal return on incentive dollar can be achieved. The desired range may be where the slope of the graph is at a particular level or where the slope is above or below a particular threshold. Under certain circumstances, a given budget may dictate the relevant boundaries. However, available inventory can also be a limiting factor. Thus, a total amount of money or a total amount of opportunities may be set by a user, thereby constraining the portion of the curve that is truly relevant or available. Alternatively, the desired boundaries may be between two threshold slopes of the graph. The Subsidy Optimizer module may be configured to determine a number of potential opportunities that may arise based on a number of incentive dollars that are offered. The module can be configured to determine the relationship between incentive dollars offered and the number of opportunities presented, over a range of incentive dollars. As shown in FIG. 14, this range may be between, for example, $0 and $2500. Other ranges, denominations, and increments are possible. This information can be useful not only for the general offers (see above), but it can be as effective or more effective in determining which offers to make as "stealth" offers, as described above. Thus, optimizing or otherwise improving the return on incentive investments can be partially achieved by identifying a preferred slope or range of the illustrated curve. It can be further improved by allocating the incentive dollars within that range even more specifically to the most promising prospects having the most ideal lease or purchase situations and vehicle preferences.

In an alternative embodiment from that shown in FIG. 14, a user interface may display a number of potential sales opportunities based on a total incentive dollar budget (as opposed to the incentive dollars per customer, shown in FIG. 14). No matter which variables are displayed as axes of the two-dimensional plot, the visual discovery tool may be an interface that includes one or more dials and/or sliders. Each of the dials and/or sliders may be associated with a separate variable that the user (e.g., at the OEM) can manipulate (although some may be fixed and prevent manipulation, depending on data and mathematical constraints). In some designs, an output can be automatically updated (e.g., in real time) as the user manipulates the dial and/or slider. Such real-time display can be enabled from a database such as that described herein where data is conditioned, standardized, trusted, updated, and stored efficiently for rapid manipulation. Real-time display and adjustment can also be enabled by performing the calculations before-hand so manipulation of variable controls merely displays, rather than calculates in real time. However, real-time calculation is also possible, performed locally or on remote servers. For example, a slider may allow a user to select a particular total incentive dollar budget. The interface can be configured to display a total number of opportunities likely within that budget. In some cases, this total number of opportunities may include the total number of dollars based on different incentives for different incentives. For example, a first set of potential customers may only require a first amount of incentive dollars (e.g., $500) to become customers, while a second group might require a second amount of incentive dollars (e.g., $600) before becoming customers. The system (with the interface) may be configured to include these variations in required incentives when outputting a total number of opportunities. In other words, the system may not need to rely on applying a universal amount of incentive dollars per customer to determine a total number of potential opportunities. Other dials and/or sliders may be associated with other variables, such as vehicle year, vehicle type (e.g., model, trim), sale type (e.g., lease, retail purchase, used purchase), interest rate, geography (e.g., city, district, state), etc. The user may be able to toggle or adjust these dials and/or sliders to obtain immediately updated data output (e.g., number of opportunities). In some embodiments, an assumption can be built-in (or held constant) regarding the percentage of "alerts" (or opportunities) that will likely result in sales. Alternatively, an OEM user may be able to change the percentage to develop multiple projections, some more optimistic (e.g., based on economic surveys showing consumer confidence) and some more pessimistic, for business planning purposes.

The Subsidy Optimizer module may be able to automatically analyze an optimal value or range of values for the incentive, optionally according to input by a user. As described above the system may be able to determine a slope of a graph (e.g., incentive/subsidy vs. number of alerts). The desired slope may be calculated, for example, by plotting a set of dependent values (e.g., number of alerts, a probability of making a deal, efficiency/value of a deal prospect/candidate, residual value of an alert, etc.) over a range of independent values (e.g., cash subsidy amount, amount of rebate, annual percentage rate, payment frequency, equity value, credit score, customer loyalty rating, number of repair orders, etc.), fitting a curve to those points, and/or extrapolating or interpolating therefrom. Fitting the curve may include using an algebraic fit algorithm (e.g., ordinary least squares, Gaussian, Lorentzian, etc.) or a geometric fit algorithm (e.g., total least squares). The system may also calculate one or more derivatives on the data. Optionally, a first, second and/or third derivative may be used, for example.

In some embodiments, the Subsidy Optimizer module is able to optimize the number of deals and/or specifically which deals to make. The module may be able to automatically optimize/maximize these figures for a particular budget, which may be automatically set or manually input. The module may calculate, for example, what range of rebates (e.g., private rebates, public rebates) will maximize net profits. In some embodiments, the module can automatically select what proportion of deal candidates and/or specifically which deal candidates should receive private (e.g., stealth, customized) offers instead of public (e.g., general, non-customized) offers. While this Subsidy Optimizer (and all embodiments described herein) can be used by the OEM, similar embodiments allow for use of a similar module by the dealership (e.g., via the dealership management system and/or the alert database) and/or financial institutions providing capital for OEMs, dealerships, and/or consumers.

The system may allow an OEM to increase profitability through incentive planning and/or incentive maximization. The OEM may wish to bring in vehicles for repairs, inspections, tuneups, and/or incentive offers when market conditions will provide the highest likelihood of sales. The OEM may use the system to incentivize more customers to trade-in their used vehicles and purchase newer vehicles. In addition, the OEM may be able to increase the number of loans outstanding and/or increase the term of existing loans. This may be accomplished, for example, by targeting customers who are likely to qualify in a vehicle purchase. The system can also allow model-by-model campaigns, where incentives are concentrated on a particular model in order to reduce inventory (e.g., in a particular region of a country).

Thus, one control can be specific for a particular model manufactured by the OEM and an output can show amounts (or an aggregate amount) needed to achieve the number of opportunities that will likely be needed to achieve the desired sales of that model.

The OEM is also incentivized to make a positive experience for potential customers. Thus the OEM, like a dealership, is interested in improving its customer satisfaction index (CSI). This builds the brand of the OEM and strengthens his relationship with the dealerships with which it works. The system allows the OEM to focus time on the customer rather than waste time on the terms of the contract. Moreover, the system may allow the OEM to improve the trade-in cycle time.

The OEM may desire to maintain predictable and/or comfortable levels of inventory for self as well as for the dealerships with which it works. The system can allow the OEM and/or a dealership to more effectively allocate and plan future inventory levels. Moreover, the system can strengthen relationships with the customers themselves and increase customer loyalty. For example, the system can alert and OEM and/or dealership about favorable lease conditions available to a customer before the lease is up. This may remove a customer's likelihood of ending the lease and/or increase the length of time a customer is in the lease. Customer loyalty can also be increased by offering opportunities when a manufacturing defect is detected. Customers can be attracted into the dealership for favorable deals prior to their vehicle exhibiting symptoms of a known (or likely) defect, so they can be rewarded with different and potentially more reliable vehicles (for the same or similar payment levels).

The system allows an OEM to utilize potential deals (e.g., leads) in nontraditional channels. For example, it can allow an OEM and/or dealership to provide real-time offers to customers who are currently receiving service on their vehicles. This may be referred to as Service Lane Delivery. The system may help the OEM find a buyer and identify those who may be due for a service, and therefore may be interested in a deal, even when the customer may not even realize she is interested in buying a car, leasing a car, and/or trading in her current car.

A user interface can advantageously allow a vehicle salesperson to project scenarios to manufacturers on the clients that have been identified in a current contract search user interface. The proposed new contract settings user interface considers many possible combinations of incentives, subsidies, and situations that may be available to potential customers.

Existing approaches may require users to become familiar with and trained in complicated systems in order to take advantage of their many features. However, such training can be time consuming and difficult for some, and this may not provide as many options for alert delivery and data integration as would be desirable.

Although many systems and methods relate to the perspective of and benefits to an automobile dealer (or any retailer), similar analysis, systems, and methods can be employed to serve the goals of a manufacturer or other party that provides the products to the dealers, or who provides financing. Thus, all of the disclosure herein can be modified and used for the purposes of the manufacturer, who may have access to the above-described data and to data regarding how dealers use the above-described systems, etc. Moreover, predicting the effect of incentive programs can be useful for the goals not only of manufacturers, but also for dealers and those providing financing. The systems and methods described herein apply not only to automobile sales, leasing, and financing, but also to sales, leasing, and financing of many big ticket items, both by households and business (e.g., heavy equipment, appliances, etc.).

If a seller of products, such as an automobile dealer or dealership, knows when a customer is able to enter into a new financial arrangement under terms favorable to the customer, the seller can take advantage of this knowledge by offering a deal to the customer that includes the favorable terms. Accordingly, such knowledge, if possessed by the dealer, can drive increased sales, revenues, or profits. Such knowledge can also assist in the operations of an automotive dealership from a logistical and technical standpoint in improving data storage, optimizing network usage, or otherwise managing network resources more efficiently.

Banks and other lenders may work with automobile manufacturers and dealers to create and develop incentive programs. The term "incentive programs" generally relates to programs that may be offered to purchasers of automobiles in the hope of stimulating purchase interest in a vehicle and may include, for example, lower interest rates, lower money factors, loyalty programs, cash back incentives, deal cash incentives and rebates. Banks and other lenders may agree offer an incentive program for a particular make and model of a vehicle in exchange for money from the manufacturer of the vehicle. For example, a manufacturer may "buy down" the interest rate of loans underwritten by the bank for a make and model in the manufacturer's product line in the hopes of stimulating purchasing interest in the make and model. Banks also benefit from the stimulated purchasing interest in vehicles because they may be able to underwrite more loans, resulting in more revenue, and will also receive revenue in the form of the buy down. In addition, Original Equipment Manufacturers (OEM) may also provide incentives to stimulate purchasers interested in the vehicles where their products may be included, thereby increasing sales for the OEM's product. OEM incentives might include, for example, cash back incentives, free or low cost upgrades, extended warranties, etc.

Accordingly, banks and other lenders, as well as OEMs, may benefit from possessing knowledge of the effect incentive programs have on the terms of new financial agreements that may be entered into by customers. Since incentive programs can affect the total payout a customer might spend for a vehicle, certain incentive programs may broaden the pool of customers who may find a new financial agreement acceptable for a new vehicle because the incentive program might create terms that result in payments that are sufficiently similar to the payments the customer is making on their current vehicle. By identifying the effect of incentive programs on the potential customer pool, OEMs, banks and other lenders may advantageously suggest to dealers and manufacturers the best incentive program plans to offer prospective customers. For example, if a bank knows that offering 1% APR financing results in a 200% increase in the size of the potential customer pool but offering a $2500 cash back only results in a 50% increase in the potential customer pool, the bank may suggest the 1% APR as an incentive over the $2500 cash back incentive.

Embodiments of the systems and methods described herein evaluate the effect of planned, future or hypothetical incentive programs on a financial arrangement that could be offered to a customer. Examples of the hypothetical incentive programs include interest rate incentive, money factor incentives, loyalty programs, cash back incentives, and dealer cash incentives. In some embodiments, the system receives customer data corresponding to financial terms of current agreements of one or more customers and hypothetical incentive data comprising one or more incentives. Using the customer data and the hypothetical incentive data, the system may create a potential customer pool. The potential customer pool may comprise one or more customers for which a replacement product and a replacement financial agreement may have financial terms substantially similar to financial terms of a current product and current financial agreement. One example of a customer that may be in the potential customer pool is a customer who is currently paying $500 a month for a 2008 Mercedes Benz C-Class Sedan, but could take out a loan for the purchase of a 2011 Mercedes Benz C-Class Sedan at $525 a month.

In some embodiments, the system may generate a summary report once it determines the customers in the potential customer pool. The summary report may include the total number of customers in the potential customer pool. The summary report may also include the number of customers in the potential customer pool by segments. The segments may correspond to the current make and model of the customers' vehicles or it may correspond the model year of the customers' vehicles, or both. One example of a segment may be "2008 C300 Contracts" while another example of a segment might be "2008 Contracts." In some embodiments, personal information related to the customers is securely withheld from the OEM, bank or financial institution that is using the system to generate the report. For example, only the sum of the customers for each segment may be provided in the report. The names of the individual customers may not be in the report.

Once the effect of the incentive programs is determined, OEMs, banks or other lending institutions may suggest one or many incentive programs to dealers. By including such programs, dealers may target a larger group of potential customers that may be open to purchasing or leasing a new vehicle under more favorable terms.

Embodiments of the disclosure may be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

A system can assist car manufacturers and sellers in creating consumer-specific offers. These offers can incorporate data regarding, for example, the consumer's amount owed, monthly payment, previously-expressed vehicle preferences, car loan amortization rate, and/or equity in the existing vehicle. However, in addition to these ways of customizing the offer, described systems also allow an OEM to create a specific "manufacturer incentive" designed to create favorable conditions for a sale to that person. For example, an "alert" may be triggered if the automated system reveals that a particular potential customer can have the same, or lower, monthly payments on a newer version of a similar vehicle. To calculate this alert condition, one prominent input may be a special cash payment or temporarily lowered interest rate, offered by an OEM or dealer. In recent markets, such manufacturer incentives have been valued at an average of $3-$4,000 per vehicle sold. Although some systems may treat the manufacturer incentive as an input (often a fixed input, for purposes of calculation), the present system can calculate a range or a customized set of manufacturer incentives, which can be adjusted to achieved desired results. Thus, the manufacturer incentive can be an output from this automated system.

Figure 10:
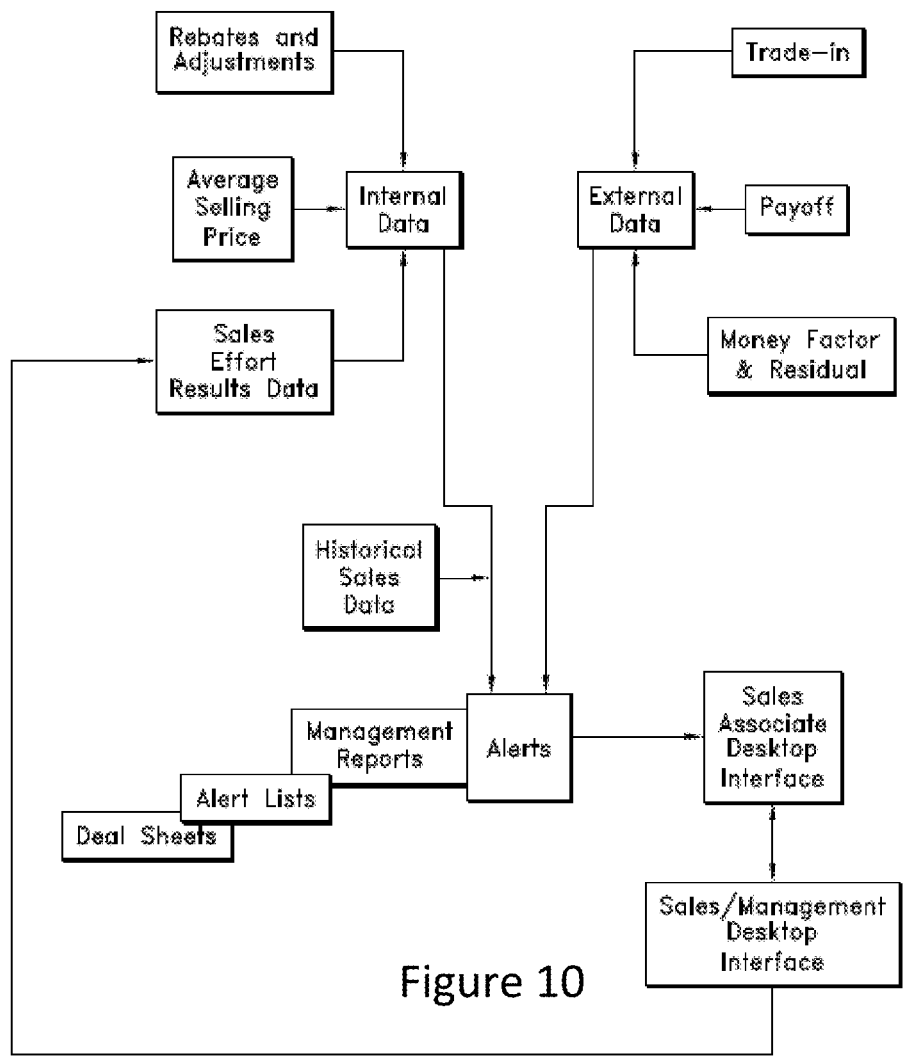
FIG. 10 illustrates an alert generation system attached to a computer network.

FIG. 10 illustrates an embodiment in which internal data, external data, and historical data are used to generate one or more alerts. The external data comprises trade-in data, payoff amount data, money factor data, and residual data. The internal data comprises rebates and adjustments, average selling price data, and sales effort results data. Management reports, alert lists, and deal sheets are advantageously provided. Further, a sales associate may access the system via a sales associate interface and a manager may access the system from an interface.

Alerts in the system of FIG. 10 are generated at the Alerts block. Details of the alert generation aspect are described in more detail below. The Alert block uses internal data, external data, and historical sales data to process customer information and generate deal sheets, alerts, and reports. Internal data, shown as the Internal Data block, can include information about rebates and adjustments, average selling prices, sales effort results data, and the like. External data, shown as the External Data block, can include information about trade-ins, payoffs, money factors and residuals, and the like. It should be understood that internal and external data can also include many other kinds of information including, but not limited to, financial information, customer information, retail information, market information, trend information, insurance information, vehicle registration information, or any other relevant data.

The Alerts block of FIG. 10 can be implemented as a module, comprising any combination of hardware, software, or both. In various embodiments, the Alerts block is implemented as an executable process or script running on a server. The script can run, for example, as a single process, a multi-threaded process, multiple processes on a single machine, multiple processes on separate machines, or as a transparently provided distributed process with resources that are dynamically provisioned. In some embodiments, the script can be implemented as coordinated distributed processes that communicate, for example, using an implementation of inter-process communication, remote procedure calls, the Message Passing Interface (MPI) standard, or the like. The Alerts script can, as described herein, access dealer and customer information, as well as other internal and external data, to generate and process alerts.

In various embodiments similar to FIG. 10, the system can maintain data for a plurality of client entities, for example, dealerships or service centers. Data for the client entities can be stored together, separately, locally, or remotely. In such embodiments, an Alerts script can generate and process alerts continually, periodically, in response to specified events, in response to monitored parameters, or in response to updated information (e.g., from customers, banks, retailers, manufacturers, or any other relevant data source). The Alerts script can, for example, process alerts for client entities sequentially, according to a schedule, according to a prioritized list or queue, according to available resources, or all at once. For example, client entities can be ordered on a prioritized list, and processing for client entities with higher priorities can be completed before processing for client entities with lower priorities.

Figure 15:
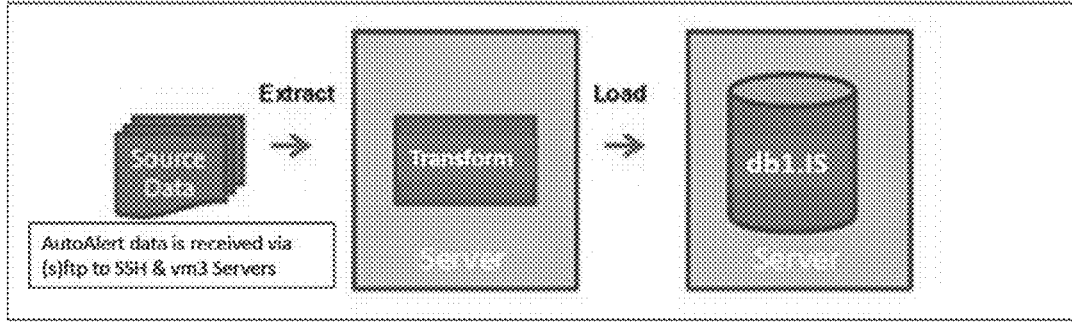
FIG. 15 illustrates shows a schematic model of the data flow from the source data to a first server where the data may be transformed or scrubbed.

FIG. 15 shows a schematic model of the data flow from the source data to a first server (e.g., a temporary storage module 130), where the data may be transformed or scrubbed. This process can be referred to as extraction. After the data have been scrubbed or transformed, the data are transferred to a second server (e.g., the database 138) in a load step. The use of the two-server approach can increase the speed and efficiency of the scrubbing of the data.

Figure 16:
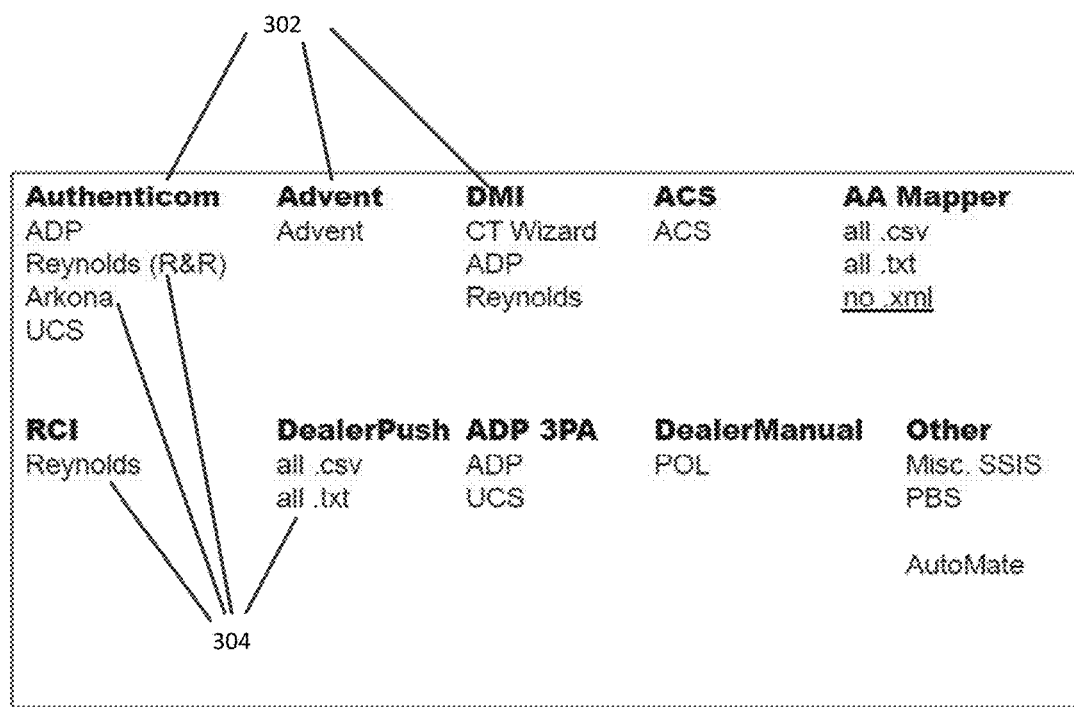
FIG. 16 illustrates various file formats that the data conditioning system can be configured to receive from one or more data sources.

FIG. 16 illustrates various file formats 304 that the data conditioning system 142 can be configured to receive from one or more data sources 114, 116, 118. The one or more data sources 114, 116, 118 may include vendors, such as a dealer management system, an original equipment manufacturer, and/or a lender.

Each file formatting system 302 may supply one or more file formats 304 to the data conditioning system 142 and/or data extraction applications 124, 126, 128. For example, the file formatting system 302 Authenticom may include the file formats 304 of ADP, Reynolds, Arkona, and UCS. The data conditioning system 142 may be configured to "normalize" each of the various file formats 304 from each of the file formatting systems 302. Normalization may include altering files that are received such that altered files are in a common format. File alterations may be verfied by a DataValidator and/or a Mapper processing module.

Figure 17:
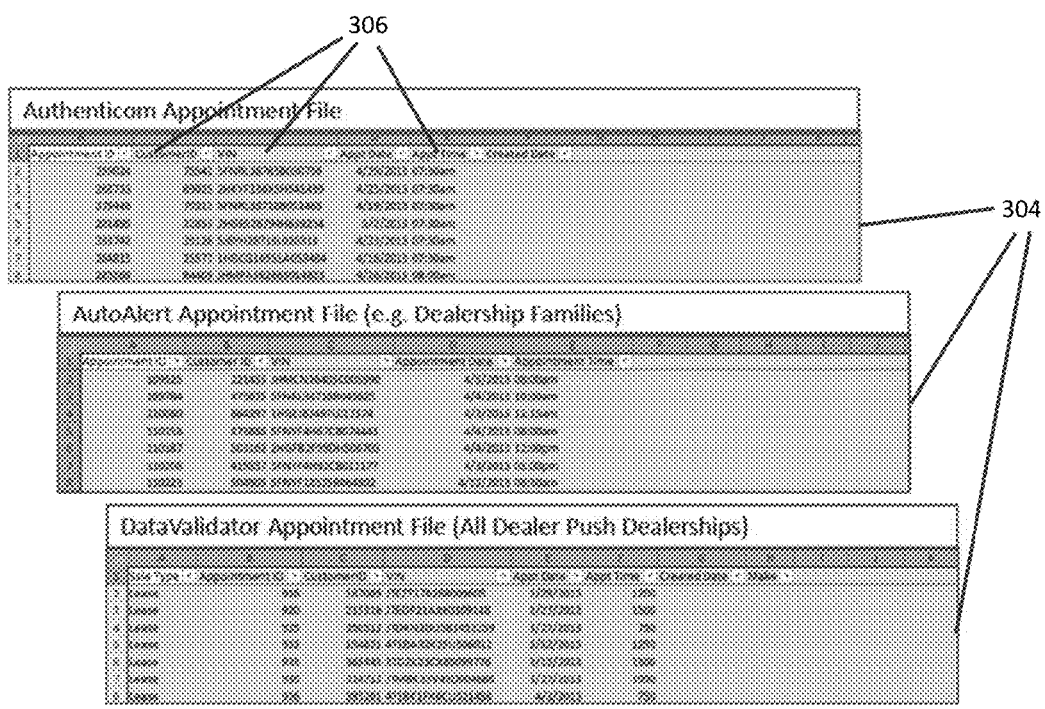
FIG. 17 illustrates how file data, such as appointment file data, may be stored in various file formats.

FIG. 17 illustrates how file data, such as appointment file data, may be stored in various file formats 304. The data extraction applications 124, 126, 128 may be configured to receive data in a spreadsheet format. The one or more file formats 304 may include various data headings 306, such as Appointment ID, CustomerID, VIN, Appt Date, Appt Time, Created Date, Sale Type, Make, or other such category (with the same or similar spelling). The data conditioning system 142 may receive from a first file formatting system 302 (e.g., Authenticom) data in a first format. In order to harmonize the data from the first format, a second file formatting system 302 (e.g., an internal AutoAlert file formatting system 302) may transform the data into a second format. The second file formatting system 302 may be configured to harmonize the data for one or more dealership families. In some designs, a third file formatting system 302 (e.g., DataValidator) may be configured to further alter the data sets to provide better uniformity among the various applications described herein. In some designs, the second and/or third file formatting system 302 may be included in the vehicle data conditioning and visualization system. While FIG. 17 shows multiple file formatting systems 302 for use in formatting data headings 306 within the broader context of appointments, the data conditioning system 142 can format data in other contexts as well (e.g., sales, service, inventory, etc.).

Figure 18:
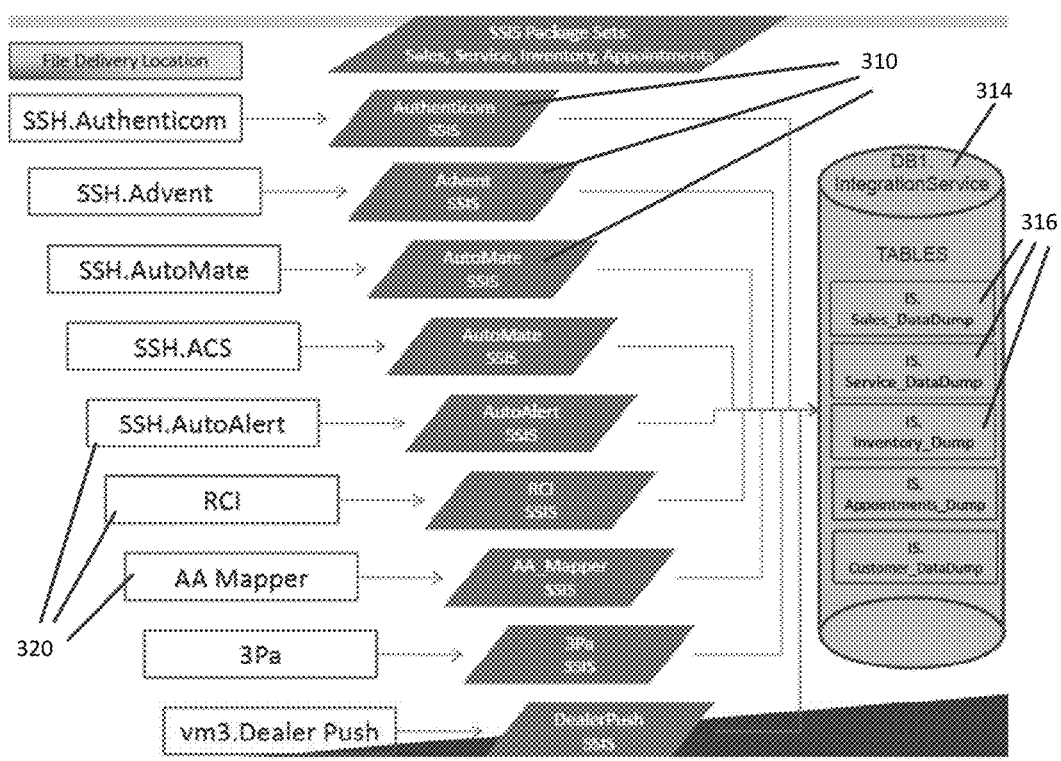
FIG. 18 schematically shows a model of data flow from the file source locations to one or more a first servers and then to a second server.

FIG. 18 schematically shows a model of data flow from the file source locations 320 (e.g., file delivery location) to one or more a first servers (e.g., SSIS package sets 310) and then to a second server (e.g., alert database 138). The alert database 138 may include an integration database 314. In some designs, one or more file source locations 320 can be coupled to corresponding SSIS package sets 310. The SSIS package sets 310 may be the DMS data extraction application 124, the OEM data extraction application 126, and/or the lender data extraction application 128 of FIG. 2. For example, as shown in FIG. 18 an SSIS package set 310 called Authenticom SSIS may be configured to receive one or more files from a file source location 320 called SSH-.Authenticom. One or more of the SSIS package sets 310 (e.g. Authenticom SSIS) may be configured to transfer the files to the second server, such as the integration database 314. The SSIS package set(s) 310 may be configured to transform and/or scrub the received files. In some designs, the data conditioning modules 132 may include one or more of the SSIS package sets 310. The second server may be called DB1.IntegrationService.

The SSIS package sets 310 may be configured to receive files based on the source location of those files (e.g., SSH.Authenticom, SSH.Advent, etc.). A dealership may use one or more of such source locations. The SSIS package sets 310 can be specified for individual dealerships and/or for specific software formats (e.g., file formats 304). The SSIS package sets 310 may be configured to sort the various data fields (e.g., data headings 306) into corresponding databases and/or servers. Each SSIS package set may be configured to receive files related to sales, service, inventory, appointments, and/or customers (or any combination of these). The SSIS package sets 310 may be configured to transfer files associated with one or more data categories 316.

Figure 19A:
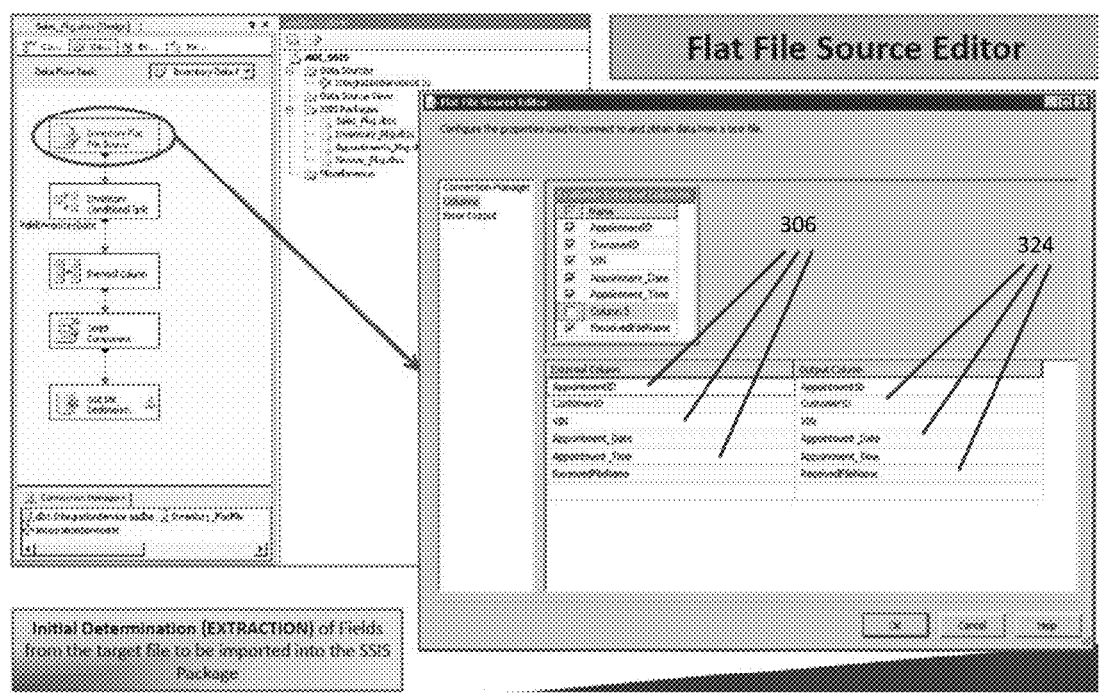
FIG. 19A shows a flat files source editor.

FIGS. 19A-19E schematically show various system modules that may be incorporated into a data conditioning system 142. FIG. 19A shows a flat file source editor. The flat file source editor can extract data, including source data headings 306, from the file source locations 320 and import them into the one or more SSIS package sets 310. The flat file source editor can be configured to receive data having source data headings 306 and to produce new intermediate data headings 324. The intermediate data headings 324 may be useful for harmonizing cross-platform data that can be processed by downstream modules. The intermediate data headings 324 may differ from the source data headings 306 in that letters and/or other symbols have been added and/or subtracted from the source data headings 306. Such data modification can be preliminary conditioning of the data conditioning system 142 to allow for further conditioning. The flat file source editor can be configured to pass the data to a conditional split module for further conditioning.

Figure 19B:
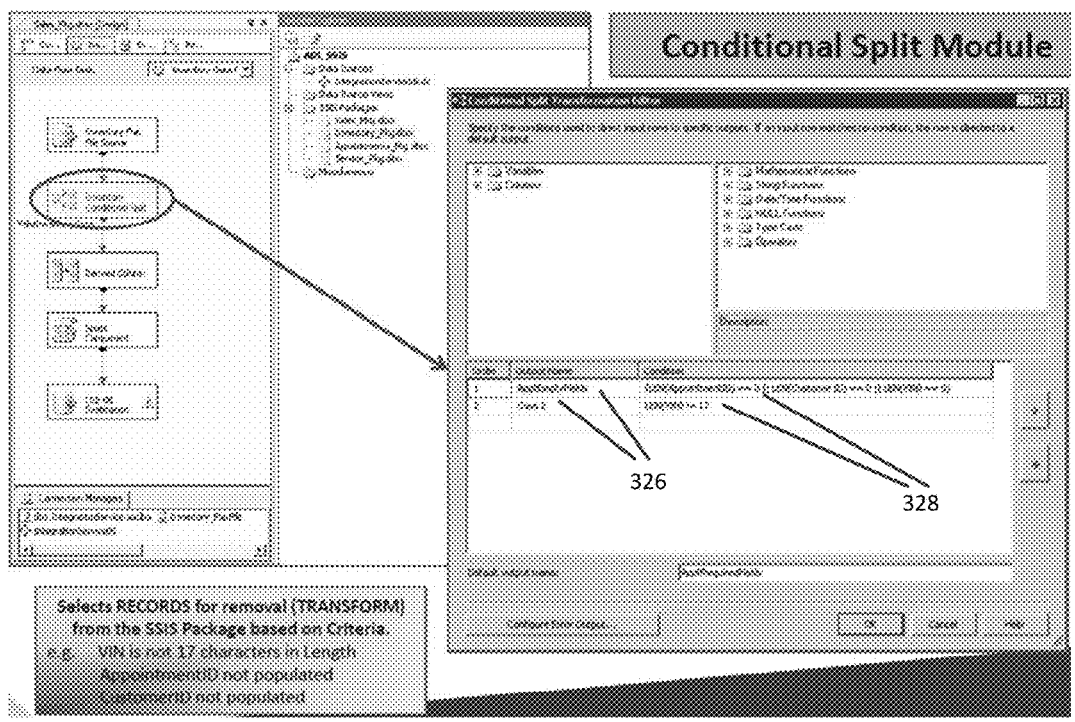
FIG. 19B shows data transformation outputs that the conditional split module produces when corresponding data transformation conditions are met.

Once the data has been extracted and preliminarily modified, a conditional split module may be used to further condition the data. FIG. 19B shows data transformation outputs 326 that the conditional split module produces when corresponding data transformation conditions 328 are met. The conditional split module can be configured to remove records from the files (e.g., in the SSIS package sets 310) based on various criteria or conditions. Removal of records may be helpful when the data cannot be properly modified and/or when the correct data cannot be identified. For example, an incomplete VIN may be removed since identification of the correct VIN may be challenging or impossible without the full and correct number. The module may be able to identify when other identifying numbers (e.g., appointment IDs, customer IDs) are incomplete. These incomplete identifying numbers can be removed when the correct number cannot be determined.

Figure 19C:
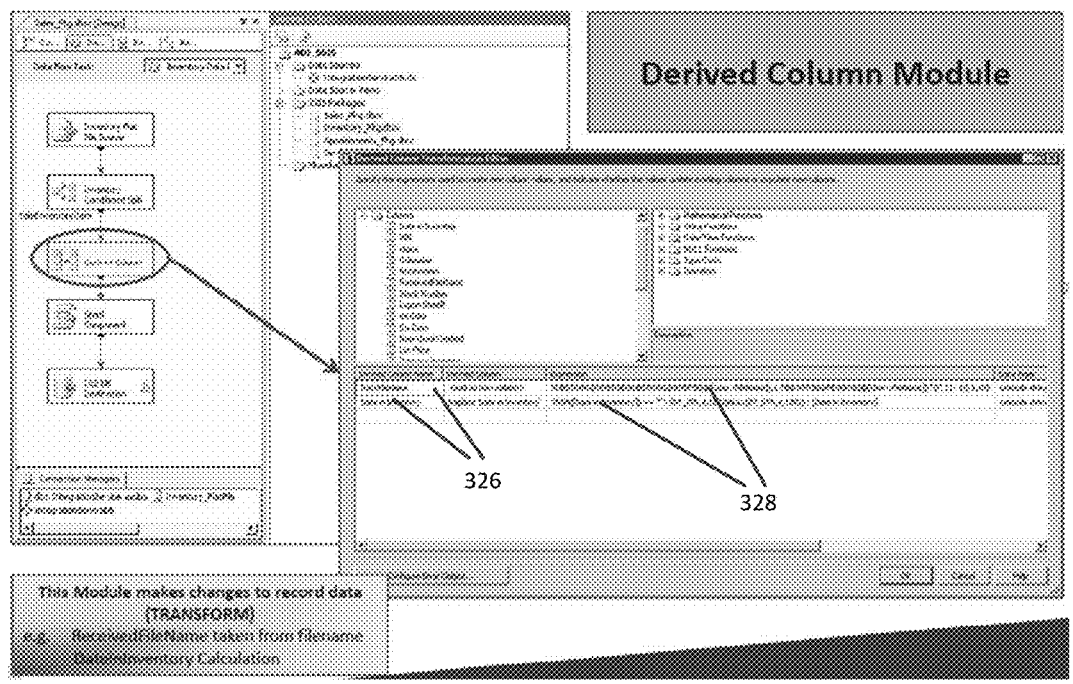
FIG. 19C shows a derived column module of a data conditioning system that includes data transformation outputs and corresponding data transformation conditions.

FIG. 19C shows a derived column module of a data conditioning system 142 that includes data transformation outputs 326 and corresponding data transformation conditions 328. The derived column module may be configured to receive data from the conditional split modules. The derived column module may include one or more data transformation outputs 326. The data transformation outputs 326 may be configured to transform data (e.g., identify a data subset, remove portions of the data) for use in a later module. The one or more data transformation outputs 326 may include corresponding data transformation conditions 328. The data transformation conditions 328 may include instructions configured for altering received data.

Figure 19D:
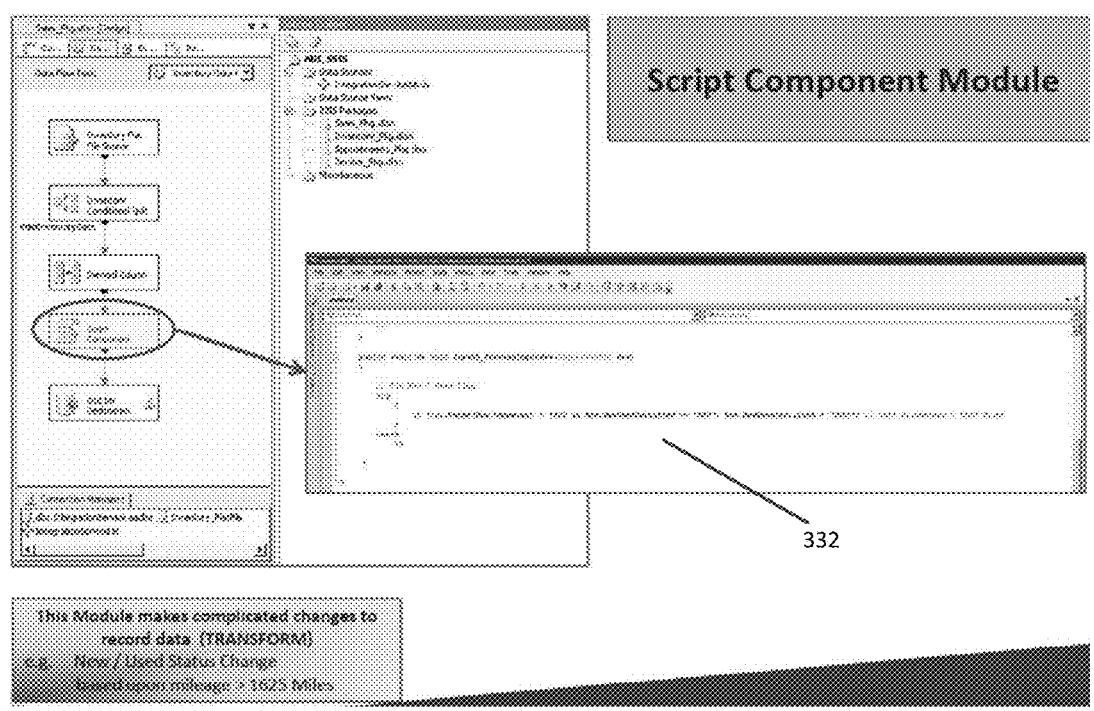
FIG. 19D illustrates a script component module.

The data may be passed to a script component module, such as one shown in FIG. 19D. The script component module may include data transformation script 332 configured to transform elements of the data received from the derived column module. The script component may be configured to make more advanced and/or complicated changes to record data than other modules. For example, the script component module may be configured to transform a record under one source data heading 306 (e.g., status of a vehicle) based on a corresponding record in a different source data heading 306 (e.g., mileage). A mileage threshold can be established beyond which a vehicle is identified as having a "used" status. Such a threshold can be 1,000, 1,500, or 2,000 miles, for example. Measured mileage information can be received (e.g., from a real-time report) directly from a data source such as a manufacturer, or a service center. Data from a trusted source or method can be preferred for invoking related changes in other data fields. It may be advantageous to automatically update the status of a first source data heading 306 based on the second source data heading 306, for example, because the second source data heading 306 may be regularly changing and/or updating. Because a variety of variables (e.g., mileage) may be updated outside the confines of the system and these variables may not be able to be tracked by hand, the data conditioning system 142 may advantageously provide automatic updates. Moreover, because the script component module of the data conditioning system 142 may be configured to adjust variables based on pre-determined conditions, the data conditioning system 142 may reduce human error due to information input, transfer, logging, etc. The script component module may also provide the benefit of following pre-determined rules and/or conditions to maintain consistency of data flow among various modules and improve accuracy of current statuses of vehicles received by the data conditioning system 142. Thus, when running searches, the system can operate more efficiently (e.g., by reducing false positives). Operating more efficiently may include reducing time required for searching for records, increasing accuracy of those search results, and/or reducing the number of required fields to be searched. The system may also be able to operate more efficiently by having data that are coordinated with standard industry formats and practices.

Figure 19E:
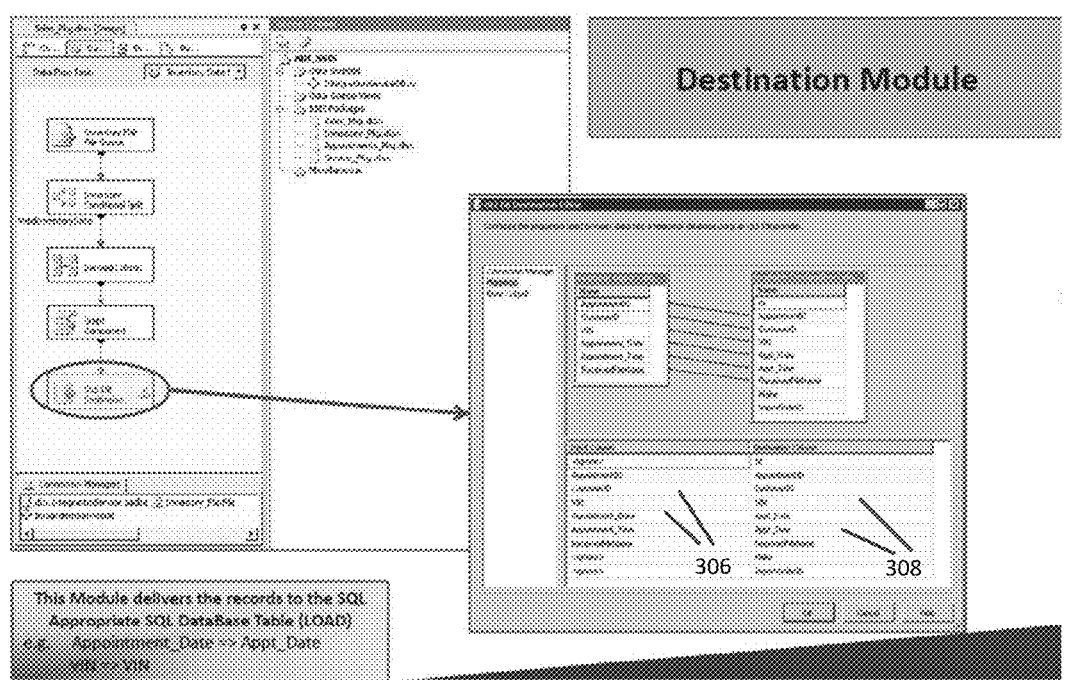
FIG. 19E illustrates an example destination module.

In some designs, after the data has been updated, the records may be passed to a destination module. FIG. 19E illustrates an example destination module. The destination module may be configured to deliver records to a database (e.g., SQL database). The database may include a table. In some designs, the destination module is configured to determine a correct destination of the records by comparing the source data headings 306 with destination data headings 308. For example, the module may determine that Appointment_Date corresponds to Appt_Date. In some cases, the source data heading 306 may be identical to a corresponding destination data heading 308. For example, the module may determine that VIN corresponds to VIN. Other examples are possible, and some are shown in FIG. 19E.

Figure 20B:
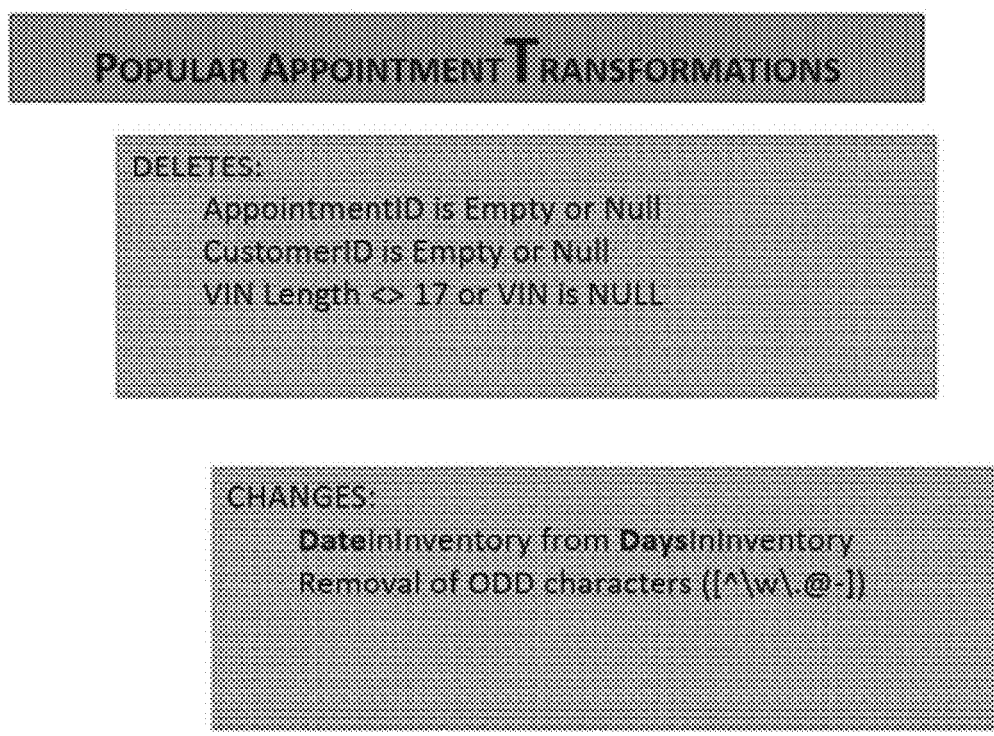
FIG. 20B shows some example transformations in the appointment data category.

FIGS. 20A-20D illustrate various examples of transformations that the data conditioning system 142 may implement. These transformations may be made by one or more components of the data conditioning system 142, such as the data extraction applications 124, 126, 128; the temporary storage modules 130; and/or the one or more data conditioning modules 132. FIG. 20A shows example transformations to the inventory data category 316. For example, the data conditioning system 142 may be configured to receive a record associated with the ID of a vehicle in stock (e.g., StockID, Stock Number) that is represented as empty (e.g., Empty, Null) and/or delete the record in the corresponding inventory data category 316. Similarly, a record that is received that is associated with vehicle identification (e.g., VIN) that is greater or less than a specified number (e.g., 17) of characters may be deleted. Certain characters (e.g., white space such as hard returns or spaces) may be omitted in this count. The appropriate module may be configured to change a record associated with a date a vehicle was received into the inventory (e.g., DateInInventory) from a record associated with a time the vehicle has been in the inventory (e.g., DaysInInventory). This transformation may be based on a known and/or calculated date the vehicle was received into the inventory. The module may be configured to change the status (e.g., from New to Used) of a vehicle based on a record associated with a specified number of miles accrued on the vehicle (e.g., Mileage).

FIG. 20B shows some example transformations in the appointment data category 316. For example, if a record associated with an appointment ID (e.g., AppointmentID) indicates that the appointment ID is unknown or inapplicable (e.g., Empty, Null), the system may delete the entry. Similarly, if a record associated with a customer ID (e.g., CustomerID) indicates that the appointment ID is unknown or inapplicable, the system may delete the entry. As in above, a VIN having more or less than a specified number of characters may be deleted or if the VIN is indicated as unknown (e.g. Null). The appropriate module may be configured to change a record associated with a date a vehicle was received into the inventory (e.g., DateInInventory) from a record associated with a time the vehicle has been in the inventory (e.g., DaysInInventory). This transformation may be based on a known and/or calculated date the vehicle was received into the inventory. The module may be configured to modify a record by removing inapplicable and/or unnecessary characters (e.g., "(", "w", "\", "@", "-", ".", etc.) from the corresponding record.

Figure 20C:
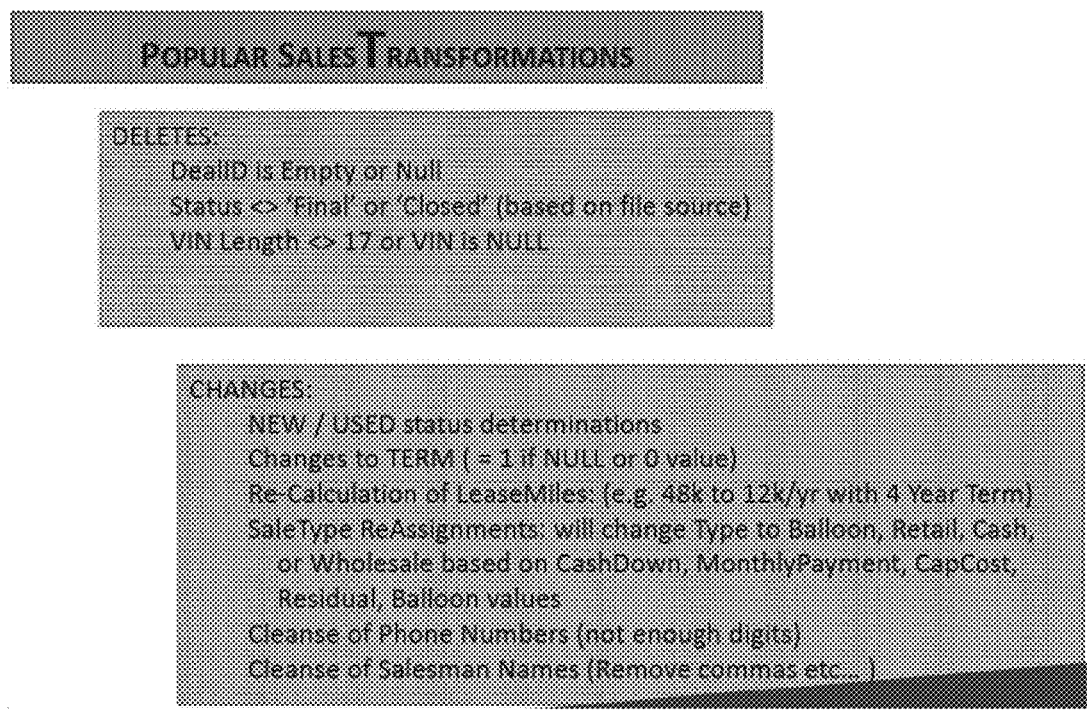
FIG. 20C shows example transformations in the sales data category.

FIG. 20C shows example transformations in the sales data category 316. For example, if AppointmentID is Empty or Null, the system may delete the entry. Similarly, if a record associated with a status of an appointment (e.g., Status) indicates something other than that the appointment is completed (e.g., Final, Closed), the entry may be deleted.

The system can be configured to change a record associated with a term of a sales contract (e.g., Term) of a sales data category 316. For example, the record can be changed to 1 if the received record indicates that the record is missing, unknown, or unspecified (e.g., Null, 0). The system can be configured to update and/or change a record associated with a number of miles allowed on the lease for a given period (e.g., LeaseMiles) based on a specified number of miles per period (e.g., year) and based on the length of a contract. For example, the record LeaseMiles may be updated to be 48,000 based on a 4 year term at 12,000 miles per year. The system may change a record associated with a type of sale (e.g., SaleType) to or from a first sale type (e.g., Balloon, Retail, Cash, Wholesale, etc.) to a second sale type different from the first, based on a corresponding record associated with how much cash was put down in the transaction (e.g., CashDown), how much the monthly payment is (e.g., MonthlyPayment), a loan amount on leased vehicles (e.g., CapCost), a residual value of a vehicle (e.g., Residual), and/or an amount to be paid at the end of a loan period (e.g., Balloon). A record associated with a phone number (e.g., of a customer), such as PhoneNumber, may be deleted (e.g., if the number of digits is lower than a specified number) or altered (e.g., if the number is known and/or determinable) based on the format of the record received. Similarly, a record associated with a salesperson's name may be deleted or altered.

Example service transformations are shown in FIG. 20D. A record associated with a repair order or repair order ID (e.g., RO_ID, RepairOrderID) may be deleted if the record indicates that the ID is unknown or empty (e.g., Empty, Null). Similar transformations may be made on records associated with a customer ID (e.g., CustomerID) and/or a customer last name (e.g., CustomerLastName). A VIN may be altered as described above. A record associated with a time for a repair order or a length of time a repair order is open (e.g., OpenDate_of_RO) may be deleted if a certain criterion is met (e.g., the record is greater than 12 months). Changes to records with unnecessary or superfluous characters, incomplete phone numbers, and/or VINs may be made as described above.

Figure 21:
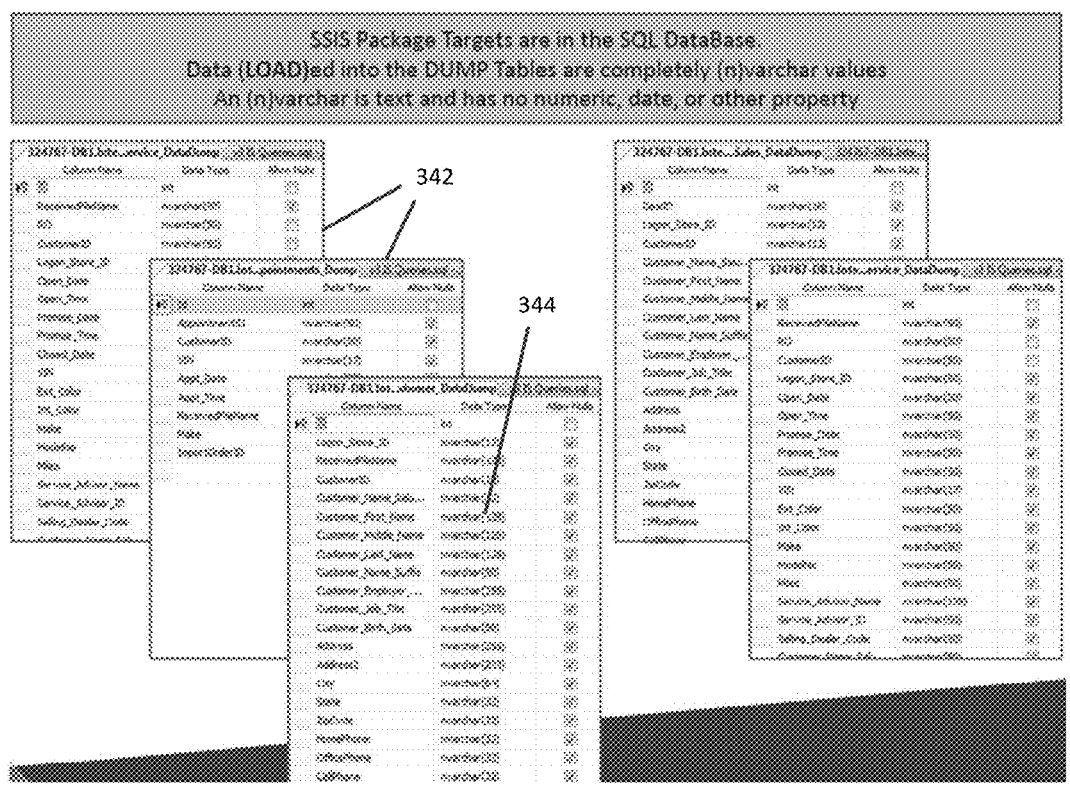
FIG. 21 illustrates a series of example data category SSIS package targets.
Figure 22A:
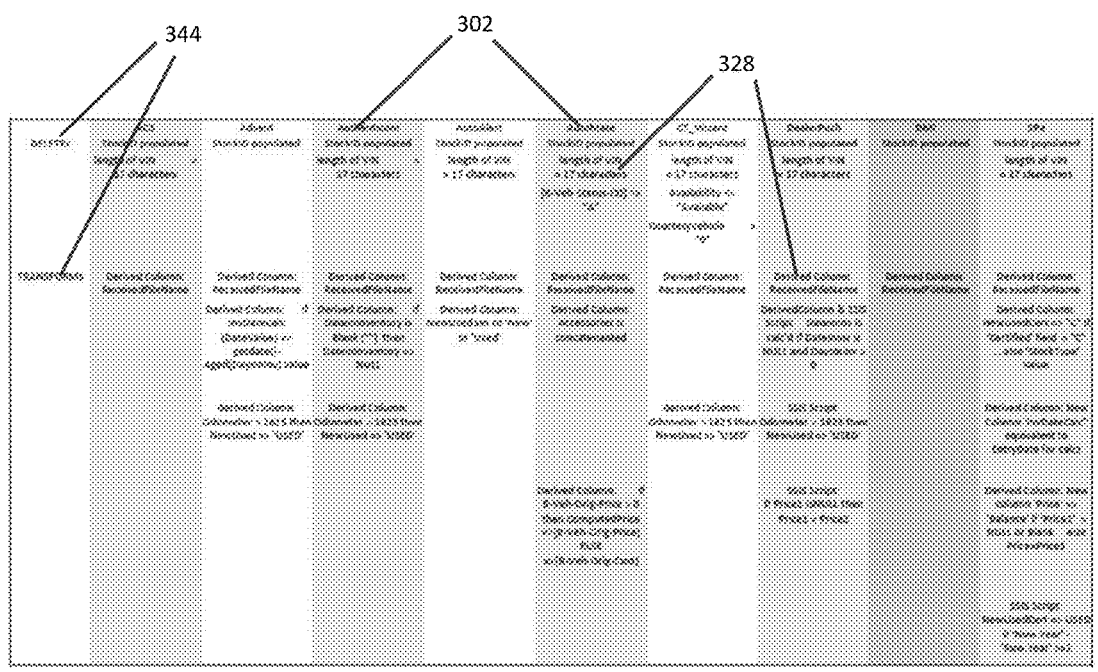
FIG. 22A illustrates a number of examples of data transformation conditions.
Figure 22C:
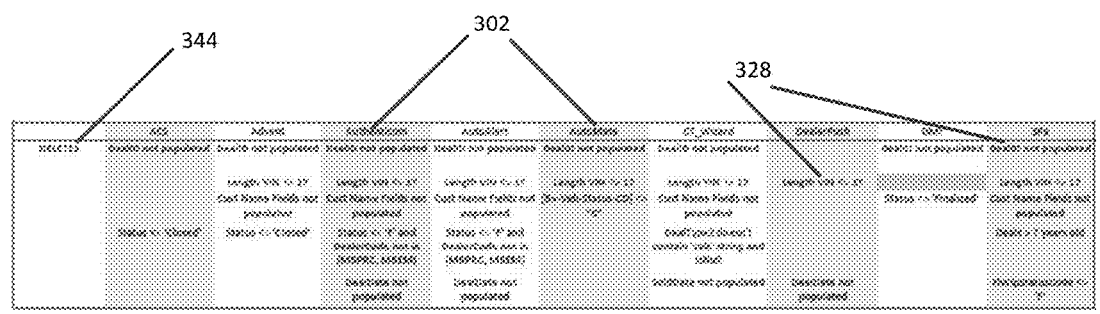
FIG. 22C illustrates a number of examples of data transformation conditions.
Figure 23A:
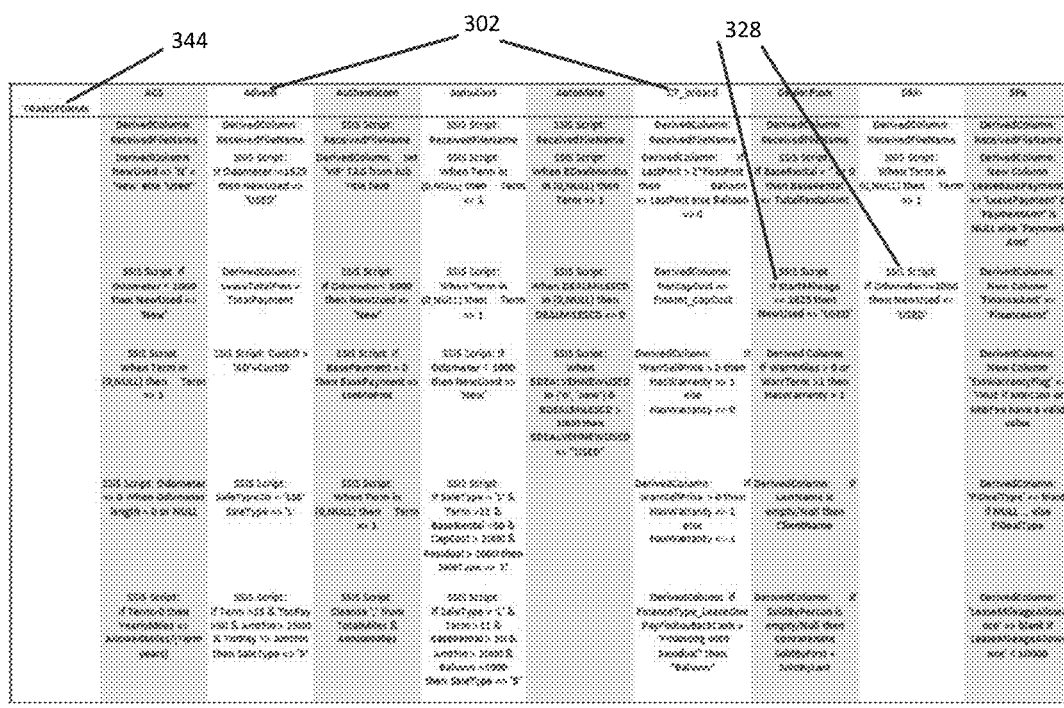
FIG. 23A illustrates a number of examples of data transformation conditions.
Figure 23B:
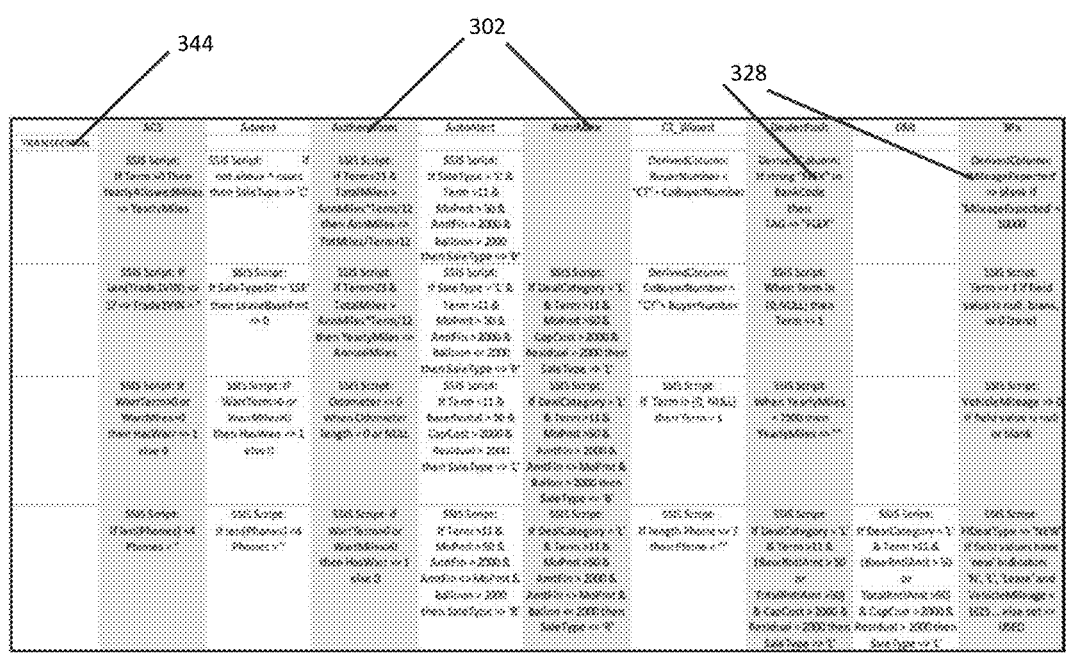
FIG. 23B illustrates a number of examples of data transformation conditions.
Figure 23C:
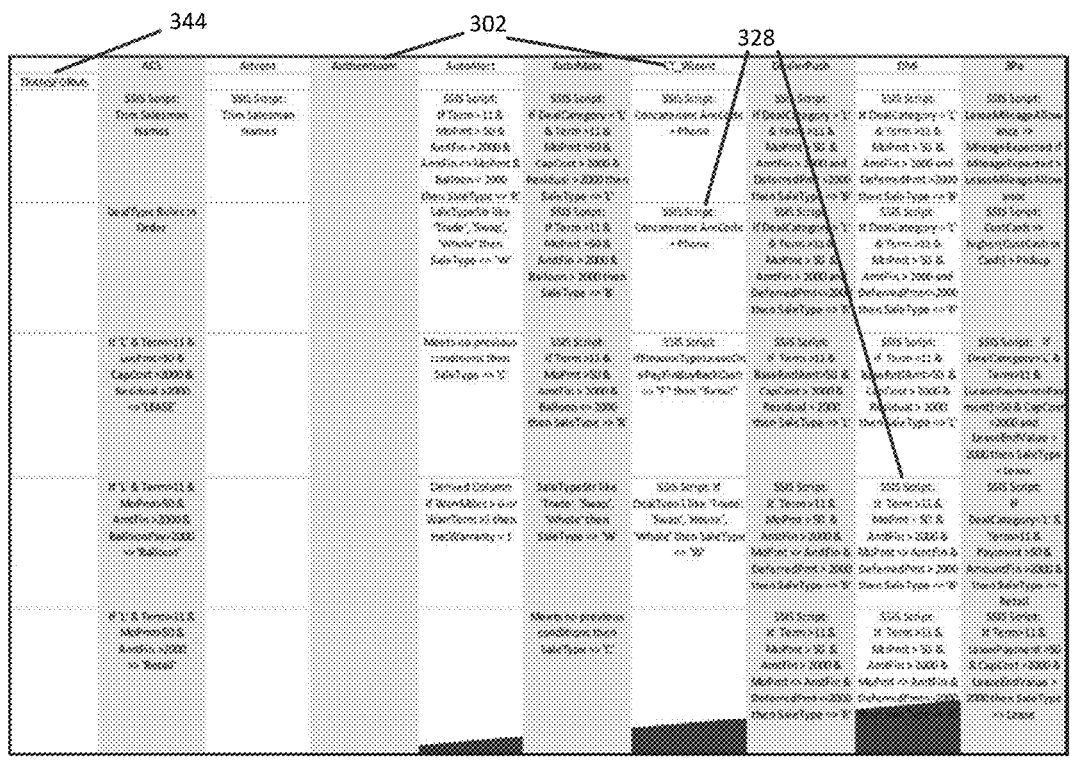
FIG. 23C illustrates a number of examples of data transformation conditions.
Figure 23D:
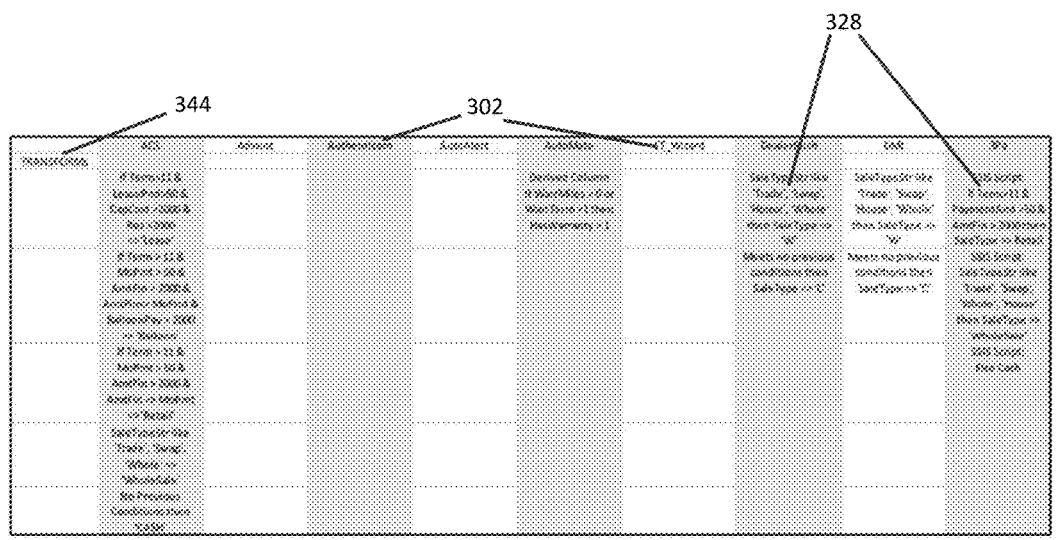
FIG. 23D illustrates a number of examples of data transformation conditions.

FIG. 21 illustrates a series of example data category SSIS package targets 342. As illustrated, each data category SSIS package target 342 may include one or more SSIS package target datatypes 344. These SSIS package target datatypes 344 may correspond to one or more records described above. The system may be configured to load the records into one or more databases (e.g., DUMP tables) as a single data type (e.g., (n)varchar). The datatype may be void of numeric, date, time, and/or other property. In some designs, each data category SSIS package target 342 may be grouped by data category (e.g., Service, Appointments, Customer, etc.).

FIG. 22A-24A illustrate a number of examples of data transformation conditions 328 along with some others than those described above for FIGS. 20A-20D. Each data transformation condition 328 can be categorized by data transformation type 348 and/or by file formatting system 302. The data conditioning system 142 can be configured differently for each file formatting system 302 from which it receives records. In some designs, different data transformation conditions 328 can be used to harmonize common data types across different file formatting system 302. As illustrated, data transformation conditions 328 across the same row (e.g., horizontal elements) may each be configured to operate on (e.g., transform, delete) a record under the same source data heading 306 (e.g. records associated with customer ID, VIN, mileage, etc.). Note that "transform" may refer to alter or delete.

Figure 24A:
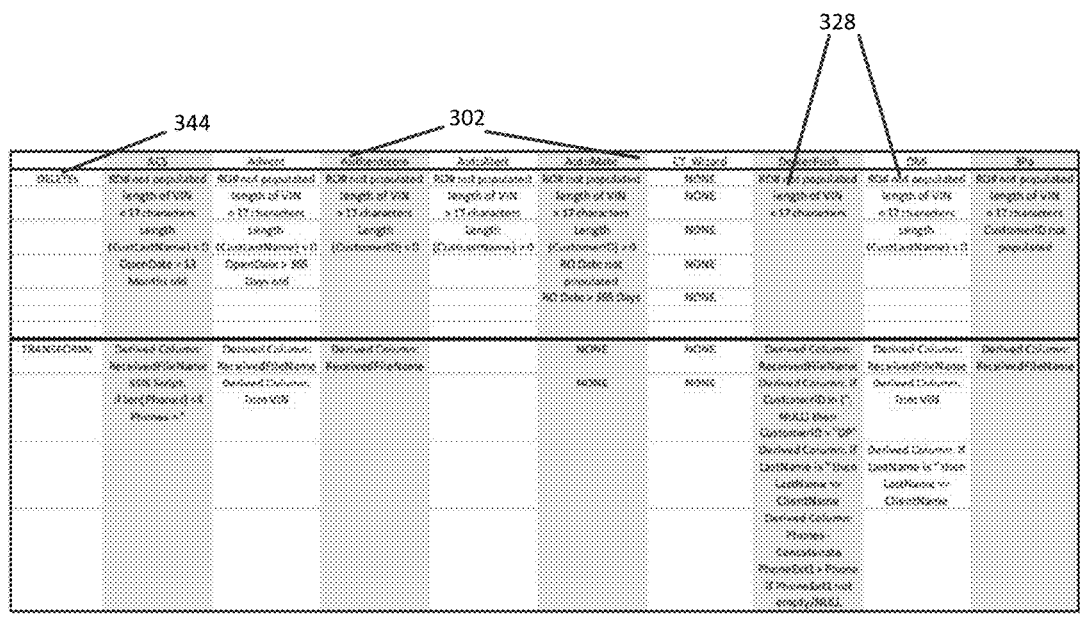
FIG. 24A illustrates a number of examples of data transformation conditions.
Figure 24B:
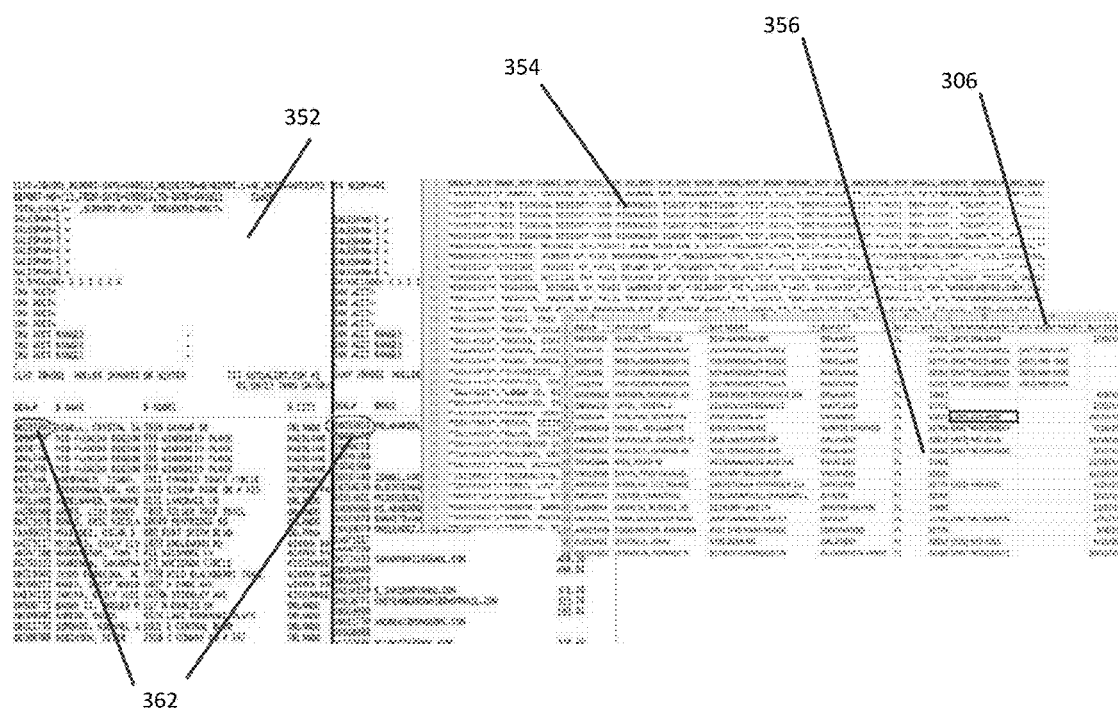
FIG. 24B shows a portion of an example received data set, a transformed data set, and a loaded data set.

FIG. 24B shows a portion of an example received data set 352, a transformed data set 354, and a loaded data set 356. The received data set 352 may include elements that may require a transformation (e.g., deletion, addition, alteration, etc.) before it can be loaded into a database (e.g., alert database 138). The received data set 352 may include incomplete elements, superfluous characters, unformatted or improperly formatted elements, inaccurate information, implausible information, and/or any other type of error. The one or more data conditioning modules 132 may be configured to transform the received data sets 352. In some designs, multiple received data sets 352 may be used to more fully fill in missing entries in the resulting loaded data set 356. It may be advantageous to rely on one or more common records 362 to piece together missing entries. For example, FIG. 24B shows a common record 362 that has been identified by the system (e.g., by the lender data extraction application 128). Records that are associated with the common record 362 from the one or more received data sets 352 can be used to fill in any gaps in the final loaded data set 356. As shown, a first received data set 352 contains the name, address, and city for the common record 362, but a second received data set 352 includes the email address for the same common record 362. These data sets can be combined to form a more complete transformed data set 354 and therefore loaded data set 356. In some embodiments, one or more of the data extraction applications 124, 126, 128 are configured to transform the received data sets 352.

Once the received data set 352 have been transformed, the transformed data set 354 may include highly compact information that is easily passed to other parts of the system. The transformed data set 354 may include few or no white space characters. Such a compact data set improves the speed of packet flows from one part of the system to another (e.g., from one module to another, from one database to another). In this way, the system and/or the processor can run more efficiently and quickly. Less energy may be required by the system in order to pass the transformed data set 354 to a database, such as the alert database 138.

A further transformation device (e.g., one or more data conditioning modules 132) may be configured to reconfigure the transformed data set 354 into a loaded data set 356. The loaded data set 356 may include a formatting to allow a human user comfortably review, sort, and search the records. The elements may be sorted by source data headings 306. Access to the loaded data set 356 may require passing a security protocol to prevent unauthorized viewing of the records. The security protocol may include an identification protocol, such as a login and/or password, a finger print, or a series of questions. Other systems lack adequate security measures. For example, one group of individuals may be inappropriately allowed to view all data records indiscriminately. However, data received by the data conditioning system 142 is often sensitive and only specified personnel should be allowed access to certain records. For example, a loan provide may need to view sensitive financial records but an OEM employee may not need to be privy to such records and so may be unable to access such records. The data conditioning system 142 can be configured to allow in-flow of secure data (e.g., received data set 352) for whom a first group of individuals is authorized to view the records (e.g., dealership employees) after passing through one or more security devices 108 (see FIG. 2).

Figure 25:
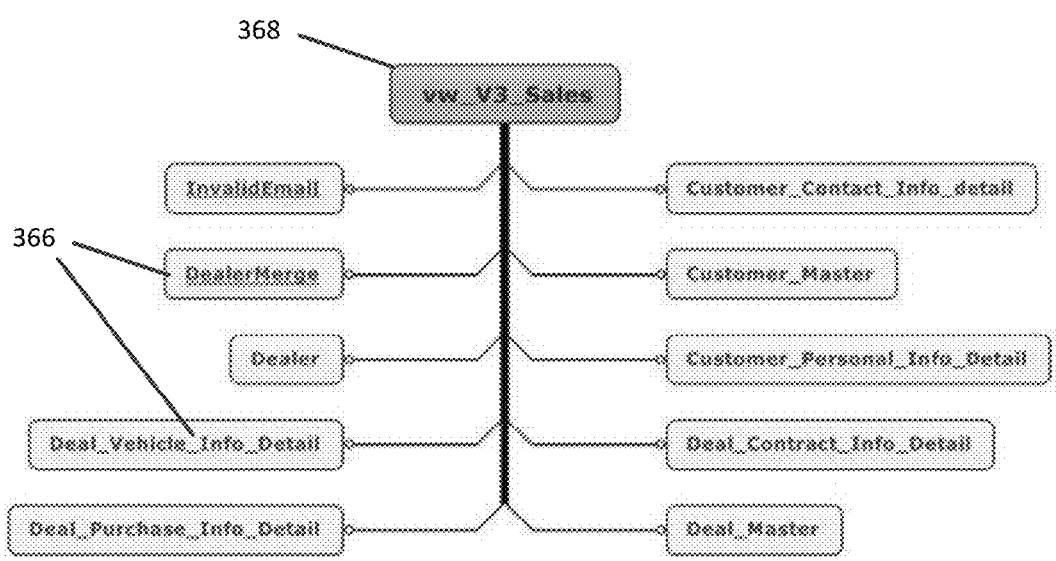
FIG. 25 illustrates a relationship among one or more sub-databases and a composite database.

FIG. 25 illustrates a relationship among one or more sub-databases 366 (e.g., tables) and a composite database 368. The composite database 368 stores information related to each of the sub-databases 366. Each of the sub-databases 366 may include data records, for example, related to customer information (e.g., customer contact information), deal information, contract details, contact information, and other groups. In some designs, a dealership and/or OEM may be provided access permission one or more of the sub-databases 366 while being restricted from access to the composite database 368. The composite database 368 can be configured to allow access authorization for certain of the sub-databases 366 and not to others, depending on that individual and/or entity. Additionally or alternatively, the composite database 368 can be configured to consolidate records from each of the sub-databases 366, for example, to fill in missing records from one or more of the sub-databases 366 in order to create a more complete record set within composite database 368.

Figure 26A:
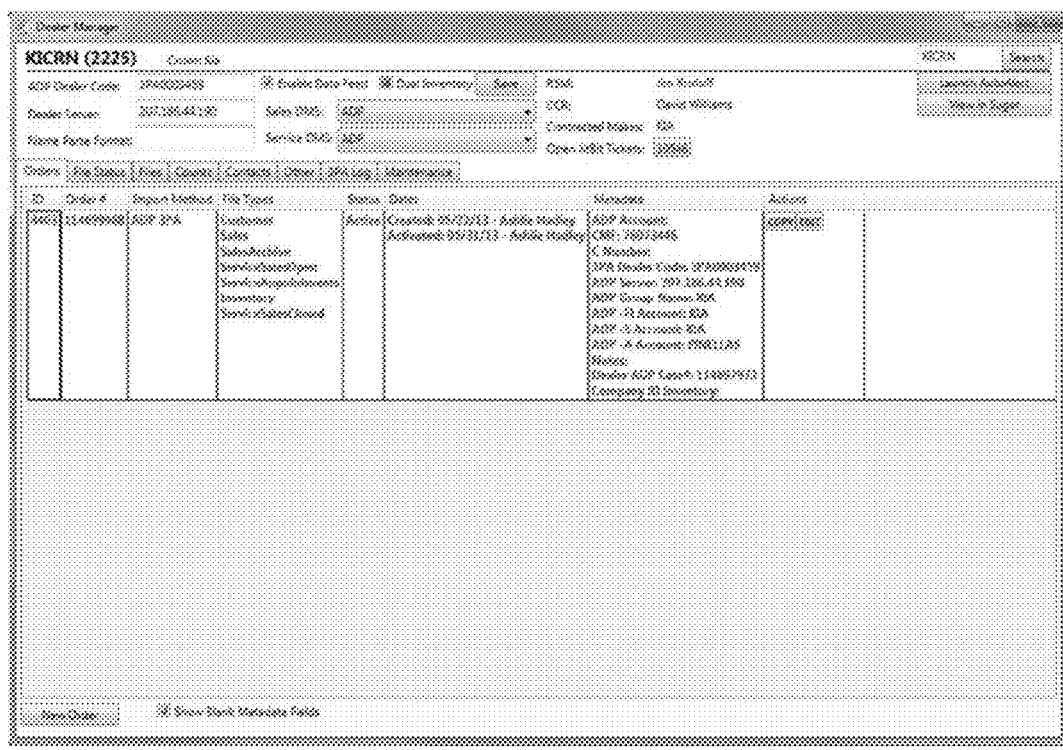
FIG. 26A shows an orders page.

FIGS. 26A-26E illustrate an embodiment of graphical user interfaces (GUIs) or displays. The GUIs may be included in the dealership management system 252 and/or may be provided for monitoring of record transfer. For example, a user may monitor the status of the records transfer and/or conditioning. Other GUIs may be used, such as in the lender data system 242 and OEM data system 262. FIG. 26A shows an Orders page. The page may include one or more buttons allowing a dealer to launch an event (e.g., AutoAlert program, record search), change the viewer type, save the data, request a new order, and/or provide one or more drop-down menus. The Orders page may include one or more tabs indicating the page being viewed. These tabs provide user ease and comfort with interfacing with the received data. Tabs may include an Orders tab, a File Status tab, a Counts tab, a Contacts tab, a miscellaneous tab (e.g., "Other"), a log tab, and/or a maintenance tab. Under the Orders tab, a user may view various aspects of an order (e.g., ID, order number, file type(s), status, dates, metadata, and/or action(s)). The Orders tab may show a current integration feed that is active.

Figure 26B:
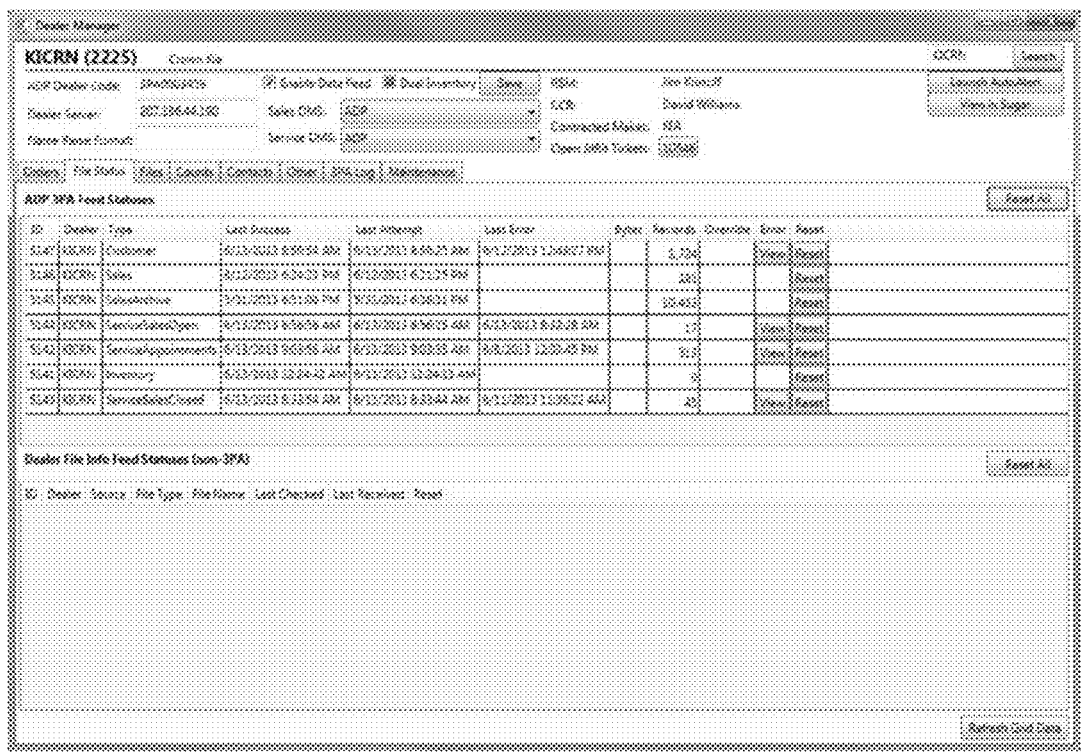
FIG. 26B shows a file status page.
Figure 26C:
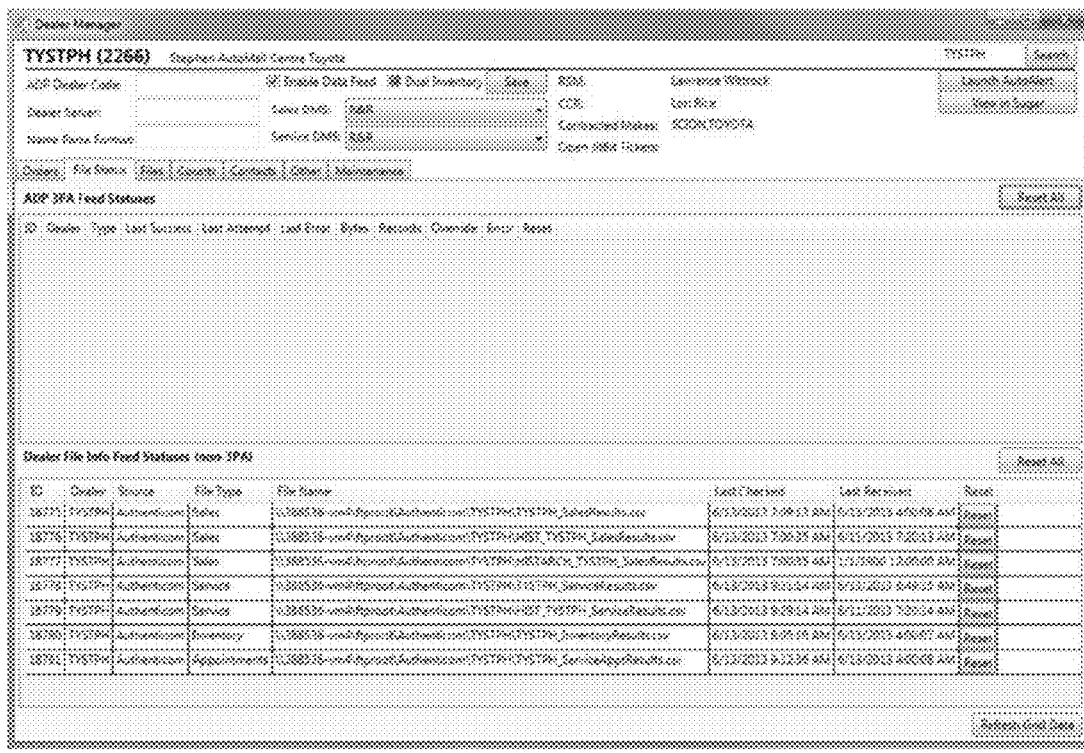
FIG. 26C shows a status page.
Figure 26D:
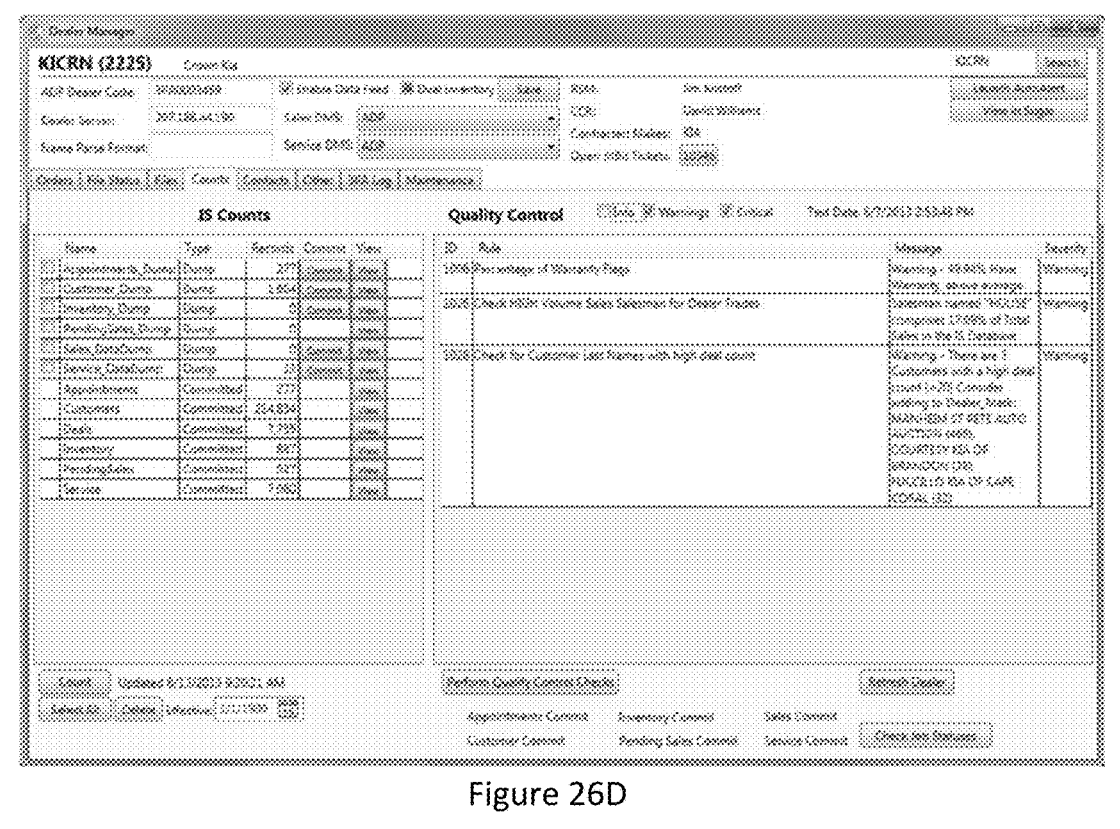

FIG. 26B-26C illustrate different aspects of a status tab (e.g., "File Status"). The status tab may indicate a current status of a data transfer. Information about the dealer, the source, the file type, the file name, and/or the time and/or date of the last checked or last received files may be displayed. FIG. 26D illustrates a file count tab (e.g., "Counts"). This view can provide a user with information about the name, type, and/or number of records that are or have been transferred. Optionally, in a separate window, a message and/or severity of a breach one or more quality control checks can be displayed. The view may provide one or more buttons to allow quality control checks to be run, to check a job status, to refresh the dealer, etc.

Figure 26E:
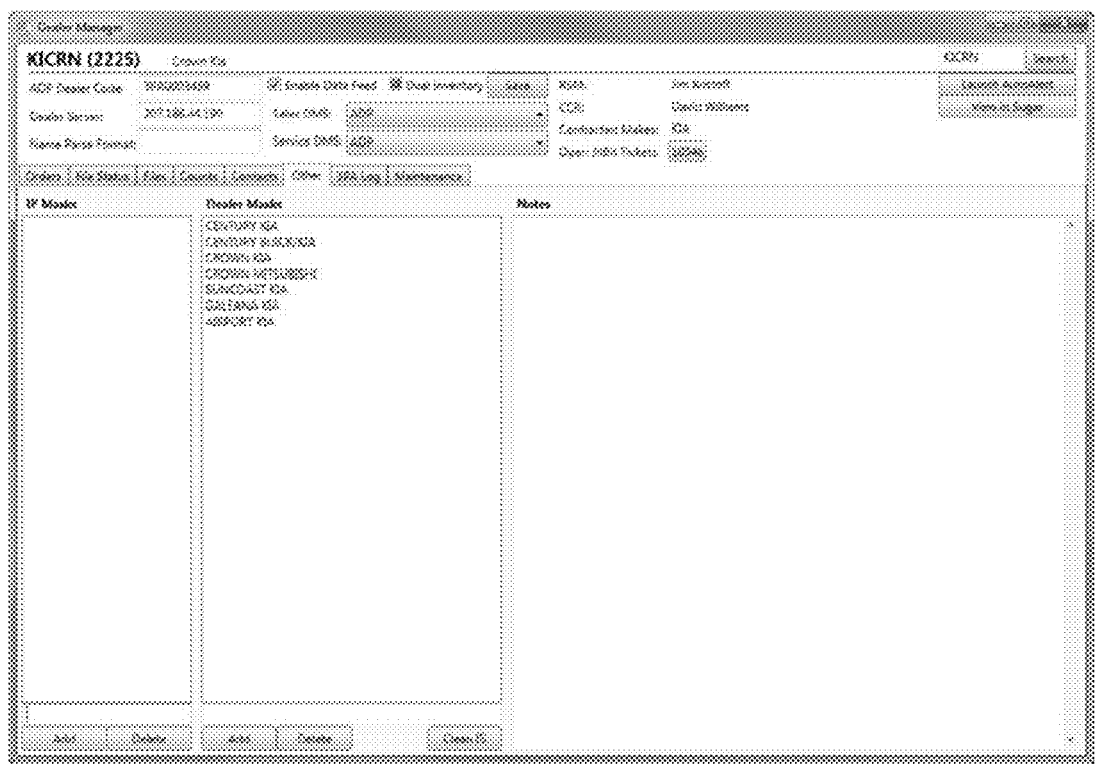
FIG. 26E shows a miscellaneous tab.

FIG. 26E illustrates a view of a miscellaneous (e.g., "Other") tab. The miscellaneous tab can show a list of dealers to whom data may be sent via the data conditioning system 142. Other fields, such as notes, IP masks, dealer masks, and/or buttons may be displayed.

Figure 27:
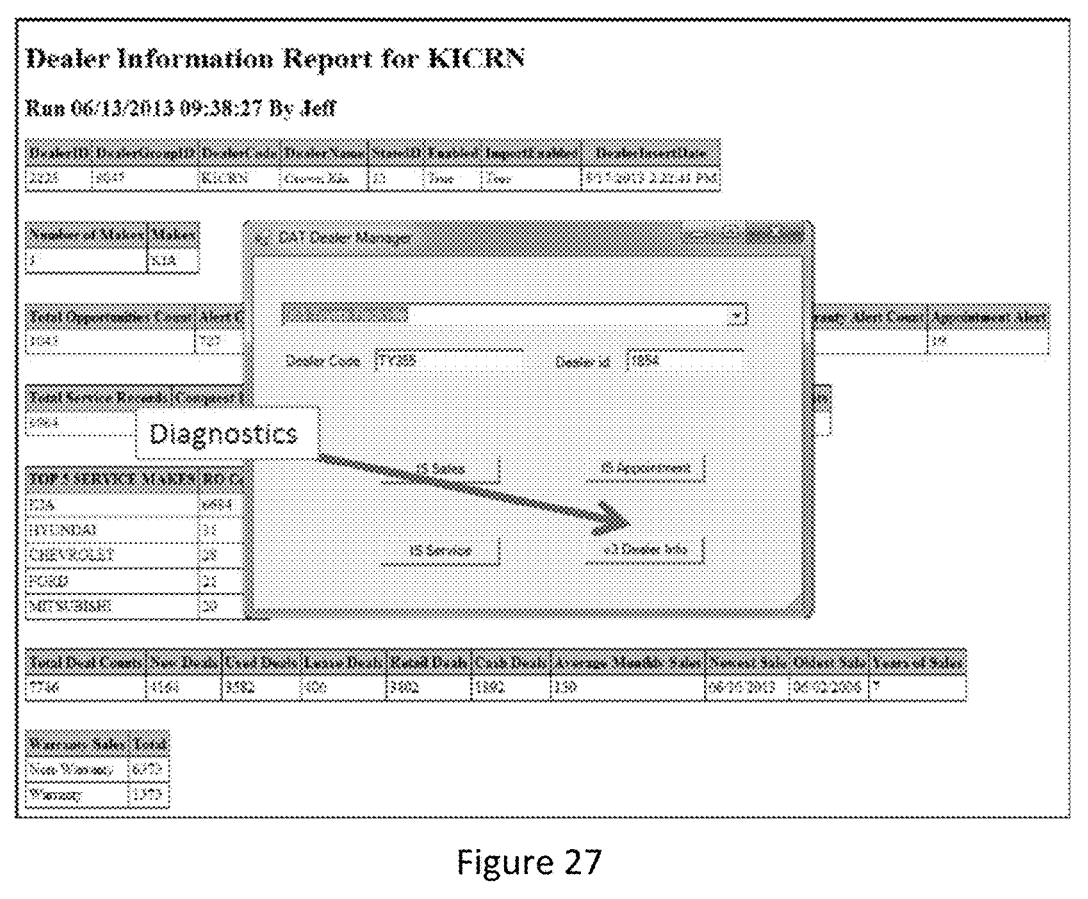

FIG. 27 shows a specific dealer information report example. A data conditioning system 142 can provide a detailed report of the data that has been transferred to and/or from a dealer. A report may include a number of successful records transmitted. As shown in FIG. 27, a report may include one or more tables outlining information specific to a particular dealer. The chart can provide an OEM and/or dealer with relevant information such as, for example, statistics about the number of certain makes in the data set (or number of makes sold or serviced by that dealer), the number of potential customers for which offers may be submitted or for which opportunities were identified for that dealer, a number of types of sales made by a dealer (e.g., warranty or non-warranty sales), and/or a number of alerts generated. Such data may be transmitted through one or more security protocol systems (e.g., security protocol systems 212, 214, 216 of FIG. 2). The system can allow a user to perform diagnostics using a "Dealer Info" button as indicated with the arrow.

Figure 28:
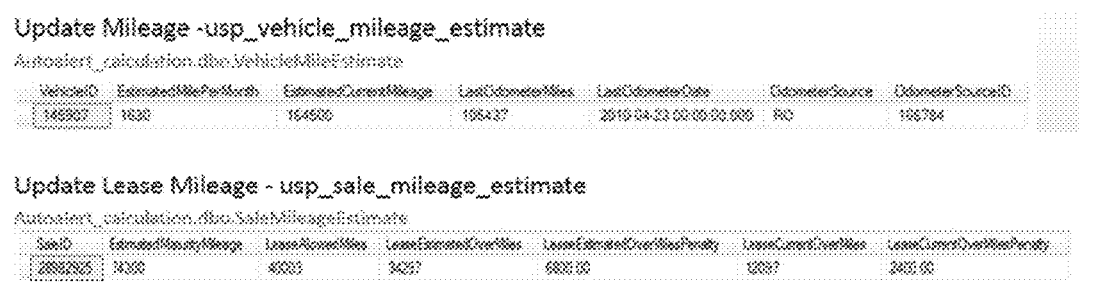

FIG. 28 shows an example display of records regarding an estimated and/or actual mileage (e.g., odometer) reading. The system can be configured to receive real-time mileage updates, for example, from a repair order (RO) or from a self-report. FIG. 28 shows an example of a record with a most recently measured odometer reading. Based on an estimated miles per month figure, the system (e.g., alert engine 134, dealership usage engine 234) can be configured to determine an estimated current mileage figure. For example, an estimated current mileage count may be determined by adding the last known actual mileage reading with the estimated miles per time period multiplied by the number of those time periods that have passed since the last actual odometer reading. A value of the vehicle may be estimated based on the actual and/or estimated number of miles on the vehicle. Moreover, the system may be configured to change a status of one or more records (e.g., New or Used) based on the number of estimated current miles.

A similar calculation can be performed by the engine (e.g., alert engine 134, dealership usage engine 234) for estimating current leased vehicle mileage. The system can be configured to receive a figure for the actual number of miles at a given time. An estimated number of miles traveled per specified time period (e.g., month) may be received from the system or from a user entry. An estimated number of current miles may be determined and/or compared to a specified number of allowed miles. If the estimated number of allowed miles is less than the estimated number of current miles, the value of the vehicle may be reduced, which can be submitted as a record in the system.

Figure 29:
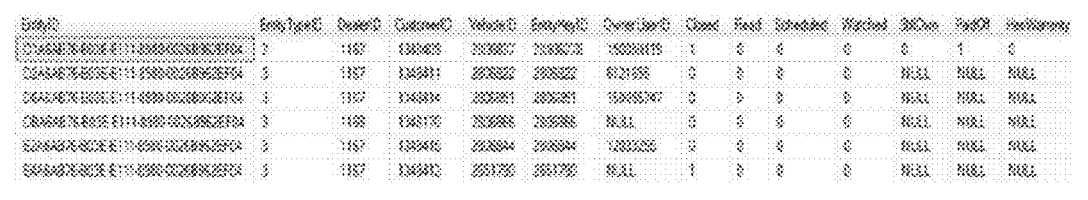

FIG. 29 shows an example set of records received by a dealer by the data conditioning system 142 that have been loaded. The records may indicate which entities (e.g., dealerships) have submitted the records. The set of records can indicate one or more records relating to vehicle identification, owner identification, and/or the status of the vehicle (e.g., whether paid off, whether it includes a warranty, whether it is owned or leased). FIG. 29 shows an example of a set of records after all conditioning and transformations have taken place.

AlertMiner System

Consistent with the dealership usage engine described above, one example is the AlertMiner system and software, available from AutoAlert LLC. To find favorable sales opportunities within a population not actively shopping for a vehicle, an AlertMiner system can iteratively evaluate former customers currently paying on an existing vehicle (loan or lease). The system can automatically access financial terms of those former customers, which are also potential candidate customers. The financial terms include, among other things, the candidate customer's monthly payment and the number of payments made, and/or the amount remaining on the candidate's existing vehicle. The system can determine a trade-in value for the existing vehicle derived from suitable sources, optionally based in part on the mileage and condition of the vehicle (either of which can be measured, estimated, or some combination thereof). The system can also use an estimated equity value for the existing vehicle derived from the financial terms for the vehicle.

To assess whether a favorable deal may be offered to a candidate customer, the system determines a candidate replacement vehicle associated with his current vehicle. The system may determine a candidate replacement vehicle in any suitable manner, including but not limited to using a database, a data file, or the like. One efficient approach is to use a newer version of the same model as the candidate's existing vehicle.

The system determines prospective financing terms for the replacement vehicle that may be offered to the candidate as a replacement for his existing vehicle.

These terms include new monthly payments for the replacement vehicle based on the equity in the existing vehicle and on the prospective financing terms for the replacement vehicle. Such prospective financing terms can include OEM incentives such as a low financing rate, a deferment in payments for a given length of time, or a subsidy, directly lowering the price paid by the customer.

The system calculates the difference between the candidate customer's existing and new monthly payments. The system can use this difference in monthly payment as a predictor as to whether a sales opportunity exists, that is, whether it may be deemed favorable for a candidate to replace an existing vehicle with a new one. To make this assessment without input from the candidate, the system uses preset criteria for what is deemed to be favorable. The system may be configured to consider a deal "favorable" when the difference in payments is negative, when it is less than 10% of the existing payment, or any other suitable value.

Thus, an AlertMiner system can have as an output a list of potential customers and corresponding customized proposed deals, calculated to allow the potential customers to have favorable terms (e.g., the same or lower monthly payments on a newer version of the same car).

The dealer usage engine and interfaces described above (e.g., the AlertMiner system) are examples of an initial layer of solutions to the problems described above—namely, the problems relating to quality of search results when mining data from automotive dealerships. The "alerts" described in great detail here are valuable outputs from a system on an initial level for dealership usage.

AlertOptics System

The AlertMiner system described above can hold certain variables constant in order to calculate other variables more efficiently. For example, a candidate replacement vehicle can be fixed (or assumed to be the latest model of the candidates present vehicle) for calculation purposes. Similarly, as noted above, the system may establish a preset criteria for determining a "favorable" deal. The AlertMiner system can thus be used by automotive dealerships to identify new customers under these assumptions.

Several modules may be used to improve data storage and display to advance the goals of automotive manufacturers and/or automotive retailers, such as those described herein. A system referred to as "AlertOptics" can be used to create consumer-specific offers, while at the same time improving efficient management of incentives and/or protecting sensitive data. AlertOptics is an enterprise level solution that analyzes behavioral elements, proprietary in-market data, industry data, and consumer attributes to identify the right offer and message to influence consumer behavior. AlertOptics can seamlessly message consumers on behalf of a dealership to deliver influential, customized offers to the consumer via intelligent marketing solutions and algorithms. An OEM may allocate a budget to consumer incentives for inventory control or other marketing purposes, for example. That budget may be used as a blunt instrument (offer the same incentive to all comers and advertise widely to attract those most interested), or as a more targeted instrument (creating customer-specific incentives using the same budget, but offering some customers less to achieve a similar threshold or ratio, while offering other customers more to achieve that ratio). Inputs to such a system may include DMS (or dealer management system) data, incentive and inventory data, and behavior and consumer data. A profile can be created using consumer data. A predictive model can be used based on the data (and incorporating statistical input from previous efforts or wider economic data, for example). A target audience can be established, which is then reached by email, mail, phone, social media, mobile devices, digital ads, and search engines, for example. As shown in FIG. 9A, a set of sliding controls or indicators at the bottom left allows a user to adjust a trim level, an APR, a subsidy amount, and a loyalty factor. The map and other data show an alert count that may result from adjusting or otherwise setting the sliding controls or indicators. For example, an alert count of 155,220 is shown, and the geographical breakdown is shown on the map, by state. A percent of customers is shown as 38.68%, and estimated number of sales is shown as 15,522, and a subsidy spend of $23,383,000 is shown. At the right are shown a "base alert count" of 145,289 which may be used to show how many alerts exist prior to incentive changes. Similarly, a base % of customers is shown as 36.21%. An "alerts by trim" section shows a breakdown of which trim levels are associated with various numbers of alerts. FIG. 9A illustrates various benefits of AlertOptics. It provides real-time, actionable data. The slide controls are one way the system can help an OEM visualize strategies for increasing market share. The system can be used to micro-target potential customers, and such marketing campaigns can be referred to as "stealth" because they do not involve public advertising.

Hypothetical maintenance and repair issues (e.g., an issue with transmissions of some vehicles) can provide an incentive for an OEM or dealer to upgrade customers to different vehicles. Data from ROs (repair orders) can be used to identify good candidates, and candidates can also be filtered or identified using financial data that may be customized to the amount of equity in their vehicles. Benefits of this example include improved reviews and retention of customers. The system can produce additional uses and benefits, including inventory alignment, management of inventory flow, and analysis of price elasticity. Data trends can be identified and customer response to new models can be analyzed. There are many other benefits and uses of the described system.

An AlertOptics system can be used in connection with an AlertMiner system to accomplish related goals but holding different variables constant. For example, rather than using a financing rate or a subsidy as an input into the calculation, an OEM can change these variables while holding other variables (e.g., a threshold in payment differences for a "favorable deal") constant. In some embodiments, these variables can be adjusted simultaneously or in turn. Adjusting a subsidy and reviewing the predicted results can allow an OEM to achieve goals such as maximizing marketing budgets with incentive offers to specific customers, inventory control, incentivizing upgrades to vehicles with fewer warranty and repair issues, etc. An OEM may have goals of optimizing different criteria, but these goals may relate to multiple competing factors. Thus, viewing a graphical representation of the results of changing the variables can be especially helpful to achieve complex goals. Thus, viewing results on a geographical map (e.g., FIGS. 9 and 13) and viewing the shape of a resulting curve (e.g., FIGS. 12-14) can be useful, especially when the graphical results update rapidly in response to changes in the inputs, and when the inputs and outputs are visible within the same graphic user interface. The outputs from an AlertOptics system can be a total number of "alerts" (or potential customers having a situation meeting the favorable deal criteria) before and after adjustment of the subsidy. The total number can also be expressed in terms of a percentage, as shown in FIG. 9A.

Figure 11:
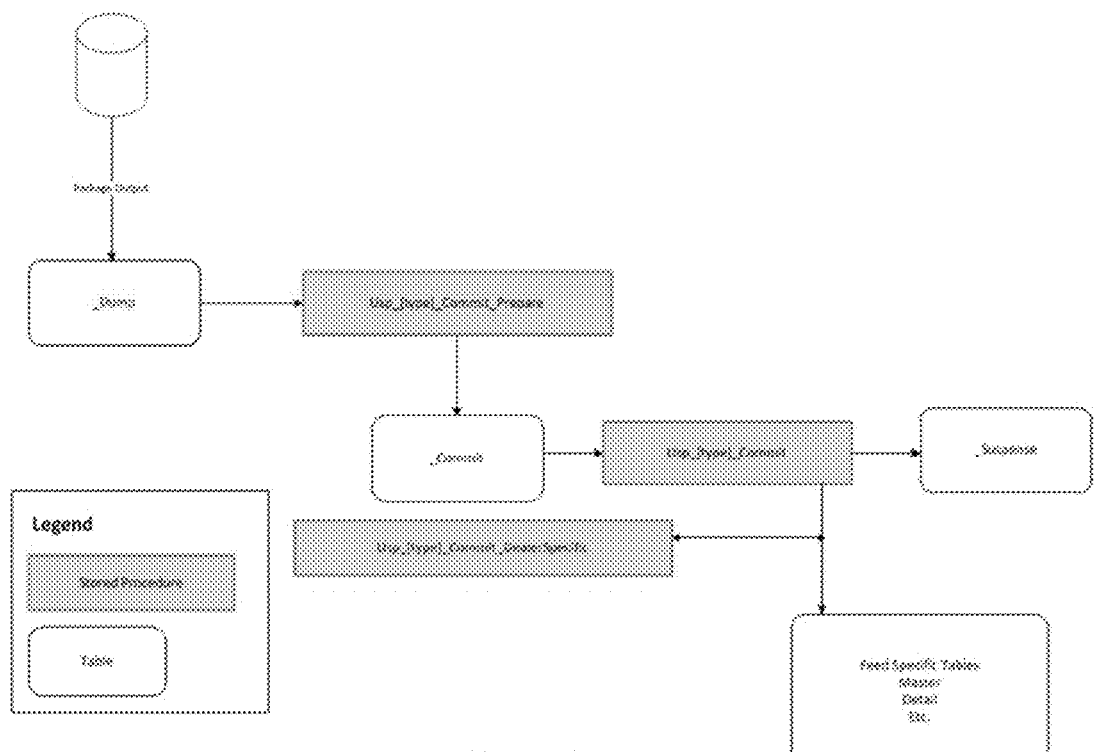
FIG. 11 illustrates an example flow chart for how information may be transmitted.

FIG. 11 illustrates an example flow chart for how information may be transmitted. For example, source data may be extracted (or "dumped") from one or more data sources, such as those described herein. The source data may be raw and/or unfiltered in this form. One or more of the data extraction applications 124, 126, 128 and/or the alert engine 134 (see, e.g., FIG. 2) may perform one or more of the processes described below. The system may use a Commit_Prepare algorithm to transform and/or condition the extracted data in a preparatory fashion. This Commit_Prepare algorithm may transform the data in various ways, such as one or more of those referenced in Appendix 1 of U.S. Provisional No. 62/443,633, pages 6-25.

With continued reference to FIG. 11, the data may then be stored in a Commit database. The data may then be further conditioned using a Commit algorithm, which may include one or more of the processes described for the Commit_Prepare process described above. The Commit_Prepare process may include processes referenced in Appendix 1 of U.S. Provisional No. 62/443,633, pages 27-30. The Commit_Prepare and Commit processes may correspond to one or more of the loading, conditioning, and/or formatting processes described above. The data that has been conditioned and/or "committed" may then be sent to a Suspense database. The data may optionally also be further conditioned, for example, using a Commit_DealerSpecific algorithm. The data may be then stored in one or more databases, such as, for example, feed specific tables, a master table, and/or a detail table, etc.

The Commit_DealerSpecific algorithm may harmonize data based on trends in how a dealer stores its own data. For example, a dealer may track the number of days an automobile has been on the lot. The Commit_DealerSpecific algorithm may be able to translate that into a specific date from which the automobile has been available for sale.

Example Embodiments

A variety of example embodiments are provided below.

In a $1^{st}$ embodiment, a vehicle records conditioning, prediction, privacy, and visualization system comprises an extraction device comprising a plurality of extraction databases that store vehicle records, each of the extraction databases configured to receive data records from corresponding application-specific file source databases and a vehicle alert database that receives the vehicle records from the plurality of extraction databases and at least one hardware processor in communication with the extraction device and the vehicle alert database, the at least one hardware processor configured to execute computer-executable instructions to at least receive, over a network, vehicle records from the application-specific file source databases, wherein the vehicle records from the application-specific file source databases are associated with source data headings based on the source data headings of the vehicle records, load the vehicle records into one or more of the plurality of extraction databases under with intermediate data headings corresponding to one or more of the source data headings selectively remove, based on first qualifying criteria, one or more vehicle records from one or more of the plurality of extraction databases selectively modify, based on second qualifying criteria, one or more vehicle records in one or more of the plurality of extraction databases transfer the vehicle records to the vehicle alert database, wherein the vehicle data records comprise a customer name for a previously sold vehicle and that customer's contact information, the customer name comprising a name of a past customer not currently shopping or looking for a new vehicle a vehicle identification number of the previously sold vehicle data from a deal that resulted in a previous sale to the customer, the data sufficient to show or obtain the customer's current payment, which comprises the customer's monthly payment for the previously sold vehicle an estimated trade value of the previously sold vehicle; and an estimated payoff amount of the previously sold vehicle; analyze the vehicle records relating to deals that resulted in the previous sales to past customers and automatically analyze a new deal proposal for all of a large set of past customers to determine which past customers are good prospects to offer a new vehicle on favorable terms, where the favorable terms comprise at least the same or lower monthly payment for the replacement vehicle, the analysis comprising receiving changed internal data and changed external data on a periodic basis wherein the period comprises receiving the changed data dynamically, the changed data comprising data relating to new suggested vehicles for past customers and values related to the previously sold vehicles for past customers automatically determining for each of the past customers a new suggested vehicle for the previously sold vehicle, wherein the determining comprises algorithmically associating the previously sold vehicle with one or more new suggested vehicles based on category, classification, or grouping searching an inventory of an automotive dealer for the new suggested vehicle for the customer, thereby limiting use of computer resources by analyzing one new suggested vehicle for the determination of whether that customer is a candidate for outreach determining a new proposed payments by obtaining a price of the new suggested vehicle obtaining a net trade-in equity by combining the estimated trade value with the estimated payoff amount of the previously sold vehicle, wherein the trade-in equity may be either negative equity or positive equity determining an amount to be financed by combining the price of the new suggested vehicle with any obtained net trade-in equity, whether positive or negative using the amount to be financed and currently-available rate information for a loan duration to determine the new proposed payment comparing the customer's current payment and the new proposed payment to determine one or more differences; and analyzing the differences to determine if at least one of them meets a criterion to identify the customer for outreach because a new favorable deal proposal has been identified to get that customer into an upgraded vehicle comprising at least one of the new suggested vehicles the computer system being configured to adjust at least one changed data parameter for suggested new vehicles; and iteratively analyzing whether the at least one changed data parameter increases the number of customers who can favorably get into an upgraded new suggested vehicle; and identify new revenue opportunities from the past customers that are candidates for new vehicle transactions, even when those candidates are not shopping for a new vehicle, and, for each candidate, identifying at least one specific and available new favorable deal proposal relating to a specific new suggested vehicle transmit display instructions to a client device configured for use by a vehicle manufacturer, the display instructions configured to initiate a display comprising a number of good prospects to offer a new vehicle on favorable terms a budget adjustment tool configured to allow a user to input a maximum allowed budget for making deals; and selectively restrict access to the initiated display based on whether the client device receives authorization credentials.

In a $2^{nd}$ embodiment, the system of embodiment 1, wherein the display instructions are further configured to display a slider configured to allow a viewer to select a range.

In a $3^{rd}$ embodiment, the system of any of embodiments 1-2, wherein the display instructions are further configured to automatically display newly identified favorable deal proposals.

In a $4^{th}$ embodiment, the system of any of embodiments 1-3, wherein the computer-executable instructions are configured to cause the hardware processor to automatically calculate or set an expiration date for identified new favorable deal proposals, and the display instructions are further configured to notify vehicle manufacturer personnel of the expiration of the new revenue opportunities.

In a $5^{th}$ embodiment, the system of embodiment 4, wherein expiration dates are calculated by determining that a new favorable deal proposal depends on a particular vehicle manufacturer incentive, and the expiration date corresponds to the end of that incentive.

In a 6th embodiment, the system of any of embodiments 1-5, wherein the display instructions are further configured to allow vehicle manufacturer personnel to set a number of favorable deal proposals.

In a 7th embodiment, the system of any of embodiments 1-6, wherein the display instructions are further configured to automatically display visual representations associated with a location of the favorable deal proposals.

In an 8th embodiment, the system of any of embodiments 1-7, wherein the estimated trade value is obtained by using the vehicle identification number, the make, model, and year, of the previously sold vehicle, and the date it was sold.

In a 9th embodiment, the system of embodiment 8, wherein the estimated trade value is automatically obtained from a database of third-party industry valuation data, and price of the new suggested vehicle and currently-available rate information are also automatically obtained from external databases.

In a 10th embodiment, the system of any of embodiments 1-9, wherein the computer-executable instructions are configured to cause the hardware processor to automatically calculate the estimated payoff amount by multiplying the customer's current payment with the number of remaining payments derived from information in the large database of records.

In an 11th embodiment, the system of any of embodiments 1-10, wherein the computer-executable instructions are configured to cause the hardware processor to automatically calculate the estimated payoff amount by obtaining from the alert database a capitalized cost comprising an amount financed for the previously-sold vehicle determining the amount paid so far by the customer toward the capitalized cost; and determining the remainder by subtracting the amount paid so far from the capitalized cost, the remainder comprising the estimated payoff amount.

In a 12th embodiment, the system of any of embodiments 1-11, wherein the price of the new suggested vehicle comprises either a sales price for a sale transaction or a capitalized lease cost for a lease transaction.

In a 13th embodiment, the system of any of embodiments 1-12, wherein the first qualifying criteria are based on a number of digits in the vehicle identification number of the previously sold vehicle or on the existence of a missing vehicle record.

In a 14th embodiment, the system of any of embodiments 1-13, wherein the alert database is configured to receive an actual mileage of the previously sold vehicle as measured by a vehicle dealership and wherein the second qualifying criteria are based on the actual mileage.

In a 15th embodiment, the system of any of embodiments 1-14, wherein the display instructions are further configured not to display any personally identifying information of a specific customer.

In a 16th embodiment, the system of any of embodiments 1-15, wherein authorization credentials comprises a password.

In a 17th embodiment, a vehicle data conditioning and visualization system, the system comprising a plurality of data extraction applications configured to extract a string of letters or numbers from a sending database, the sending database comprising one of a vehicle dealership, a vehicle manufacturer, and a lender condition the string by at least one of deleting an associated data entry, removing a character from the string, adding a character to the string, and replacing the string with a new entry; and load the string or new entry into a temporary storage module a data conditioning module configured to perform a conditioning action on the string or new entry a user interface with an adjustable control for a vehicle subsidy and an output display visible within the interface that shows a number of alerts at an alert threshold in response to an adjustment of a subsidy parameter by the adjustable control a security protocol system configured to require a security authentication before the user interface can display the number of alerts a usage engine configured to receive an input comprising a present financing parameter on a previous vehicle sale and the alert threshold; and an alert database configured to store the alert threshold and a number of alerts at the alert threshold wherein the usage engine is configured to calculate the number of alerts based on the input and the alert threshold and to output results for display by the user interface and update the output results in real time as the adjustable control is adjusted.

In an 18th embodiment, the system of embodiment 17, wherein the user interface comprises a map that displays a number of alerts in each of a plurality of geographical regions.

In a 19th embodiment, the system of any of embodiments 17-18, wherein the temporary storage module is an SQL table.

In a 20th embodiment, the system of any of embodiments 17-19, wherein the alert database is configured to transmit data to one or more of a dealership usage engine, an OEM usage engine, and a lender usage engine.

In a 21st embodiment, the system of any of embodiments 17-20, wherein requiring a security authentication comprises receiving a username and a password.

In a 22nd embodiment, the system of any of embodiments 17-21, wherein conditioning the string comprises supplying an entry based on one or more data received from a supplemental database not identical to the sending database.

In a 23rd embodiment, a method for generating leads in vehicle transactions, the method comprising retrieving a portion of information related to first financial terms obtained by a customer in a purchase of a first vehicle; retrieving information on the first vehicle retrieving a portion of information related to second financial terms available to a customer in a purchase of a second vehicle receiving data representing the number of repairs ordered for an automotive system of the first vehicle requesting current information associated with at least one of the customer, the first financial terms, the first vehicle, the second vehicle, and the second financial terms based on the requested current information, automatically determining, using a computer system, a minimum quantity of incentive necessary to allow the customer to qualify for the second financial terms, based on the requested current information and on the quantity of incentive.

In a 24th embodiment, a vehicle records conditioning, prediction, and visualization system, the system comprising a plurality of extraction databases that store vehicle records, each of the extraction databases configured to receive data records from corresponding application-specific file source databases a vehicle alert database that receives the vehicle records from the plurality of extraction databases, the vehicle records comprising information relating to a large group of potential customers information relating to large number of current vehicles of the potential customers in the large group of potential customers; and information relating to a large set of current financial terms for the large number of current vehicles at least one hardware processor in communication with the extraction device and the vehicle alert database, the at least one hardware processor configured to execute computer-executable instructions to at least automatically determine a customized deal for each potential customer by performing the following steps for each potential customer in the large group identifying a current vehicle of the potential customer from within the large number of current vehicles determining a trade-in value for the current vehicle identifying current financial terms for the current vehicle from within the large set of current financial terms automatically determining a payoff amount for the current vehicle from the current financial terms using stored associations between vehicle types to limit required calculations by, without receiving a request from the potential customer, automatically selecting a potential replacement vehicle that is predicted to be of interest to the potential customer, the automatic selection based on an association between vehicle types stored in the computer and the current vehicle of the potential customer retrieving potential financial terms available for the potential replacement vehicle; and calculating a potential payment amount for the potential replacement vehicle, based on the potential financial terms, the trade-in value, and the payoff amount for each of the potential customers, automatically evaluating the customized deal to predict whether the deal is likely to be desirable, without receiving a request from the potential customer, by retrieving a current payment amount for the current vehicle from the current financial terms automatically subtracting the current payment amount for the current vehicle from the potential payment amount for the potential replacement vehicle to determine a difference in payments; and predicting, if the difference in payments is less than or equal to a preset threshold, that the deal will be desirable to the potential customer transmit display instructions to a client device configured for use by a vehicle manufacturer, the display instructions configured to initiate a display comprising a number of potential customers, the display instructions configured to prevent access to the initiated display by unauthorized persons.

In a 25$^{th}$ embodiment, the system of embodiment 24, wherein the display instructions are further configured to display a budget adjustment tool configured to allow a user to input a maximum allowed budget for making deals.

In a 26$^{th}$ embodiment, the system of any of embodiments 24-25, wherein predicting that the deal will be desirable comprises determining that the difference in payments is less than or equal to a pre-determined dollar amount or percentage of the current periodic payment.

In a 27$^{th}$ embodiment, the system of any of embodiments 24-26, wherein the alert database comprises at least one of an online database of transactions, a database of vehicles sold or leased by the dealer, a database of sale or lease agreements for vehicles sold or leased by the dealer, a database of sold and leased vehicles maintained by a manufacturer of the current vehicle, or a database of sales and lease agreements maintained by a lender that financed the current vehicle.

In a 28$^{th}$ embodiment, the system of any of embodiments 24-27, wherein the display instructions are transmitted over an Internet network.

In a 29$^{th}$ embodiment, the system of any of embodiments 24-28, wherein the first qualifying criteria are based on a number of digits in the vehicle identification number of the previously sold vehicle or on the existence of a missing vehicle record.

In a 30$^{th}$ embodiment, the system of any of embodiments 24-29, wherein the alert database is configured to receive an updated mileage of the previously sold vehicle based on a measurement by a vehicle dealership and wherein the second qualifying criteria are based on the actual mileage.

In a 31$^{st}$ embodiment, the system of any of embodiments 24-30, wherein the display instructions are further configured not to display a customer name.

In a 32$^{nd}$ embodiment, the system of any of embodiments 24-31, wherein authorization credentials are provided at the client device.

In a 33$^{rd}$ embodiment, the system of any of embodiments 24-32, wherein the display instructions are further configured to display a map that identifies a number of alerts in each of a plurality of geographical regions.

In a 34$^{th}$ embodiment, the system of any of embodiments 17-33, wherein the plurality of extraction databases comprises an SQL table.

The systems and methods described herein can advantageously be implemented using computer software, hardware, firmware, or any combination of software, hardware, and firmware. In one embodiment, the system is implemented as a number of software modules that comprise computer executable code for performing the functions described herein. In one embodiment, the computer-executable code is executed on one or more general purpose computers. Further, any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

The modules described herein can be combined or divided. For example, any two or more modules can be combined into one module. Similarly, a number of databases are described herein and any two or more databases can be combined into one database and that any one database can be divided into multiple databases. Multiple distributed computing devices may be substituted for any one computing device illustrated herein. In such distributed embodiments, the functions of the one computing device are distributed.

What is claimed is:

1. A visual assessment tool, with network encryption, data conditioning, and prediction, for use by an automotive manufacturer, the tool comprising:
a vehicle records extraction interface configured to obtain vehicle records from application-specific file source databases and at least temporarily store the vehicle records in at least one vehicle records extraction database;
an external parameter extraction interface configured to obtain external parameters comprising current loan rates and/or incentives available from one or more external sources;
a vehicle alert database configured to receive at least some of the vehicle records from the vehicle records extraction database;
a vehicle manufacturer data interface configured to pass data from the vehicle alert database to a vehicle manufacturer database via encrypted network connection, thereby maintaining data security; and
at least one computer processor configured to communicate with the extraction interfaces and the vehicle alert database and to perform computer-executable instructions to at least:

use the extraction interface to receive, over a network, vehicle records from the application-specific file source databases;

load the vehicle records into one or more of the at least one extraction database based in part on the file source database from which each vehicle record was sent;

selectively remove, based on disqualifying criteria, one or more vehicle records received from the application-specific file source databases from one or more of the plurality of extraction databases;

selectively modify, based on modification criteria, one or more vehicle records in one or more of the plurality of extraction databases, the selective removal and selective modification resulting in standardized vehicle records;

transfer the standardized vehicle records to the vehicle alert database, wherein the standardized vehicle data records comprise:
  a customer name for a previously sold vehicle and that customer's contact information, the customer name comprising a name of a past customer not known to be currently shopping or looking for a new vehicle;
  a vehicle identification number of the previously sold vehicle;
  data from a deal that resulted in a previous sale to the customer, the data sufficient to show or obtain:
    the customer's current monthly payment for the previously sold vehicle;
    an estimated current trade value of the previously sold vehicle; and
    an estimated current payoff amount of the previously sold vehicle;

use the standardized vehicle records in the vehicle alert database to automatically evaluate a specific new deal proposal for each member of a set of past customers to determine which past customers are good prospects for offering such deal proposals on favorable terms, wherein favorable terms comprise at least the same or lower monthly payments for a given customer, thereby determining that certain past customers should be included in a graphical representation of aggregate alert data, the automatic evaluation comprising:
  automatically determining for each of the past customers a new suggested replacement vehicle for the previously sold vehicle using a one-to-one algorithmic association protocol, thereby limiting use of computer resources by confining analysis to one new suggested vehicle per customer for the determination of whether that customer is an "alert";
  periodically receiving updates to current trade value and current payoff amount for the set of past customers;
  dynamically receiving updates to one or more external parameters through the external parameter extraction interface;
  determining customer-specific proposed payments and "alert" status for each new suggested replacement vehicle by:
    obtaining a price of the new suggested replacement vehicle for each customer;
    obtaining a net trade-in equity by combining the estimated trade value for each customer with the estimated payoff amount of the previously sold vehicle to that customer, wherein the trade-in equity may be either negative equity or positive equity;
    determining an amount to be financed by combining the price of the new suggested vehicle with any obtained net trade-in equity, whether positive or negative;
    using the amount to be financed, updating one or more external parameters to determine the new proposed payment;
    comparing each customer's current payment and the customer-specific new proposed payment to determine one or more differences; and
    analyzing the differences to determine those meeting a criterion to identify the customer as an "alert" for outreach because the difference meets a favorability condition;
  calculating the aggregate alert data for the favorable deals resulting from analyzing the differences, the aggregate alert data representing multiple alerts from multiple dealerships and preventing access to sensitive data about particular individuals;
  via the vehicle manufacturer data interface, transmitting instructions for the graphical representation of the aggregate alert data for display using a graphical user interface, wherein the graphical representation prevents access to personally identifying information by omitting it from aggregate alert data and using encrypted connections for data transfer;
  via a dynamic incentive adjustment tool, accepting user input to adjust at least one incentive parameter;
  in response to the adjustment of the at least one incentive parameter using the dynamic incentive adjustment tool, dynamically determining the effect of the at least one incentive parameter adjustment on the number of customers for whom the favorability condition is satisfied by updating the aggregate alert data; and
  in response to the adjustment of the at least one incentive parameter and the determination of the effect, dynamically configuring refreshed alert information for automatic display to a user through the graphical user interface by updating the instructions for the graphical representation of the aggregate alert data, the refreshed alert information corresponding to a subset of the set of past customers, the subset comprising those past customers for whom the favorability condition is satisfied after the updates to the external parameters have been applied;
  wherein the refreshed alert information is configured to provide the user a visual assessment for use by automotive manufacturer personnel.

2. The visual assessment tool of claim 1, wherein dynamically receiving updates to the one or more external parameters through the external parameter extraction interface comprises updating the graphical user interface configured to dynamically accept new loan rates and/or cash incentives.

3. The visual assessment tool of claim 1, wherein transmitting the instructions for the graphical representation of aggregate alert data for display using the graphical user interface comprises transmitting display instructions to a client device configured for use by a vehicle manufacturer, the display instructions configured to initiate a display through the graphical user interface that comprises:

a total number of customers satisfying the favorability condition; and a budget adjustment tool configured to allow a user to input a maximum allowed budget for making deals.

4. The visual assessment tool of claim 3, wherein the visual assessment tool is configured to selectively restrict access to the initiated display based on whether the client device receives authorization credentials.

5. The visual assessment tool of claim 1, wherein the visual assessment tool is further configured not to display any personally identifying information of any member of the set of past customers.

6. The visual assessment tool of claim 3, wherein the budget adjustment tool comprises a slider.

7. A computer visual discovery system for automotive manufacturing comprising:

a plurality of extraction interfaces, each of the extraction interfaces configured to receive data records from corresponding application-specific databases;

a vehicle manufacturer data interface configured to pass data from the vehicle alert database to a vehicle manufacturer database via encrypted connection; and one or more hardware computer processors configured with specific computer executable instructions, wherein execution of the instructions by the hardware computer processors causes the system to:

receive, via the plurality of extraction interfaces and encrypted connection, a set of vehicle records from the application-specific databases, each of the set of vehicle records comprising:

a customer name for a previously sold vehicle and that customer's contact information;

a vehicle identification number of the previously sold vehicle;

data from a deal that resulted in a previous sale to the customer, the data sufficient to show or obtain:

the customer's current payment, which comprises the customer's periodic payment for the previously sold vehicle;

an estimated trade value of the previously sold vehicle; and an estimated payoff amount of the previously sold vehicle;

based on metadata associated with the vehicle records, sort the vehicle records received over the network;

selectively modify, based on qualifying criteria, the vehicle records received from the application-specific databases;

generate an interactive display interface in communication with a vehicle manufacturing database, the interactive display interface configured to display aggregate alert data obtained via the encrypted connection, thereby preventing disclosure of individualized information to a user, the interactive display interface further comprising:

a budget adjustment tool allowing dynamic selection of a maximum budget by a user;

a geographic map that dynamically updates in response to an adjustment by a user of the budget adjustment tool, the map comprising a plurality of regions; and a plurality of alert indicators, each corresponding to a region of the plurality of regions, wherein each of the plurality of alert indicators represents a number of available new deal proposals for each of a plurality of past customers from multiple dealerships;

wherein, in dynamic response to the user selection of the maximum budget, the interactive display interface automatically updates one or more of the plurality of alert indicators and displays them in association with the regions of the geographic map, wherein each new deal proposal comprises a periodic payment for a replacement vehicle within a percentage threshold of the current payment, wherein the plurality of alert indicators prevents disclosure of any sensitive data about particular individuals via the interactive display interface and wherein updating the one or more alert indicators comprises:

determining, based on the maximum budget selected by the user, a new periodic payment for each of the plurality of past customers; and via the vehicle manufacturer data interface, passing the new periodic payment to the vehicle manufacturer database; and wherein the updated one or more alert indicators is configured to allow the user to visually and dynamically discover effects of real-world inputs from automotive manufacturers.

8. The system of claim 7 wherein determining a new periodic payment for each of the plurality of past customers comprises:

obtaining a price of a new suggested vehicle;

determining a net trade-in equity by combining the estimated trade value with the estimated payoff amount of the previously sold vehicle, wherein the trade-in equity may be either negative equity or positive equity;

determining an amount to be financed by combining the price of the new suggested vehicle with any obtained net trade-in equity, whether positive or negative;

using the amount to be financed and currently-available rate information for a loan duration to determine the new proposed payment;

comparing the customer's current payment and the new proposed payment to determine one or more differences; and analyzing the one or more differences to determine if at least one meets a criterion to identify the customer for outreach because a new favorable deal proposal has been identified to get that customer into the new suggested vehicle.

9. The system of claim 8, wherein execution of the instructions by the one or more hardware computer processors causes the system, in response to a user action, to adjust at least one changed data parameter for the suggested new vehicles and to determine whether the at least one changed data parameter increases the number of customers who can favorably get into the new suggested vehicle.

10. The system of claim 7, wherein the execution of the instructions by the hardware computer processors causes the system to automatically calculate an expiration date for identified new favorable deal proposals.

11. The system of claim 10, wherein the expiration date is calculated by determining that a new favorable deal proposal depends on a particular vehicle manufacturer incentive, and the expiration date corresponds to a date when the particular vehicle manufacturer incentive is no longer offered.

12. The system of claim 10, wherein the interactive display interface comprises a notification indicating to vehicle manufacturer personnel of the expiration date when the particular vehicle manufacturer incentive is no longer offered.

13. The system of claim 7, wherein the estimated trade value is obtained by using the vehicle identification number, a make, a model, a year, and a date of sale of the previously sold vehicle.

14. The system of claim 13, wherein the estimated trade value is automatically obtained from a database of third-party industry valuation data, and price of the new suggested vehicle and currently-available interest rate information are automatically obtained from external databases.

15. The system of claim 7, wherein execution of the instructions by the one or more hardware computer processors causes the system to automatically calculate the estimated payoff amount by multiplying the customer's current payment with the number of remaining payments derived from information in the database of records.

16. The system of claim 7, wherein execution of the instructions by the one or more hardware computer processors causes the system to automatically calculate the estimated payoff amount by:
   obtaining from one of the plurality of application-specific databases a capitalized cost comprising an amount financed for the previously-sold vehicle;
   determining an accumulated amount paid by the customer toward the capitalized cost; and
   subtracting the accumulated amount paid from the capitalized cost.

17. The system of claim 8, wherein the price of the new suggested vehicle comprises either a sales price for a sale transaction or a capitalized lease cost for a lease transaction.

18. The system of claim 7, wherein the percentage threshold is between about 0% and 10%.

19. The system of claim 7, wherein the interactive display interface further comprises at least three of the control selectors selected from the following group: a location selector, an automobile year selector, an automobile make selector, an automobile model selector, an automobile trim selector, and a selector for a percentage of customers who are expected to participate in a new favorable deal proposal.

20. The system of claim 7, further comprising computer software configured for use with multiple automotive dealerships, each of the extraction interfaces configured to extract data from customer databases of those dealerships, and the interactive display interface is configured to allow OEM users to design and manage incentives and develop one or more private offer campaigns for specific sets of consumers of the automotive dealerships.

* * * * *